(12) United States Patent
Miyabayashi

(10) Patent No.: US 7,812,070 B2
(45) Date of Patent: Oct. 12, 2010

(54) MICROENCAPSULATED PIGMENT, PREPARATION PROCESS THEREFOR, AQUEOUS DISPERSION AND INK JET RECORDING INK

(75) Inventor: Toshiyuki Miyabayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 876 days.

(21) Appl. No.: 11/713,492

(22) Filed: Mar. 2, 2007

(65) Prior Publication Data

US 2007/0157848 A1 Jul. 12, 2007

Related U.S. Application Data

(62) Division of application No. 10/965,000, filed on Oct. 14, 2004, now Pat. No. 7,423,076.

(30) Foreign Application Priority Data

Oct. 14, 2003 (JP) .......................... P.2003-353649
Oct. 31, 2003 (JP) .......................... P.2003-372602

(51) Int. Cl.
C08K 9/10 (2006.01)
C09D 11/10 (2006.01)
(52) U.S. Cl. ...................... 523/205; 523/160; 523/161; 523/200; 524/556
(58) Field of Classification Search ................. 523/205, 523/160, 161, 200; 524/556
See application file for complete search history.

(56) References Cited

U.S. PATENT DOCUMENTS

| 5,415,964 | A | * | 5/1995 | Hayashi et al. | ........ 430/137.17 |
| 5,872,164 | A | | 2/1999 | Koide et al. | |
| 5,928,419 | A | | 7/1999 | Uemura et al. | |
| 6,538,047 | B1 | | 3/2003 | Miyabayashi | |
| 6,723,783 | B2 | | 4/2004 | Palumbo et al. | |
| 6,864,302 | B2 | * | 3/2005 | Miyabayashi | ................ 523/160 |
| 7,307,110 | B2 | | 12/2007 | Yatake | |
| 2002/0077385 | A1 | * | 6/2002 | Miyabayashi | ................ 523/160 |
| 2004/0229975 | A1 | | 11/2004 | Palumbo et al. | |

FOREIGN PATENT DOCUMENTS

| JP | 62-161861 | 7/1987 |
| JP | 03-157464 | 7/1991 |
| JP | 05-320276 | 12/1993 |
| JP | 05-339516 | 12/1993 |
| JP | 07-233275 | 9/1995 |
| JP | 7-94634 | 11/1995 |
| JP | 08-059715 | 3/1996 |
| JP | 08-081647 | 3/1996 |
| JP | 08-183920 | 7/1996 |
| JP | 08-218015 | 8/1996 |
| JP | 08-295837 | 11/1996 |
| JP | 08-302227 | 11/1996 |
| JP | 08-302228 | 11/1996 |
| JP | 09-003376 | 1/1997 |
| JP | 09-031360 | 2/1997 |
| JP | 09-104834 | 4/1997 |
| JP | 09-151342 | 6/1997 |
| JP | 09-217019 | 8/1997 |
| JP | 09-286939 | 11/1997 |
| JP | 09-316353 | 12/1997 |
| JP | 10-046075 | 2/1998 |
| JP | 10-110129 | 4/1998 |
| JP | 10-140065 | 5/1998 |
| JP | 10-292143 | 11/1998 |
| JP | 11-049974 | 2/1999 |
| JP | 11-080633 | 3/1999 |
| JP | 11-140362 | 5/1999 |
| JP | 11-152424 | 6/1999 |
| JP | 11-166145 | 6/1999 |
| JP | 11-199783 | 7/1999 |
| JP | 11-209672 | 8/1999 |
| JP | 11-282218 | 10/1999 |
| JP | 11-349870 | 12/1999 |
| JP | 2000-007961 | 1/2000 |
| JP | 2000-044852 | 2/2000 |
| JP | 2000-053897 | 2/2000 |
| JP | 2000-053898 | 2/2000 |
| JP | 2000-053899 | 2/2000 |

(Continued)

OTHER PUBLICATIONS

Patent Abstracts of Japan English abstract of JP 03-157464, dated Jul. 5, 1991.
Patent Abstracts of Japan English abstract of JP 05-320276, dated Dec. 3, 1993.
Patent Abstracts of Japan English abstract of JP 05-339516, dated Dec. 21, 1993.
Japanese patent publication JP 7-94634, dated Nov. 10, 1995.
Patent Abstracts of Japan English abstract of JP 08-059715, dated Mar. 5, 1996.
Patent Abstracts of Japan English abstract of JP 08-081647, dated Mar. 26, 1996.
Patent Abstracts of Japan English abstract of JP 08-183920, dated Jul. 16, 1996.

(Continued)

*Primary Examiner*—David Wu
*Assistant Examiner*—Michael M Bernshteyn
(74) *Attorney, Agent, or Firm*—Ladas and Parry LLP

(57) ABSTRACT

The present invention relates to a microencapsulated pigment in which pigment particles having cationic groups on their surfaces are coated with a polymer having repeating structural units derived from an anionic polymerizable surfactant having at least an anionic group, a hydrophobic group and a polymerizable group, and a microencapsulated pigment in which pigment particles having anionic groups on their surfaces are coated with a polymer having repeating structural units derived from a cationic polymerizable surfactant having a cationic group, a hydrophobic group and a polymerizable group. Further, the invention relates to a process for producing the microencapsulated pigment, an aqueous dispersion containing the microencapsulated pigment, and an ink jet recording ink containing the aqueous dispersion.

16 Claims, 8 Drawing Sheets

FOREIGN PATENT DOCUMENTS

| | | |
|---|---|---|
| JP | 2000-053900 | 2/2000 |
| JP | 2001-11346 | 1/2001 |
| JP | 1 077 238 A1 | 2/2001 |
| JP | 2001-123098 | 5/2001 |
| JP | 2001-302708 | 10/2001 |
| JP | 2002-161223 | 6/2002 |
| JP | 2002-211106 | 7/2002 |
| JP | 2002-256166 | 9/2002 |
| JP | 2002-327138 | 11/2002 |
| JP | 2002-338859 | 11/2002 |
| JP | 2002-347338 | 12/2002 |
| JP | 2003-137910 | 5/2003 |
| JP | 2003-519709 | 6/2003 |
| JP | 2003-306611 | 10/2003 |
| JP | 10-7962 | 1/2010 |
| JP | 10-110110 | 4/2010 |
| WO | 02/066564 A1 | 8/2002 |

OTHER PUBLICATIONS

Patent Abstracts of Japan English abstract of JP 08-218015, dated Aug. 27, 1996.
Patent Abstracts of Japan English abstract of JP 08-295837, dated Nov. 12, 1996.
Patent Abstracts of Japan English abstract of JP 08-302227, dated Nov. 19, 1996.
Patent Abstracts of Japan English abstract of JP 08-302228, dated Nov. 19, 1996.
Patent Abstracts of Japan English abstract of JP 09-003376, dated Jan. 7, 1997.
Patent Abstracts of Japan English abstract of JP 09-031360, dated Feb. 4, 1997.
Patent Abstracts of Japan English abstract of JP 09-104834, dated Apr. 22, 1997.
Patent Abstracts of Japan English abstract of JP 09-151342, dated Jun. 10, 1997.
Patent Abstracts of Japan English abstract of JP 09-217019, dated Aug. 19, 1997.
Patent Abstracts of Japan English abstract of JP 09-286939, dated Nov. 4, 1997.
Patent Abstracts of Japan English abstract of JP 09-316353, dated Dec. 9, 1997.
Patent Abstracts of Japan English abstract of JP 10-046075, dated Feb. 17, 1998.
Patent Abstracts of Japan English abstract of JP 10-110129, dated Apr. 28, 1998.
Patent Abstracts of Japan English abstract of JP 10-140065, dated May 26, 1998.
Patent Abstracts of Japan English abstract of JP 10-292143, dated Nov. 4, 1998.
Patent Abstracts of Japan English abstract of JP 11-049974, dated Feb. 23, 1999.
Patent Abstracts of Japan English abstract of JP 11-080633, dated Mar. 26, 1999.
Patent Abstracts of Japan English abstract of JP 11-140362, dated May 25, 1999.
Patent Abstracts of Japan English abstract of JP 11-152424, dated Jun. 8, 1999.
Patent Abstracts of Japan English abstract of JP 11-166145, dated Jun. 22, 1999.
Patent Abstracts of Japan English abstract of JP 11-199783, dated Jul. 27, 1999.
Patent Abstracts of Japan English abstract of JP 11-209672, dated Aug. 3, 1999.
Patent Abstracts of Japan English abstract of JP 11-349870, dated Dec. 21, 1999.
Patent Abstracts of Japan English abstract of JP 2000-007961, dated Jan. 11, 2000.
Patent Abstracts of Japan English abstract of JP 2000-044852, dated Feb. 15, 2000.
Patent Abstracts of Japan English abstract of JP 2000-053897, dated Feb. 22, 2000.
Patent Abstracts of Japan English abstract of JP 2000-053898, dated Feb. 22, 2000.
Patent Abstracts of Japan English abstract of JP 2000-053899, dated Feb. 22, 2000.
Patent Abstracts of Japan English abstract of JP 2000-053900, dated Feb. 22, 2000.
Patent Abstracts of Japan English abstract of JP 2001-123098, dated May 8, 2001.
Patent Abstracts of Japan English abstract of JP 2002-211106, dated Jul. 31, 2002.
Patent Abstracts of Japan English abstract of JP 2002-327138, dated Nov. 15, 2002.
Patent Abstracts of Japan English abstract of JP 2002-347338, dated Dec. 4, 2002.
Patent Abstracts of Japan English abstract of JP 2003-137910, dated May 14, 2003.
Patent Abstracts of Japan English abstract of JP 2003-306611, dated Oct. 31, 2003.
Patent Abstract of Japan 2002-338859 Published Nov. 27, 2002.
Patent Abstract of Japan 62-161861 Published Jul. 17, 1987.
Patent Abstract of Japan 2001-011346 Published Jan. 16. 2001.
Patent Abstract of Japan 11-282218 Published Oct. 15, 1999.
Patent Abstract of Japan 2001-302708 Published Oct. 31, 2001.
Patent Abstract of Japan 2002-256166 Published Sep. 11, 2002.

* cited by examiner

MICROENCAPSULATED PIGMENT, PREPARATION PROCESS THEREFOR, AQUEOUS DISPERSION AND INK JET RECORDING INK

This is a divisional of application Ser. No. 10/965,000 filed on Oct. 14, 2004 now U.S. Pat. No. 7,423,076, claims the benefit thereof and incorporates the same by reference.

FIELD OF THE INVENTION

The present invention relates to a microencapsulated pigment, a preparation process therefor, an aqueous dispersion and an ink jet recording ink.

BACKGROUND OF THE INVENTION

An ink jet recording process is a process comprising ejecting ink droplets from fine nozzles of a head to form letters or figures on the surface of a recording medium such as paper. As the ink jet recording process, there has been put to practical use a process in which electric signals are converted to mechanical signals with an electrostrictive element, thereby intermittently ejecting ink droplets stored in a nozzle head section to record letters or symbols on the surface of a recording medium, a process in which part of an ink solution is rapidly heated at a portion close to an ejection portion of a nozzle head to generate bubbles, and ink droplets are intermittently ejected by volume expansion due to the bubbles to record letters or symbols on the surface of a recording medium, or the like.

As an ink jet recording ink, there has recently been provided an aqueous pigment ink in which a pigment is dispersed in water. This is because an ink using a pigment is characterized by excellent water resistance and light resistance, compared to an ink using a water-soluble dye. In such an aqueous pigment ink, it has been generally carried out that the pigment is dispersed in an aqueous dispersing medium with a dispersant such as a surfactant or a polymer dispersant.

For example, in patent document 1, it has been studied to use a polymer dispersant as the dispersant for pigment particles, and water, a non-volatile organic solvent and a lower alcohol as the aqueous medium, in a pigment ink using an acetylene glycol-based penetrant, thereby securing dispersion stability thereof. However, when the dispersant is used for dispersion of the pigment particles as described above, elements in ink preparation are increased, which makes it difficult to set ink physical properties such as viscosity to desired values. Further, also in this pigment ink, the problem that print density is difficult to be secured is not solved yet.

Furthermore, in the aqueous pigment ink, the dispersant is merely adsorbed on surfaces of the pigment particles. Accordingly, when the ink solution is ejected through fine nozzles of a nozzle head, strong shear force is applied thereto, so that the dispersant adsorbed on the surfaces of the pigment particles is eliminated to deteriorate dispersibility, resulting in recognition of the tendency of ejection to become unstable in some cases. Moreover, when the above-mentioned aqueous pigment ink is stored for a long period of time, the tendency of ejection to become unstable is also recognized in some cases.

As another technique for dispersing pigment particles in water, there has been proposed a technique of introducing sulfonic groups onto surfaces of the pigment particles. For example, patent document 2 describes a pigment ink which contains a surface-sulfonated organic pigment obtained by treating with a sulfonating agent an organic pigment dispersed in an active proton-free solvent (related art 1). According to related art 1, it has been said that the above-mentioned pigment ink has excellent dispersion stability, and good ejection stability from the nozzles of the recording head (the characteristic of being stably ejected from the recording head to a definite direction).

Patent document 3 describes that an organic pigment mass whose surface is positively chargeable is prepared by treating a sulfonic group-introduced organic pigment mass with a monovalent metallic ion, and further describes an aqueous ink composition excellent in storage stability (dispersion stability) containing fine pigment particles prepared from the organic pigment mass whose surface is positively chargeable, a dispersant and water (related art 2).

However, although an ink using the surface-treated pigment particles of the above-mentioned related art 1 or related art 2 as a colorant is excellent in dispersion stability and ejection stability, compared to conventional pigment-based ink jet recording inks, abrasion resistance of recorded matter obtained by printing on a recording medium such as plain paper or an ink jet recording medium (a recording medium having provided on a its surface an ink receiving layer for receiving an ink jet recording ink) has still been insufficient. This is considered to be due to insufficient fixability of the above-mentioned surface-treated pigment particles to the recording medium.

On the other hand, in order to improve fixability of a pigment contained in a pigment-based ink jet recording ink to a recording medium, a technique using a microencapsulated pigment in which colorant particles are coated with a polymer has been known.

Patent documents 4 and 5 propose encapsulated fine pigment particles, and patent documents 6 to 9 propose pigment particles on surfaces of which a polymer is graft polymerized. Patent document 10 proposes a method for microencapsulating a hydrophobic powder with an amphiphilic graft polymer. However, the use of a previously polymerized polymer in microencapsulating has raised the problem that the particle size after encapsulation becomes too large.

In addition to the above-mentioned proposals, patent documents 11 to 19 propose inks containing pigments coated with resins having film forming properties at room temperature by phase inversion emulsification, and patent documents 20 to 29 propose inks using pigments coated with anionic group-containing organic polymer compounds by acid precipitation.

Further, patent documents 30 to 35 propose inks using polymer emulsions in which fine polymer particles are impregnated with colorants by phase inversion emulsification (related art 3). However, in the colorant obtained by phase inversion emulsification or acid precipitation, the polymer adsorbed on the pigment particles is also sometimes eliminated and dissolved in the ink, depending on the kind of organic solvent such as a penetrant used in the ink, so that dispersion stability and ejection stability of the ink, image quality and the like have been insufficient in some cases. In the ink of related art 3, the polymer adsorbed on the pigment particles is not a little eliminated, so that the pigment content in the ink is limited from the point of dispersion stability. Accordingly, images of recorded matter obtained by using this ink have low print density. In particular, when plain paper is used as the recording medium, there have been the problems that blurring is liable to occur in the images, and that color developability is also low.

Patent Document 1: JP 3-157464 A
Patent Document 2: JP 10-110129 A
Patent Document 3: JP 11-49974 A Patent Document 4: JP 7-94634 B
Patent Document 5: JP 8-59715 A
Patent Document 6: JP 5-339516 A
Patent Document 7: JP 8-302227 A
Patent Document 8: JP 8-302228 A
Patent Document 9: JP 8-81647 A
Patent Document 10: JP 5-320276 A
Patent Document 11: JP 8-218015 A
Patent Document 12: JP 8-295837 A
Patent Document 13: JP 9-3376 A
Patent Document 14: JP 8-183920 A
Patent Document 15: JP 10-46075 A
Patent Document 16: JP 10-292143 A
Patent Document 17: JP 11-80633 A
Patent Document 18: JP 11-349870 A
Patent Document 19: JP 2000-7961 A
Patent Document 20: JP 9-31360 A
Patent Document 21: JP 9-217019 A
Patent Document 22: JP 9-316353 A
Patent Document 23: JP 9-104834 A
Patent Document 24: JP 9-151342 A
Patent Document 25: JP 10-140065 A
Patent Document 26: JP 11-152424 A
Patent Document 27: JP 11-166145 A
Patent Document 28: JP 11-199783 A
Patent Document 29: JP 11-209672 A
Patent Document 30: JP 9-286939 A
Patent Document 31: JP 2000-44852 A
Patent Document 32: JP 2000-53897 A
Patent Document 33: JP 2000-53898 A
Patent Document 34: JP 2000-53899 A
Patent Document 35: JP 2000-53900 A

SUMMARY OF THE INVENTION

The invention has been made in view of the above-mentioned problems, and an object of the invention is to provide a microencapsulated pigment capable of preparing an ink jet recording ink satisfying all the following (1) to (6), a preparation process therefor and an aqueous dispersion.

(1) Excellent in dispersion stability;
(2) Excellent in ejection stability from a recording head;
(3) Capable of obtaining recorded matter excellent in fastness of images;
(4) Capable of obtaining recorded matter excellent in print density of images;
(5) Capable of obtaining recorded matter excellent in abrasion resistance of images; and
(6) Capable of obtaining recorded matter in which images are hard to blur, and which is excellent in color developability of images, even when plain paper is used as a recording medium.

Another object of the invention is to provide an ink jet recording ink satisfying all the above-mentioned (1) to (6).

Other objects and effects of the invention will become apparent from the following description.

As a result of intensive studies, the present inventors have discovered that an ink jet recording ink satisfying all the above-mentioned (1) to (6) can be surprisingly obtained by preparing a specific microencapsulated pigment, and using the microencapsulated pigment as a colorant for the ink jet recording ink, thus having completed the invention.

The technical constitution of a first aspect of the invention (hereinafter referred to as "first invention") is as follows:

<1> A microencapsulated pigment comprising pigment particles having cationic groups on their surfaces, the pigment particles being coated with a polymer having an anionic polymerizable surfactant having at least an anionic group, a hydrophobic group and a polymerizable group;

<2> A microencapsulated pigment comprising pigment particles having cationic groups on their surfaces, the pigment particles being coated with a polymer by polymerizing an anionic polymerizable surfactant having at least an anionic group, a hydrophobic group and a polymerizable group in an aqueous dispersion in which the above-mentioned pigment particles are dispersed;

<3> A microencapsulated pigment comprising pigment particles having cationic groups on their surfaces, the pigment particles being coated with a polymer having a repeating structural unit derived from an anionic polymerizable surfactant having an anionic group, a hydrophobic group and a polymerizable group, and a repeating structural unit derived from a cationic polymerizable surfactant having a cationic group, a hydrophobic group and a polymerizable group and/or a cationic polymerizable hydrophilic monomer;

<4> A microencapsulated pigment comprising pigment particles having cationic groups on their surfaces, the pigment particles being coated with a polymer by polymerizing an anionic polymerizable surfactant having an anionic group, a hydrophobic group and a polymerizable group with a cationic polymerizable surfactant having a cationic group, a hydrophobic group and a polymerizable group and/or a cationic polymerizable hydrophilic monomer in an aqueous dispersion in which the above-mentioned pigment particles are dispersed;

<5> The microencapsulated pigment described in any one of <1> to <4>, wherein the above-mentioned polymer further comprises a repeating structural unit derived from a hydrophobic monomer;

<6> The microencapsulated pigment described in any one of <1> to <5>, wherein the above-mentioned polymer further comprises a repeating structural unit derived from a monomer represented by the following general formula (1):

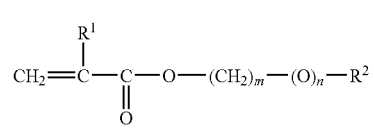

wherein $R^1$ represents a hydrogen atom or a methyl group, $R^2$ represents a t-butyl group, an alicyclic hydrocarbon group, an aromatic hydrocarbon group or a heterocyclic group, m represents an integer of 0 to 3, and n represents an integer of 0 or 1;

<7> The microencapsulated pigment described in any one of <1> to <6>, wherein the above-mentioned polymer further comprises a crosslinked structure derived from a crosslinkable monomer;

<8> The microencapsulated pigment described in any one of <1> to <7>, wherein the pigment constituting the above-mentioned pigment particles is carbon black or an organic pigment;

<9> The microencapsulated pigment described in any one of <1> to <4>, wherein the cationic group of the above-mentioned pigment particle is one member selected from the group consisting of a primary amine cation group, a secondary amine cation group, a tertiary amine cation group and a quaternary ammonium cation group;

<10> The microencapsulated pigment described in any one of <1> to <4>, wherein the anionic group of the above-mentioned anionic polymerizable surfactant is one member selected from the group consisting of a sulfonic anion group (—SO$_3^-$), a sulfinic anion group (—RSO$_2^-$: R is an alkyl group having 1 to 12 carbon atoms, a phenylene group, or a modified group thereof) and a carboxyl anion group (—COO$^-$);

<11> The microencapsulated pigment described in any one of <1> to <4>, wherein the hydrophobic group of the above-mentioned anionic polymerizable surfactant is one member selected from the group consisting of an alkyl group, an aryl group and a combined group thereof;

<12> The microencapsulated pigment described in any one of <1> to <4>, wherein the polymerizable group of the above-mentioned anionic polymerizable surfactant is a radically polymerizable unsaturated hydrocarbon group, which is one member selected from the group consisting of a vinyl group, an allyl group, an acryloyl group, a methacryloyl group, a propenyl group, a vinylidene group and vinylene group;

<13> The microencapsulated pigment described in <3> or <4>, wherein the cationic group of the above-mentioned cationic polymerizable surfactant and/or cationic polymerizable hydrophilic monomer is one member selected from the group consisting of a primary amine cation group, a secondary amine cation group, a tertiary amine cation group and a quaternary ammonium cation group;

<14> The microencapsulated pigment described in <3> or <4>, wherein the hydrophobic group of the above-mentioned cationic polymerizable surfactant and/or cationic polymerizable hydrophilic monomer is one member selected from the group consisting of an alkyl group, an aryl group and a combined group thereof;

<15> The microencapsulated pigment described in <3> or <4>, wherein the polymerizable group of the above-mentioned cationic polymerizable surfactant and/or cationic polymerizable hydrophilic monomer is a radically polymerizable unsaturated hydrocarbon group, which is one member selected from the group consisting of a vinyl group, an allyl group, an acryloyl group, a methacryloyl group, a propenyl group, a vinylidene group and vinylene group;

<16> A process for producing a microencapsulated pigment by coating pigment particles having cationic groups on their surfaces with a polymer, which comprises adding the anionic polymerizable surfactant to an aqueous dispersion of the above-mentioned pigment particles having cationic groups on their surfaces, followed by mixing, further adding the anionic polymerizable surfactant to achieve emulsification, and then, adding a polymerization initiator to perform polymerization in water;

<17> A process for producing a microencapsulated pigment by coating pigment particles having cationic groups on their surfaces with a polymer, which comprises adding the anionic polymerizable surfactant to an aqueous dispersion of the above-mentioned pigment particles having cationic groups on their surfaces, followed by mixing, then, adding a hydrophobic monomer, the anionic polymerizable surfactant and a hydrophobic monomer, followed by mixing to achieve emulsification, and then, adding a polymerization initiator to perform polymerization in water;

<18> A process for producing a microencapsulated pigment by coating pigment particles having cationic groups on their surfaces with a polymer, which comprises adding the anionic polymerizable surfactant to an aqueous dispersion of the above-mentioned pigment particles having cationic groups on their surfaces, followed by mixing, then, adding a hydrophobic monomer, a crosslinkable monomer and/or a monomer represented by the above-mentioned general formula (1) and the anionic polymerizable surfactant, followed by mixing to achieve emulsification, and then, adding a polymerization initiator to perform polymerization in water;

<19> A process for producing a microencapsulated pigment by coating pigment particles having cationic groups on their surfaces with a polymer, which comprises adding the anionic polymerizable surfactant to an aqueous dispersion of the above-mentioned pigment particles having cationic groups on their surfaces, followed by mixing, then, adding the cationic polymerizable surfactant and/or a cationic polymerizable hydrophilic monomer to achieve emulsification, and then, adding a polymerization initiator to perform polymerization in water;

<20> A process for producing a microencapsulated pigment by coating pigment particles having cationic groups on their surfaces with a polymer, which comprises adding the anionic polymerizable surfactant to an aqueous dispersion of the above-mentioned pigment particles having cationic groups on their surfaces, followed by mixing, then, adding a hydrophobic monomer and the cationic polymerizable surfactant, followed by mixing to achieve emulsification, and then, adding a polymerization initiator to perform polymerization in water;

<21> A process for producing a microencapsulated pigment by coating pigment particles having cationic groups on their surfaces with a polymer, which comprises adding the anionic polymerizable surfactant to an aqueous dispersion of the above-mentioned pigment particles having cationic groups on their surfaces, followed by mixing, then, adding a hydrophobic monomer, a crosslinkable monomer and/or a monomer represented by the below-shown general formula (1), and the cationic polymerizable surfactant and/or a cationic polymerizable hydrophilic monomer, followed by mixing to achieve emulsification, and then, adding a polymerization initiator to perform polymerization in water:

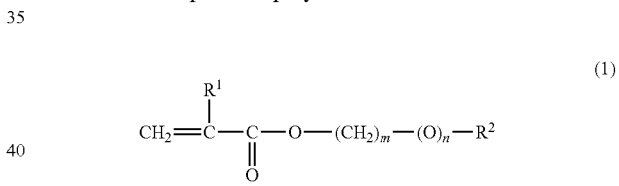

wherein R$^1$ represents a hydrogen atom or a methyl group, R$^2$ represents a t-butyl group, an alicyclic hydrocarbon group, an aromatic hydrocarbon group or a heterocyclic group, m represents an integer of 0 to 3, and n represents an integer of 0 or 1;

<22> The process described in any one of <16> to <21>, wherein the pigment constituting the above-mentioned pigment particles is carbon black or an organic pigment;

<23> An aqueous dispersion comprising the microencapsulated pigment described in any one of <1> to <15>;

<24> An ink jet recording ink comprising the aqueous dispersion described in <23>;

<25> The ink jet recording ink described in <24> further comprising fine polymer particles having anionic groups on their surfaces, a glass transition temperature of 30° C. or lower and a volume average particle size of 50 to 200 nm, the ionic groups on the surfaces of the particles being the same kind as the ionic group on the surface of the above-mentioned microencapsulated pigment; and <26> The ink jet recording ink described in <24> or <25>, which further comprises a water-soluble organic solvent.

The technical constitution of a second aspect of the invention (hereinafter referred to as "second invention") is as follows:

(27) A microencapsulated pigment comprising pigment particles having anionic groups on their surfaces, the pigment particles being coated with a polymer having a repeating structural unit derived from a cationic polymerizable surfactant having a cationic group, a hydrophobic group and a polymerizable group and/or a repeating structural unit derived from a cationic polymerizable hydrophilic monomer;

(28) A microencapsulated pigment comprising pigment particles having anionic groups on their surfaces, the pigment particles being coated with a polymer by polymerizing a cationic polymerizable surfactant having a cationic group, a hydrophobic group and a polymerizable group and/or a cationic polymerizable hydrophilic monomer in an aqueous dispersion in which the above-mentioned pigment particles are dispersed;

(29) The microencapsulated pigment described in the above (27) or (28), wherein the above-mentioned polymer further comprises a repeating structural unit derived from a hydrophobic monomer;

(30) The microencapsulated pigment described in any one of the above (27) to (29), wherein the above-mentioned polymer further comprises a repeating structural unit derived from a crosslinkable monomer and/or a repeating structural unit derived from a monomer represented by the following general formula (1):

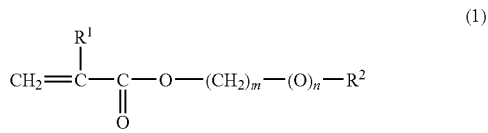

wherein $R^1$ represents a hydrogen atom or a methyl group, $R^2$ represents a t-butyl group, an alicyclic hydrocarbon group, an aromatic hydrocarbon group or a heterocyclic group, m represents an integer of 0 to 3, and n represents an integer of 0 or 1;

(31) The microencapsulated pigment described in any one of the above (27) to (30), wherein the pigment constituting the above-mentioned pigment particles is carbon black or an organic pigment;

(32) The microencapsulated pigment described in any one of the above (27) to (31), wherein the anionic group of the above-mentioned pigment particle is a sulfonic anion group ($-SO_3^-$) and/or a sulfinic anion group ($-RSO_2^-$: R is an alkyl group having 1 to 12 carbon atoms, a phenylene group, or a modified group thereof);

(33) The microencapsulated pigment described in any one of the above (27) to (31), wherein the anionic group of the above-mentioned pigment particle is a carboxyl anion group ($-COO^-$);

(34) The microencapsulated pigment described in the above (27) or (28), wherein the cationic group of the above-mentioned cationic polymerizable surfactant and/or cationic polymerizable hydrophilic monomer is one member selected from the group consisting of a primary amine cation group, a secondary amine cation group, a tertiary amine cation group and a quaternary ammonium cation group;

(35) The microencapsulated pigment described in the above (27) or (28), wherein the hydrophobic group of the above-mentioned cationic polymerizable surfactant and/or cationic polymerizable hydrophilic monomer is one selected from the group consisting of an alkyl group, an aryl group and a combined group thereof;

(36) The microencapsulated pigment described in the above (27) or (28), wherein the polymerizable group of the above-mentioned cationic polymerizable surfactant and/or cationic polymerizable hydrophilic monomer is a radically polymerizable unsaturated hydrocarbon group, which is one member selected from the group consisting of a vinyl group, an allyl group, an acryloyl group, a methacryloyl group, a propenyl group, a vinylidene group and vinylene group;

(37) A process for producing a microencapsulated pigment by coating pigment particles having anionic groups on their surfaces with a polymer, which comprises adding the cationic polymerizable surfactant and/or a cationic polymerizable hydrophilic monomer to an aqueous dispersion of the above-mentioned pigment particles having anionic groups on their surfaces, followed by mixing, and then, adding a polymerization initiator to perform emulsion polymerization in water;

(38) A process for producing a microencapsulated pigment by coating pigment particles having anionic groups on their surfaces with a polymer, which comprises adding the cationic polymerizable surfactant and/or a cationic polymerizable hydrophilic monomer to an aqueous dispersion of the above-mentioned pigment particles having anionic groups on their surfaces, followed by mixing, then, adding a hydrophobic monomer and a cationic polymerizable surfactant and/or a cationic polymerizable hydrophilic monomer to achieve emulsification, and then, adding a polymerization initiator to perform emulsion polymerization in water;

(39) The process described in the above (38) comprising the steps of:

adding a cationic polymerizable surfactant having a cationic group, a hydrophobic group and a polymerizable group and/or a cationic polymerizable hydrophilic monomer to an aqueous dispersion of the above-mentioned pigment particles having anionic groups on their surfaces, followed by mixing and performing ultrasonic irradiation treatment;

adding a hydrophobic monomer, followed by mixing;

adding a cationic polymerizable surfactant having a cationic group, a hydrophobic group and a polymerizable group and/or a cationic polymerizable hydrophilic monomer, followed by mixing and performing ultrasonic irradiation treatment; and adding a polymerization initiator to perform emulsion polymerization, the foregoing steps being performed in the above-mentioned order;

(40) The process described in the above (38) comprising the steps of:

adding a cationic polymerizable surfactant having a cationic group, a hydrophobic group and a polymerizable group and/or a cationic polymerizable hydrophilic monomer to an aqueous dispersion of the above-mentioned pigment particles having anionic groups on their surfaces, followed by mixing and performing ultrasonic irradiation treatment;

adding a hydrophobic monomer and a crosslinkable monomer and/or a monomer represented by the below-shown general formula (1), followed by mixing;

adding a cationic polymerizable surfactant having a cationic group, a hydrophobic group and a polymerizable group and/or a cationic polymerizable hydrophilic monomer, followed by mixing and performing ultrasonic irradiation treatment; and adding a polymerization initiator to perform emulsion polymerization, the foregoing steps being performed in the above-mentioned order:

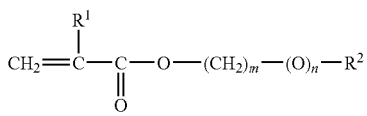

(1)

wherein $R^1$ represents a hydrogen atom or a methyl group, $R^2$ represents a t-butyl group, an alicyclic hydrocarbon group, an aromatic hydrocarbon group or a heterocyclic group, m represents an integer of 0 to 3, and n represents an integer of 0 or 1;

(41) The process described in any one of the above (37) to (40), wherein the pigment constituting the above-mentioned pigment particles is carbon black or an organic pigment;

(42) An aqueous dispersion comprising the microencapsulated pigment described in any one of the above (27) to (36);

(43) An ink jet recording ink comprising the aqueous dispersion described in the above (42);

(44) An ink jet recording ink comprising at least the microencapsulated pigment described in any one of the above (27) to (36) and water;

(45) The ink jet recording ink described in the above (43) or (44) further comprising a water-soluble organic solvent;

(46) The ink jet recording ink described in the above (45), wherein the above-mentioned water-soluble organic solvent is a high boiling water-soluble organic solvent having a boiling point of 180° C. or more;

(47) The ink jet recording ink described in the above (45) or (46), wherein the above-mentioned water-soluble organic solvent is glycerol;

(48) The ink jet recording ink described in any one of the above (45) to (47), wherein the above-mentioned water-soluble organic solvent is one or more compounds selected from the group consisting of alkyl ethers of polyhydric alcohols and/or 1,2-alkyldiols;

(49) The ink jet recording ink described in any one of the above (45) to (48) further containing a solid wetting agent in an amount of 3% by weight to 20% by weight based on the total weight of the above-mentioned ink jet recording ink; and

(50) The ink jet recording ink described in the above (49), wherein the above-mentioned solid wetting agent is trimehtylolpropane and/or 1,2,6-hexanetriol.

According to the microencapsulated pigment and the preparation process therefor of the invention, there can be provided a microencapsulated pigment capable of preparing an ink jet recording ink satisfying all the following (1) to (6) and a preparation process therefor, and an aqueous dispersion.

(1) Excellent in dispersion stability;
(2) Excellent in ejection stability from a recording head;
(3) Capable of obtaining recorded matter excellent in fastness of images;
(4) Capable of obtaining recorded matter excellent in print density of images;
(5) Capable of obtaining recorded matter excellent in abrasion resistance of images; and
(6) Capable of obtaining recorded matter in which images are hard to blur, and which is excellent in color developability of images, even when plain paper is used as a recording medium.

Further, according to the ink jet recording ink of the invention, there can be provided an ink jet recording ink satisfying all the following (1) to (6):

(1) Excellent in dispersion stability;
(2) Excellent in ejection stability from a recording head;
(3) Capable of obtaining recorded matter excellent in fastness of images;
(4) Capable of obtaining recorded matter excellent in print density of images;
(5) Capable of obtaining recorded matter excellent in abrasion resistance of images; and
(6) Capable of obtaining recorded matter in which images are hard to blur, and which is excellent in color developability of images, even when plain paper is used as a recording medium.
xx

BRIEF DESCRIPTION OF THE DRAWINGS

Reference numerals used in FIGS. 1 to 4 represent the following:
1: Pigment Particle
2A, 3A, 4A: Anionic Polymerizable Surfactants
11A, 11'A, 11"A: Anionic Groups
12, 12', 12": Hydrophobic Groups
13, 13', 13": Polymerizable Groups
14C: Cationic Group of Pigment Surface
50: Hydrophobic Surface of Pigment Particle
60, 60': Polymer Layer (Polymer)
100, 101: Microencapsulated Pigment

Figure 1:
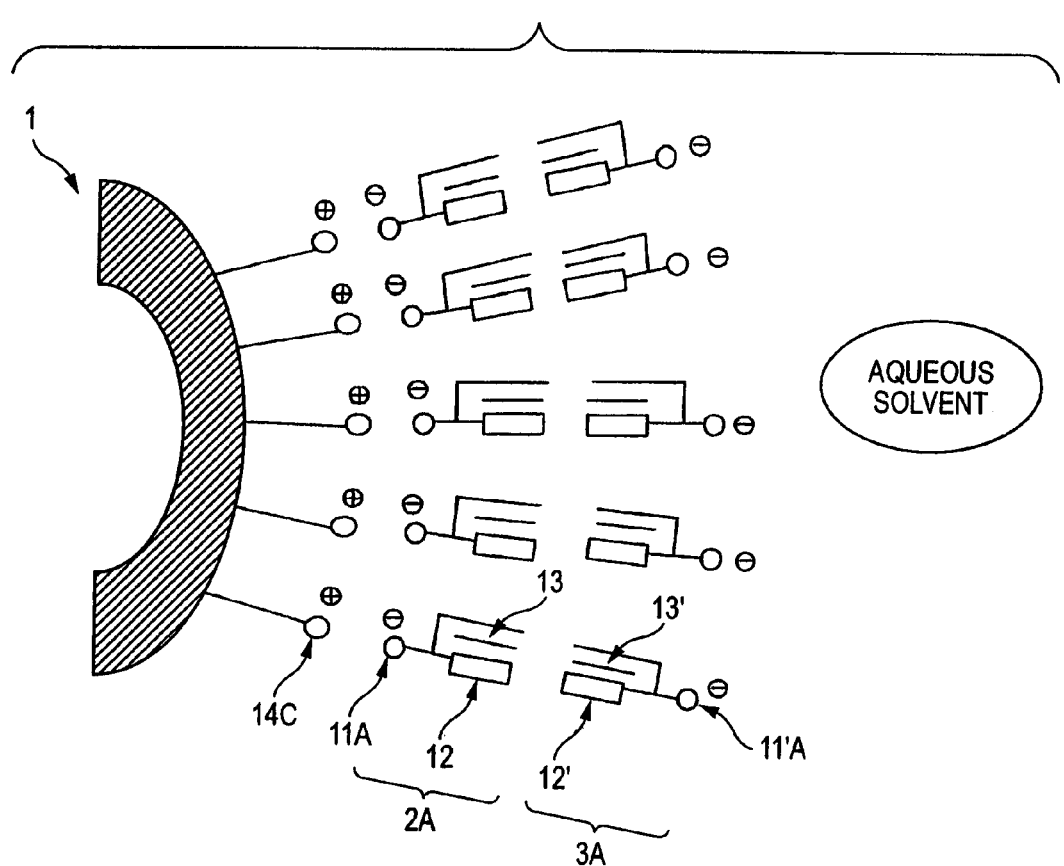
FIG. 1 is a schematic view showing that an anionic group of an anionic polymerizable surfactant is ionically adsorbed by a cationic group of a pigment particle having cationic groups on a its surface, and further that a micelle state is formed by an anionic polymerizable surfactant.

Reference numerals used in FIGS. 5 to 8 represent the following:

1: Pigment Particle
2C, 2C': Cationic Polymerizable Surfactants and/or Cationic Polymerizable Hydrophilic Monomers
11C, 11'C: Cationic Groups
12, 12': Hydrophobic Groups
13, 13': Polymerizable Groups
14A: Anionic Group
50: Hydrophobic Surface of Pigment Particle
60, 60': Polymer Layer (Polymer)
100, 101: Microencapsulated Pigment

DETAILED DESCRIPTION OF THE INVENTION

The microencapsulated pigment according to the first invention is characterized in that pigment particles having cationic groups on their surfaces are coated with a polymer having repeating structural units derived from an anionic polymerizable surfactant having at least an anionic group, a hydrophobic group and a polymerizable group.

Further, the microencapsulated pigment according to the first invention is characterized in that pigment particles having cationic groups on their surfaces are coated with a polymer having repeating structural units derived from an anionic polymerizable surfactant having an anionic group, a hydrophobic group and a polymerizable group and/or a hydrophilic monomer having an anionic group.

Such a microencapsulated pigment can be suitably produced by a process for preparing the microencapsulated pigment by coating the pigment particles having cationic groups on their surfaces with the polymer, which comprises adding the above-mentioned anionic polymerizable surfactant to an aqueous dispersion of the above-mentioned pigment particles having cationic groups on their surfaces, followed by mixing, and then, adding a polymerization initiator to perform polymerization in water, specifically emulsion polymerization.

Furthermore, the microencapsulated pigment according to the first invention is characterized in that pigment particles having cationic groups on their surfaces are coated with a polymer having repeating structural units derived from an anionic polymerizable surfactant having an anionic group, a hydrophobic group and a polymerizable group and repeating structural units derived from a hydrophobic monomer.

The first invention is a process for producing a microencapsulated pigment by coating pigment particles having anionic groups on their surfaces with a polymer, and the microencapsulated pigment can be suitably produced by coating the pigment particles having cationic groups on their surfaces with the polymer, which comprises adding the above-mentioned anionic polymerizable surfactant to an aqueous dispersion of the above-mentioned pigment particles having cationic groups on their surfaces, followed by mixing, then, adding the hydrophobic monomer and the anionic polymerizable surfactant, followed by mixing to achieve emulsification, and then, adding a polymerization initiator to perform polymerization in water, specifically emulsion polymerization.

In such a microencapsulated pigment, the cationic group on the surface of the pigment particle having cationic groups on its surface is ionically bonded to the anionic group of the anionic polymerizable surfactant, and the hydrophobic group of this anionic polymerizable surfactant and the hydrophobic group of the different anionic polymerizable surfactant face each other. The anionic group of the latter anionic polymerizable surfactant is orientated toward an aqueous phase side to form a micellar structure. When polymerization reaction is performed in this state, a polymer layer maintaining the above-mentioned structure is formed on the surface of the pigment particle. That is to say, the form of arrangement of the anionic polymerizable surfactants existing around the pigment particle before polymerization reaction is extremely highly controlled, and in an outermost shell, there is formed a state in which the anionic group is orientated toward the aqueous phase. Then, the anionic polymerizable surfactants are converted to the polymer by emulsion polymerization reaction, as this highly controlled form is maintained. Accordingly, the microencapsulated pigment of the first invention becomes a pigment whose structure is controlled to extremely high accuracy. That is to say, in a polymerization system, the hydrophilic group on the surface of the pigment particle having cationic groups on its surface is ionically bonded to the anionic group of the anionic polymerizable surfactant, and then, the micellar structure in which the anionic group of the anionic polymerizable surfactant is orientated toward the aqueous phase side is formed in the outermost shell, followed by polymerization reaction to form the polymer phase. It can therefore be said that the form of arrangement of the anionic polymerizable surfactants existing around the pigment particle before emulsion polymerization influences a polarization state of the surface of the particle after polymerization, thereby being able to control the structure to extremely high accuracy.

Accordingly, the microencapsulated pigment according to an embodiment of the first invention is capable of preparing an ink jet recording ink satisfying all the following (1) to (6):

(1) Excellent in dispersion stability;
(2) Excellent in ejection stability from a recording head;
(3) Capable of obtaining recorded matter excellent in fastness of images;
(4) Capable of obtaining recorded matter excellent in print density of images;
(5) Capable of obtaining recorded matter excellent in abrasion resistance of images; and
(6) Capable of obtaining recorded matter in which images are hard to blur, and which is excellent in color developability of images, even when plain paper is used as a recording medium.

According to a microencapsulated pigment in which a pigment is coated with a polymer previously prepared by using phase inversion emulsification or acid precipitation, it is considered that such a state of pigment particles coated with the polymer that all the above-mentioned (1) to (6) are satisfied has not been achieved, perhaps because of a limited state of pigment particles coated with the polymer caused by the previous preparation of the polymer.

Here, it is preferred that the microencapsulated pigment has an aspect ratio (fineness degree) of 1.0 to 1.3, and a Zingg index of 1.0 to 1.3 (more preferably 1.0 to 1.2), thereby being able to satisfy the above-mentioned (1), (2), (4) and (6) more securely.

When the minor diameter, major diameter and thickness of a particle are taken as b, l and t ($l \geq b \geq t > 0$), respectively, the aspect ratio (fineness degree) is $l/b$ ($\geq 1$), the degree of flatness is $b/t$ ($\geq 1$), and the Zingg index is the fineness degree/the degree of flatness=$(l \cdot t)/b^2$. That is to say, the true sphere has an aspect ratio of 1 and a Zingg index of 1.

When the aspect ratio is larger than 1.3, the microencapsulated pigment becomes flatter in shape to lower the isotropy. This perhaps accounts for the fact that there is a tendency to fail to obtain sufficient results, particularly with respect to the above (1), (2), (4) and (6). Although there is no particular limitation on the method for adjusting the aspect ratio and the Zingg index within the above-mentioned ranges, the microencapsulated pigment obtained by coating the pigment particles having cationic groups on their surfaces with the polymer by the above-mentioned polymerization method can easily satisfy these conditions.

As for microencapsulated pigments prepared by methods other than the polymerization method of the first invention, such as acid precipitation and phase inversion emulsification, it is difficult to adjust the aspect ratio and the Zingg index within the above-mentioned ranges. When the aspect ratio and Zingg index of the microencapsulated pigment are within the above-mentioned ranges, the pigment is shaped like a true sphere. Accordingly, an ink easily becomes Newtonian in its fluid characteristics, resulting in excellent ejection stability. Further, when the ink lands on the recording medium such as paper, the microencapsulated particles are arranged on the recording medium at high density because of their true sphere shape, which makes it possible to express print density and color development at high efficiency. Further, they are excellent in dispersibility and dispersion stability because of their true sphere shape.

Embodiments of the first invention will be described in detail below, with reference to dispersed states of pigment particles which can occur in the above-mentioned suitable methods. The dispersed states of the pigment particles described below include assumptions.

FIG. 1 is a view showing a state in which a pigment particle 1 having a cationic group 14C as a hydrophilic group on a its surface is dispersed in a solvent containing water as a main component (hereinafter also referred to as an aqueous medium), and coexists with an anionic polymerizable surfactant 2A having an anionic group 11A, a hydrophobic group 12 and a polymerizable group 13, and an anionic polymerizable surfactant 3A having an anionic group 11'A, a hydrophobic group 12' and a polymerizable group 13'. The anionic polymerizable surfactant 2A is arranged so that the anionic group 11A is directed toward the cationic group 14C of the pigment particle 1, and adsorbed by a strong ionic bond. Then, the hydrophobic group 12' and the polymerizable group 13' of the anionic polymerizable surfactant 3A are directed toward the hydrophobic group 12 and the polymerizable group 13 of the anionic polymerizable surfactant 2A by a hydrophobic interaction. The anionic group 11'A is directed toward a direction in which the aqueous medium exists, that is to say, a direction departing from the pigment particle 1.

Figure 2:
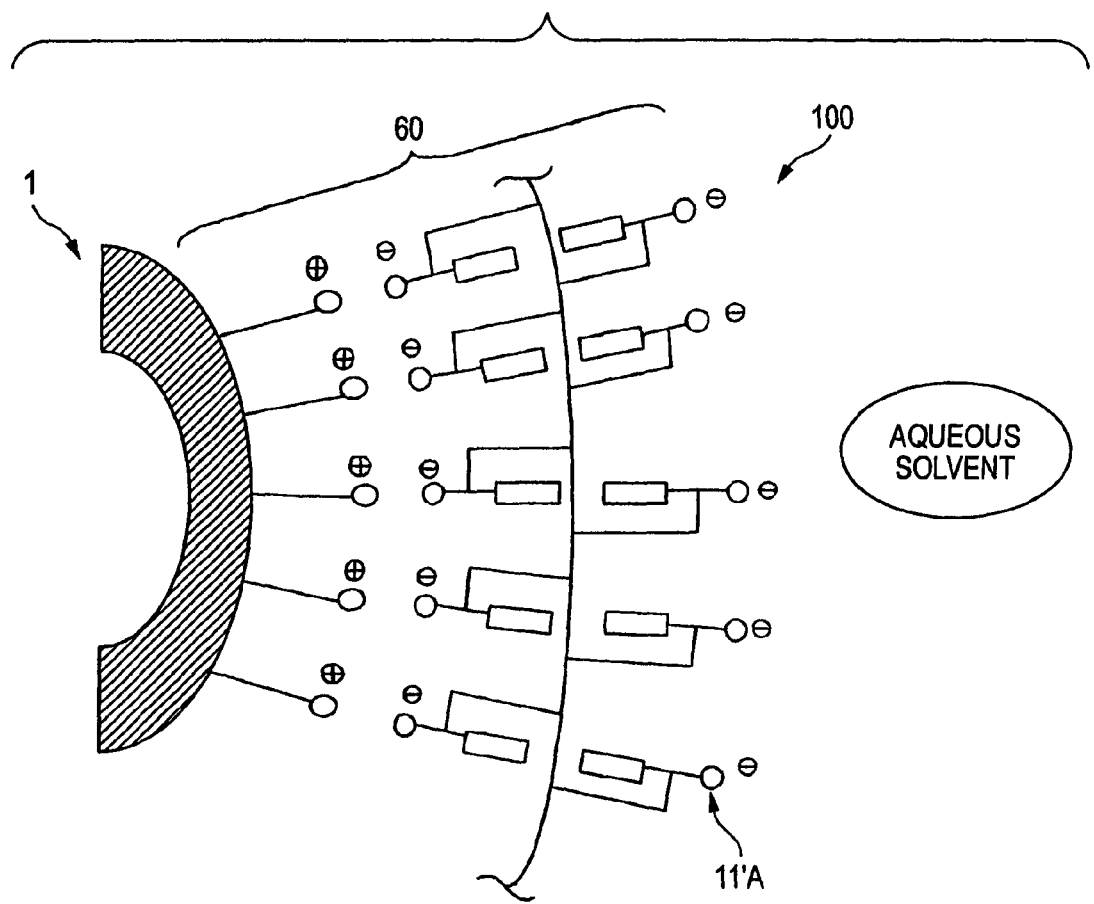
FIG. 2 is a schematic view showing that the anionic polymerizable surfactants are polymerized to form a polymer layer in FIG. 1.

To such an aqueous dispersion, for example, a polymerization initiator is added to polymerize the anionic polymerizable groups of the anionic polymerizable surfactant 2A and the anionic polymerizable surfactant 3A, thereby preparing a microencapsulated pigment 100 in which the pigment particle 1 is coated with a polymer layer 60, as shown in FIG. 2. The surface of the polymer layer 60 has the anionic group 11'A, so that the microencapsulated pigment 100 is dispersible in the aqueous medium. When a hydrophilic monomer having an anionic group as a hydrophilic group is used in place of the above-mentioned anionic polymerizable surfactant 3, a microencapsulated pigment can also be similarly prepared. At the time of polymerization, a comonomer copolymerizable with the anionic polymerizable surfactant and/or hydrophilic monomer having an anionic group may be allowed to exist in the aqueous dispersion as needed. In that case, the polymer layer 60 can be a copolymer layer copolymerized from the anionic polymerizable surfactant and/or hydrophilic monomer having an anionic group and the comonomer.

Figure 3:
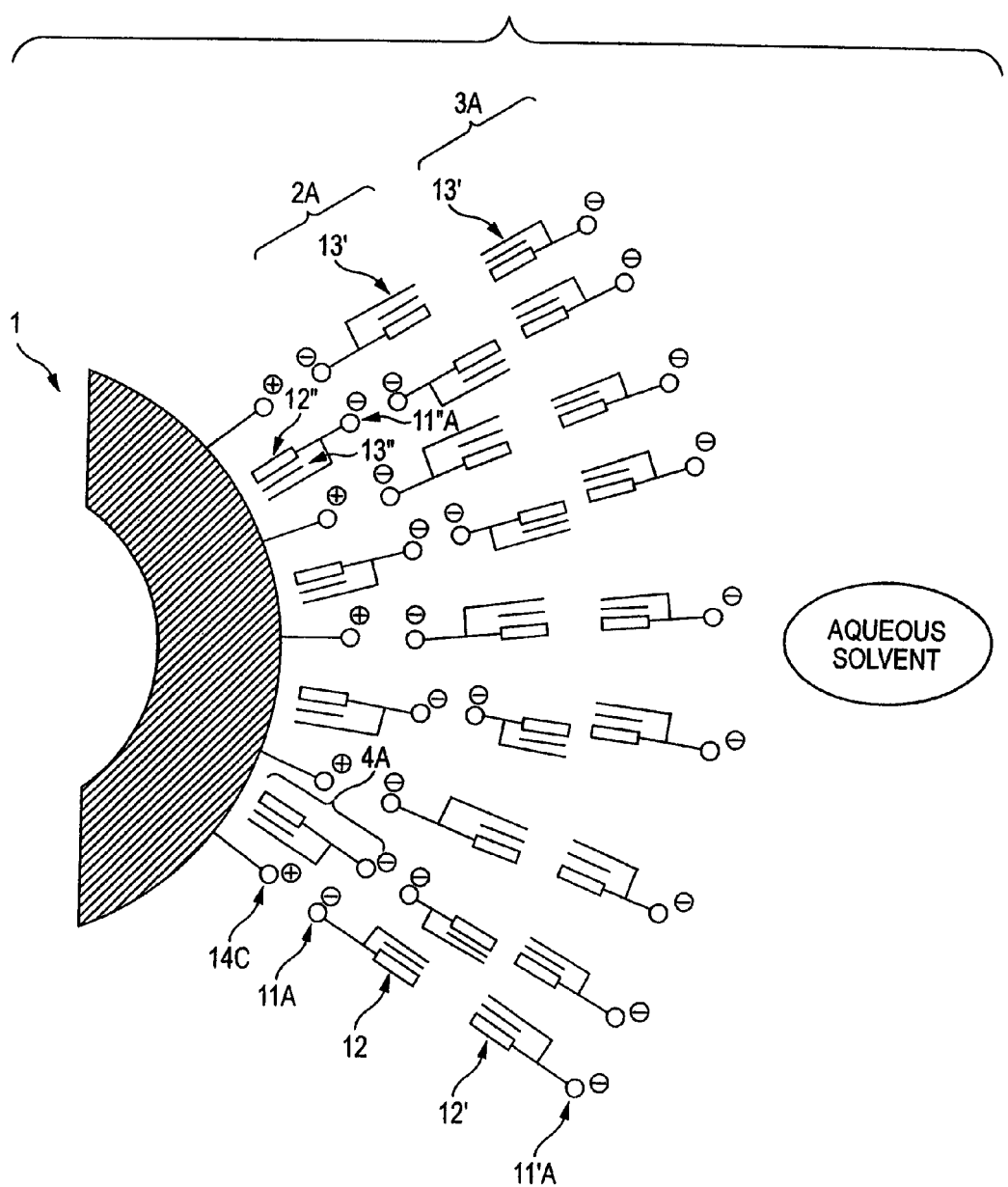
FIG. 3 is a schematic view showing that an anionic group of an anionic polymerizable surfactant is ionically adsorbed by a cationic group of a pigment particle having cationic groups on a its surface, that a hydrophobic group of an anionic polymerizable surfactant is adsorbed by a hydrophobic surface of the pigment particle having cationic groups on its surface, and further that a micelle state is formed by an anionic polymerizable surfactant.

Further, in addition to the above, a dispersed state of pigment particles which can occur in the above-mentioned suitable methods will be described. FIG. 3 is a view showing a state in which a pigment particle 1 having a cationic group 14C as a hydrophilic group on a its surface is dispersed in a solvent containing water as a main component (hereinafter also referred to as an aqueous medium), and coexists with an anionic polymerizable surfactant 2A having an anionic group 11A, a hydrophobic group 12 and a polymerizable group 13, and an anionic polymerizable surfactant 3A having an anionic group 11'A, a hydrophobic group 12' and a polymerizable group 13'. The anionic polymerizable surfactant 2A is arranged so that the anionic group 11A is directed toward the cationic group 14C of the pigment particle 1, and adsorbed by a strong ionic bond. Then, the hydrophobic group 12' and the polymerizable group 13' of the anionic polymerizable surfactant 3A are directed toward the hydrophobic group 12 and the polymerizable group 13 of the anionic polymerizable surfactant 2A by a hydrophobic interaction. The anionic group 11'A is directed toward a direction in which the aqueous medium exists, that is to say, a direction departing from the pigment particle 1.

Further, the surface of the pigment particle has the cationic groups 14C chemically bonded thereto at a specific density, and a hydrophobic region 50 between the cationic groups 14C. For example, a hydrophobic group 12" and a polymerizable group 13" of an anionic polymerizable surfactant 4A are directed toward this hydrophobic region 50. Then, the anionic polymerizable surfactant 2A is arranged so that the anionic group 11A is directed toward the anionic group 11" of the anionic polymerizable surfactant 4A. The hydrophobic group 12' and the polymerizable group 13' of the different anionic polymerizable surfactant 3A are directed toward the hydrophobic group 12 and the polymerizable group 13 of the anionic polymerizable surfactant 2A by a hydrophobic interaction, and the anionic group 11'A is directed toward a direction in which the aqueous medium exists, that is to say, a direction departing from the pigment particle 1.

Figure 4:
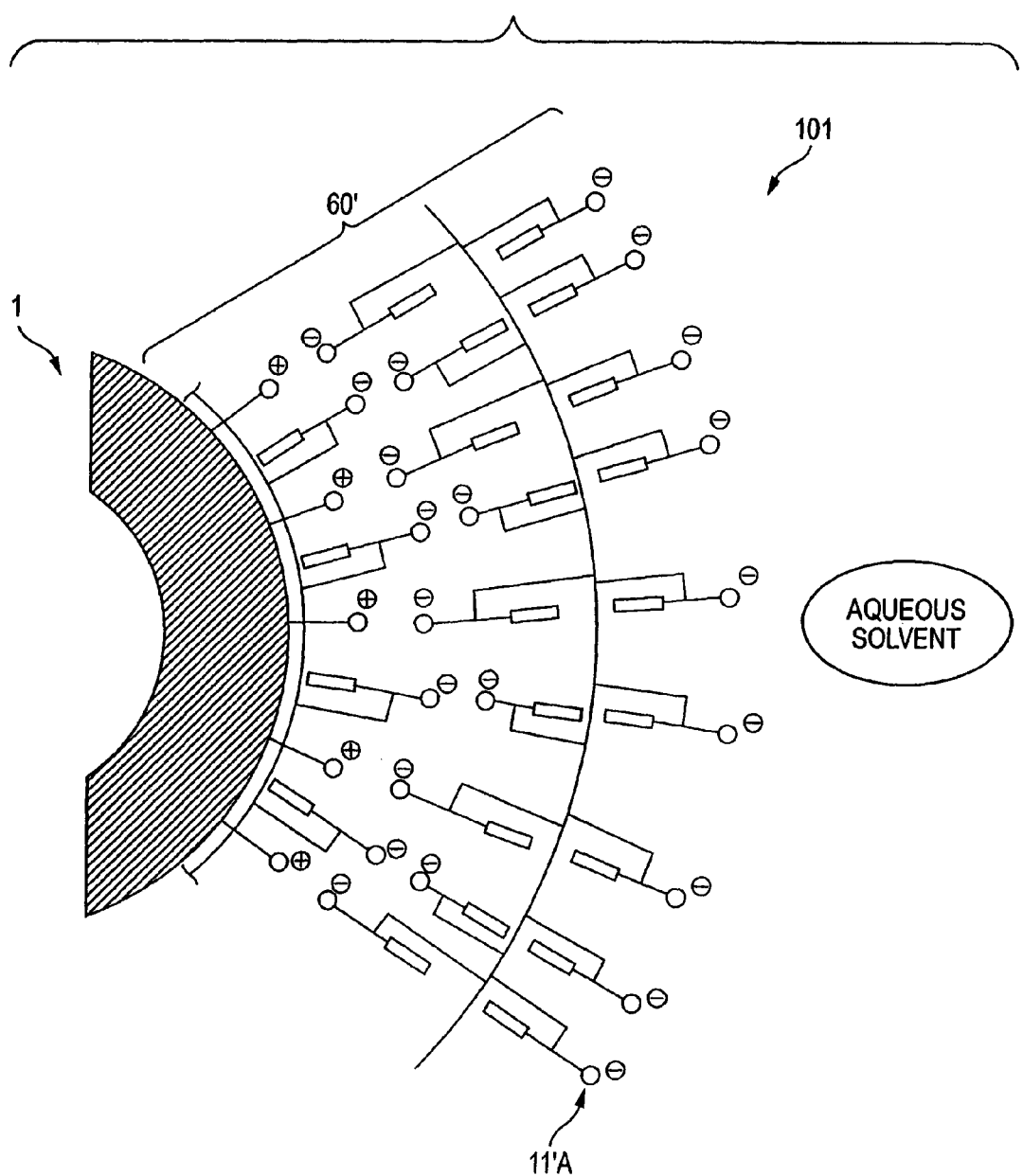
FIG. 4 is a schematic view showing that the anionic polymerizable surfactants are polymerized to form a polymer layer in FIG. 3.

To such an aqueous dispersion, for example, a polymerization initiator is added to polymerize the anionic polymerizable groups of the anionic polymerizable surfactants 2A, 3 and 4, thereby preparing a microencapsulated pigment 100 in which the pigment particle 1 is coated with a polymer layer 60, as shown in FIG. 4. The surface of the polymer layer 60 has the anionic group 11'A, so that the microencapsulated pigment 100 is dispersible in the aqueous medium. When a hydrophilic monomer having an anionic group as a hydrophilic group is used in place of the above-mentioned anionic polymerizable surfactant 3A, a microencapsulated pigment can also be similarly prepared. At the time of polymerization, a comonomer copolymerizable with the anionic polymerizable surfactant and/or hydrophilic monomer having an anionic group may be allowed to exist in the aqueous dispersion as needed. In that case, the polymer layer can be a copolymer layer copolymerized from the anionic polymerizable surfactant and/or hydrophilic monomer having an anionic group and the comonomer.

Although the dispersed states have been described above with reference to the drawings, first, the pigment particles 1 have the cationic groups on their surfaces as hydrophilic groups, thereby bringing about a state in which they are dispersed in the aqueous medium. The dispersion of the pigment particles 1 in the aqueous dispersion is high compared to the case where pigment particles having no hydrophilic groups on their surfaces are dispersed with a dispersant. According to such a microencapsulated pigment in which the pigment particles 1 having cationic groups on their surfaces are coated with the polymer, the anionic groups on the surface of the microencapsulated pigment are regularly densely orientated toward a direction in which the aqueous medium exists, as shown in FIGS. 2 and 4. Accordingly, dispersion stability of the microencapsulated pigment in the aqueous medium becomes excellent. Consequently, when the microencapsulated pigment according to the first invention is used as a colorant for an ink jet recording ink and the aqueous solvent is used as a solvent for the ink, even in the case where the microencapsulated pigment is contained in larger weight amounts in the ink, dispersion stability equal to or more excellent than that of a conventional microencapsulated pigment ink can be obtained. The microencapsulated pigment excellent in dispersion stability has no fear of clogging nozzles of a recording head, so that ejection stability is also improved. That is to say, the microencapsulated pigment ink can be prepared which is excellent in dispersion stability and ejection stability, concurrently improved in the weight concentration of the colorant compared to the conventional microencapsulated pigment ink. Ink jet recording can be made using such a microencapsulated pigment ink high in colorant weight concentration to obtain recorded matter not only excellent in fastness of images, but also high in print density of the images.

In place of the anionic polymerizable surfactant 3A shown in FIG. 1 or FIG. 3, the cationic polymerizable surfactant having a cationic group, a hydrophobic group and a polymerizable group can be used to obtain the microencapsulated pigment in which the anionic group in the outermost shell in FIG. 2 or FIG. 4 is replaced by the cationic group. According to such a microencapsulated pigment, the cationic groups on its surface are regularly densely orientated toward a direction in which the aqueous medium exists, so that dispersion stability of the microencapsulated pigment in the aqueous medium becomes excellent. Consequently, when the microencapsulated pigment according to the first invention is used as a colorant for an ink jet recording ink and the aqueous solvent is used as a solvent for the ink, the microencapsulated pigment can be contained in larger weight amounts in the ink, and dispersion stability equal to or more excellent than that of a conventional microencapsulated pigment ink can be obtained. The microencapsulated pigment excellent in dispersion stability has no fear of clogging nozzles of a recording head, so that ejection stability is also improved. That is to say, the microencapsulated pigment ink can be prepared which is excellent in dispersion stability and ejection stability, concurrently improved in the weight concentration of the colorant compared to the conventional microencapsulated pigment ink. Ink jet recording can be made using such a microencapsulated pigment ink high in colorant weight concentration to obtain recorded matter not only excellent in fastness of images, but also high in print density of the images.

On more specific consideration, in the microencapsulated pigment of the first invention, the anionic groups or cationic groups on its surface are considered to be regularly densely orientated toward the aqueous medium side as described above, so that effective electrostatic repulsion is considered to be generated between the microencapsulated pigments. Further, in addition to such electrostatic repulsion, an effect by steric hindrance due to the polymer with which the pigment particles are coated (polymer effect) is considered to contribute excellent dispersibility of the microencapsulated pigment of the first invention in the aqueous medium.

The reason why the occurrence of blurring in images can be inhibited at the time when plain paper is used as the recording medium, and also the reason why the print density of the images is high are considered to be largely due to the action of the hydrophilic groups of the microencapsulated pigment regularly densely orientated toward the side of the aqueous medium for the pigment. When the ink is ejected from a recording head and lands on the plain paper, a solvent of the ink rapidly penetrates into the plain paper. However, according to the conventional pigment ink using pigment particles dispersed with a dispersant (pigment particles are coated with a dispersant), the pigment particles also move into the paper laterally or deeply together with the solvent, which makes the pigment particles difficult to be adsorbed on cellulose fiber on the surface of the plain paper (the cause of this is considered to be that the amount of hydrophilic groups on the surface of the pigment is small compared to that of the microencapsulated pigment according to the embodiment of the first invention, and that the hydrophilic groups are not in the state in which they are regularly densely orientated. Consequently, print density is low, and color developability is insufficient.

In contrast, the microencapsulated pigment of the first invention is easily adsorbed on the cellulose fiber of the plain paper by an interaction of the hydrophilic groups (particularly, the anionic groups or cationic groups) existing on its surface with the cellulose fiber. Accordingly, when the ink containing the microencapsulated pigment of the first invention as a colorant is ejected from a recording head and lands on the plain paper, the colorant is easy to stay in the vicinity of a landing position of the plain paper. It is therefore considered that the occurrence of blurring is inhibited, as well as that high image density is obtained.

Further, in the ink jet recording ink of the first invention, the colorant is one obtained by coating the pigment particles with the polymer, so that the ink is excellent in fixability to the recording medium compared to the conventional microencapsulated pigment ink using the surface-treated pigment as a colorant. As a result, abrasion resistance of recorded matter can be made excellent.

Then, constituents of the microencapsulated pigment according to the first invention will be described in detail below.

The pigment particles having cationic groups on their surfaces can be suitably prepared by treating the surfaces of the pigment particles with a hydrophilic group-imparting agent. Accordingly, there is no particular limitation on the pigment constituting the pigment particles having hydrophilic groups on their surfaces, as long as it is a pigment which is insoluble in the hydrophilic group-imparting agent. From such a viewpoint, the pigments preferably used in the ink of the first invention include the following inorganic pigments and organic pigments.

The inorganic pigments include carbon blacks (C.I. Pigment Black 7) such as furnace black, lamp black, acetylene black and channel black, and an iron oxide pigment. As the organic pigments, there can be used an azo pigment (including azo lake, an insoluble azo pigment, a condensed azo pigment and a chelate azo pigment), a polycyclic pigment (for example, a phthalocyanine pigment, a perylene pigment, a perinone pigment, an anthraquinone pigment, a quinacridone pigment, a dioxane pigment, a thioindigo pigment, an isoindolinone pigment or a quinofranone pigment), a dye chelate (for example, a basic dye chelate or an acidic dye chelate), a nitro pigment, a nitroso pigment or aniline black.

More specifically, the inorganic pigments used for black include carbon blacks such as No. 2300, No. 900, MCF88, No. 33, No. 40, No. 45, No. 52, MA7, MA8, MA100 and No. 2200B manufactured by Mitsubishi Chemical Corporation, Raven 5750, Raven 5250, Raven 5000, Raven 3500, Raven 1255 and Raven 700 manufactured by Columbian Chemicals Company, Regal 400R, Regal 330R, Regal 660R, Mogul L, Monarch 700, Monarch 800, Monarch 880, Monarch 900, Monarch 1000, Monarch 1100, Monarch 1300 and Monarch 1400 manufactured by Cabot Corporation, and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 manufactured by Degussa Corporation. Further, as the organic pigments for black, there can be used black organic pigments such as aniline black (C.I. Pigment Black 1).

Still further, the organic pigments for yellow inks include C.I. Pigment Yellow 1 (Hansa Yellow), 2, 3 (Hansa Yellow 10G), 4, 5 (Hansa Yellow 5G), 6, 7, 10, 11, 12, 13, 14, 16, 17, 24 (Flavanthrone Yellow), 34, 35, 37, 53, 55, 65, 73, 74, 75, 81, 83, 93, 94, 95, 97, 98, 99, 108 (Anthrapyrimidine Yellow), 109, 110, 113, 117 (a copper complex salt), 120, 124, 128, 129, 133 (quinophthalone), 138, 139 (isoindolinone), 147, 151, 153 (a nickel complex pigment), 154, 167, 172 and 180. Yet still further, the organic pigments for magenta inks include C.I. Pigment Red 1 (Para Red), 2, 3 (Toluidine Red), 4, 5 (ITR Red), 6, 7, 8, 9, 10, 11, 12, 14, 15, 16, 17, 18, 19, 21, 22, 23, 30, 31, 32, 37, 38 (Pyrazolone Red), 40, 41, 42, 48 (Ca), 48 (Mn), 57 (Ca), 57:1, 88(thioindigo), 112 (naphthol AS series), 114(naphthol AS series), 122 (dimethylquinacridone), 123, 144, 146, 149, 150, 166, 168 (Anthoanthrone Orange), 170 (naphthol AS series), 171, 175, 176, 177, 178, 179 (Perylene Maroon), 184, 185, 187, 202, 209 (dichloroquinacridone), 219, 224 (perylene series) and 245 (naphthol AS series), and C.I. Pigment Violet 19 (quinacridone), 23 (Dioxazine Violet), 32, 33, 36, 38, 43 and 50. Furthermore, the organic pigments for cyan inks include C.I. Pigment Blue 1, 2, 3, 15, 15:1, 15:2, 15:3, 15:34, 15:4, 16 (nonmetal phthalocyanine), 18 (Alkali Blue Toner), 22, 25, 60 (Threne Blue), 65 (Violantrone) and 66 (indigo), and C.I. Vat Blue 4 and 60. In addition, as the organic pigments used for color inks other than magenta, cyan and yellow inks, there can be used C.I. Pigment Green 7 (Phthalocyanine Green), 10 (Green Gold), 36 and 37, C.I. Pigment Brawn 3, 5, 25 and 26, and C.I. Pigment Orange 1, 2, 5, 7, 13, 14, 15, 16, 24, 34, 36, 38, 40, 43 and 63. In the microencapsulated pigment according to the first invention, the above-mentioned pigments can be used either alone or as a combination of two or more thereof.

In the pigment having cationic groups on its surface, at least one aromatic group directly bonded to the pigment is substituted by at least one cationic group. The aromatic groups include an unsaturated cyclic hydrocarbon having one or a plurality of rings, which may be substituted or unsubstituted. The aromatic groups include an aryl group and a heteroaryl group, and preferred are a phenyl group and a naphthyl group. The cationic groups include an amine substituent group (a primary amine, a secondary amine or a tertiary amine), a quaternary ammonium group ($-NR_3^+$), a quaternary phosphonium group ($-PR_3^+$), a sulfonium group ($-SR_2^+$) and a pyridinium group, and preferred are a quaternary ammonium group, a quaternary phosphonium group and a sulfonium group. The pigment having cationic groups on its surface can be obtained by addition of the aromatic group to the above-mentioned pigment by diazotization using a diazonium salt and substitution with the cationic group. Specifically, the pigment is allowed to react with the diazonium salt in a liquid reaction medium, and at least one organic ionic group is bonded to the surface of the pigment, thereby being able to prepare the pigment having cationic groups on its surface. The diazonium salt may have the organic ionic group to be bonded to carbon black. The diazonium salt is an organic compound having one or a plurality of diazonium salts. The diazonium salt is typically produced by reacting a diazotizing agent (for example, any metal or an organic nitrite such as ammonium nitrite, butyl nitrite, dicyclohexylammonium nitrite, ethyl nitrite, isoamyl nitrite, lithium nitrite, sodium nitrite, potassium nitrite or zinc nitrite, including nitric acid, nitrogen oxide, nitrogen dioxide and a mixture thereof) with a treating agent/a reactant under appropriate conditions. The cation treating agent itself can contain the nitrite, and in this case, an acid is subsequently added to produce the diazonium salt. Accordingly, the treating agent can contain the diazotizing agent (for example, the nitrite) which can produce the diazonium salt by addition of an acid.

Methods for producing the pigment having cationic groups on its surface are described in WO96/18688, U.S. Pat. No. 5,554,739, WO96/18696, U.S. Pat. Nos. 5,851,280, 5,837, 045, 5,803,959, 5,672,198, 5,571,311, 5,630,868, 5,707,432, 5,803,959, 5,698,016 and 5,713,988, WO97/47697 and WO97/47699.

The pigments having cationic groups on their surfaces have been described above in detail. The average particle size of the pigment having cationic groups on its surface can be easily adjusted to 150 nm or less by the above-mentioned production methods. In particular, the average particle size of the pigment having cationic groups on its surface is more preferably from 20 nm to 80 nm, thereby being able to obtain the microencapsulated pigment which can more surely prepare the ink jet recording ink excellent in dispersion stability and ejection stability, and capable of increasing the print density of images. In this specification, the description of the average particle size is based on measurements by the laser light scattering method.

The pigment particles having cationic groups on their surfaces are coated with the polymer having repeating structural units derived from the anionic polymerizable surfactant having an anionic group, a hydrophobic group and a polymerizable group, thereby producing the microencapsulated pigment according to one embodiment of the first invention. Such a microencapsulated pigment can be suitably prepared by adding the anionic polymerizable surfactant to the aqueous dispersion of the pigment particles having cationic groups on their surfaces, followed by mixing, then, further adding the anionic polymerizable surfactant and/or hydrophilic monomer having an anionic group to achieve emulsification, and then, adding the polymerization initiator to perform polymerization in water, specifically emulsion polymerization, as described above.

Further, in another embodiment, the pigment particles having cationic groups on their surfaces are coated with the polymer having repeating structural units derived from the anionic polymerizable surfactant having an anionic group, a hydrophobic group and a polymerizable group, and repeating structural units derived from the cationic polymerizable surfactant having a cationic group, a hydrophobic group and a polymerizable group and/or cationic polymerizable hydrophilic monomer, thereby producing the microencapsulated pigment according to another embodiment of the first invention. Such a microencapsulated pigment can be prepared by adding the anionic polymerizable surfactant to the aqueous dispersion of the pigment particles having cationic groups on their surfaces, followed by mixing, then, adding the cationic polymerizable surfactant and/or cationic polymerizable hydrophilic monomer to achieve emulsification, and then, adding the polymerization initiator to perform polymerization in water, specifically emulsion polymerization, as described above.

Examples of the anionic polymerizable surfactants used in the first invention include anionic allyl derivatives as described in JP 49-46291 B, JP 1-24142 B and JP 62-104802 A, anionic propenyl derivatives as described in JP 62-221431 A, anionic acrylic acid derivatives as described in JP 62-34947 A and JP 55-11525 A, and anionic itaconic acid derivatives as described in JP 46-34898 B and JP 51-30284 A.

Specific examples of the anionic polymerizable surfactants used in the first invention include a compound represented by general formula (31):

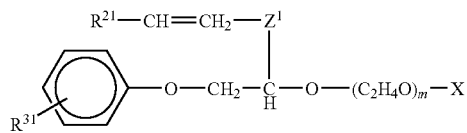
(31)

wherein $R^{21}$ and $R^{31}$ are each independently a hydrogen atom or a hydrocarbon group having 1 to 12 carbon atoms; $Z^1$ is a group represented by a carbon-carbon single bond or formula —CH$_2$—O—CH$_2$—; m is an integer of 2 to 20; and X is a group represented by formula —SO$_3$M$^1$, wherein M$^1$ is an alkali metal, an ammonium salt or an alkanolamine; and a compound represented by general formula (32):

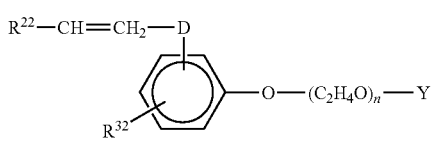
(32)

wherein $R^{22}$ and $R^{32}$ are each independently a hydrogen atom or a hydrocarbon group having 1 to 12 carbon atoms; D is a group represented by a carbon-carbon single bond or formula —CH$_2$—O—CH$_2$—; n is an integer of 2 to 20; and Y is a group represented by formula —SO$_3$M$^2$, wherein M$^2$ is an alkali metal, an ammonium salt or an alkanolamine.

The polymerizable surfactants represented by the above-mentioned formula (31) are described in JP 5-320276 A and JP 10-316909 A. By appropriately adjusting the kind of $R^{21}$ and the value of X in formula (31), it can be made in conformity with the degree of hydrophilicity or hydrophobicity of the surface of the pigment particle. Preferred examples of the polymerizable surfactants represented by formula (31) include a compound represented by the following formula (310), and specific examples thereof include compounds represented by the following formulas (31a) to (31d):

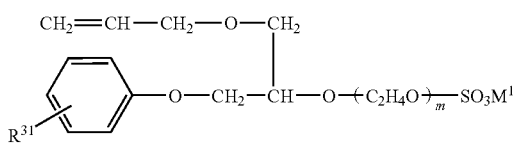
(310)

wherein $R^{31}$, m and M$^1$ have the same meanings as given for the compound represented by formula (31);

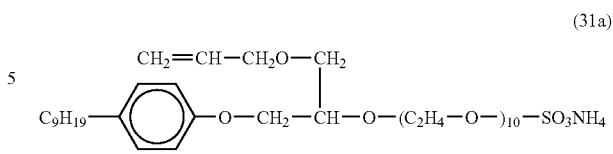
(31a)

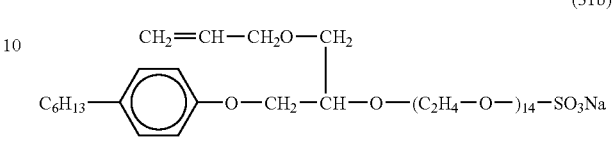
(31b)

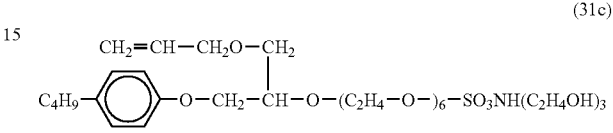
(31c)

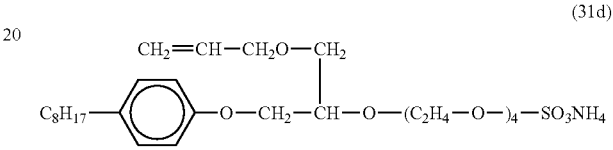
(31d)

As the above-mentioned anionic polymerizable surfactants, there can also be used commercially available products. Examples thereof include Aqualon HS series (Aqualon HS-05, HS-10, HS-20 and HS-1025) supplied from Daiichi Kogyo Yakuhin Co., Ltd.; and Adeka Reasoap SE-10N and SE-20N supplied from Asahi Denka Co., Ltd.

Adeka Reasoap SE-10N supplied from Asahi Denka Co., Ltd. is a compound in which M$^1$ is NH$_4$, $R^{31}$ is G$_9$H$_{19}$ and m is 10 in the compound represented by formula (310). Adeka Reasoap SE-20N supplied from Asahi Denka Co., Ltd. is a compound in which M$^1$ is NH$_4$, $R^{31}$ is G$_9$H$_{19}$ and m is 20 in the compound represented by formula (310).

Further, as the anionic polymerizable surfactants used in the first invention, preferred is, for example, a compound represented by general formula (33):

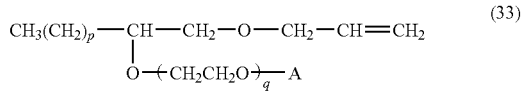
(33)

wherein p is 9 or 11; q is an integer of 2 to 20; and A is a group represented by —SO$_3$M$^3$, wherein M$^3$ is an alkali metal, an ammonium salt or an alkanolamine.

Preferred examples of the anionic polymerizable surfactants represented by formula (33) include the following compound:

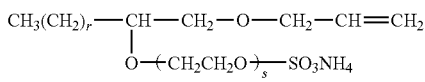

wherein r is 9 or 11; and s is 5 or 10.

As the above-mentioned anionic polymerizable surfactants, there can also be used commercially available products. Examples thereof include Aqualon KH series (Aqualon KH-5, Aqualon KH-10 and KH-20) supplied from Daiichi Kogyo Yakuhin Co., Ltd. Aqualon KH-5 is a mixture of a compound in which r is 9 and s is 5, and a compound in which r is 11 and s is 5, in the compound represented by the above-mentioned formula. Aqualon KH-10 is a mixture of a compound in which r is 9 and s is 10, and a compound in which r is 11 and s is 10, in the compound represented by the above-mentioned formula. Aqualon KH-20 is a mixture of a compound in which r is 9 and s is 20, and a compound in which r is 11 and s is 20, in the compound represented by the above-mentioned formula.

Further, a compound represented by the following formula (A) is also preferred as the anionic polymerizable surfactant.

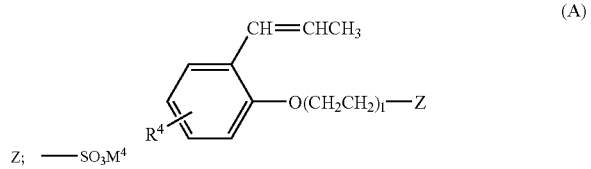

wherein $R^4$ represents a hydrogen atom or a hydrocarbon group having 1 to 12 carbon atoms; 1 represents a number of 2 to 20; and $M^4$ represents an alkali metal, an ammonium salt or an alkanolamine.

The anionic polymerizable surfactants exemplified above can be used either alone or as a mixture of two or more thereof.

The cationic group of the cationic polymerizable surfactant and/or cationic polymerizable hydrophilic monomer used in the first invention includes an amine substituent group (a primary amine, a secondary amine or a tertiary amine), a quaternary ammonium group, a quaternary phosphonium group, a sulfonium group and a pyridinium group. The hydrophobic group of the cationic polymerizable surfactant and/or cationic polymerizable hydrophilic monomer used in the first invention is preferably selected from the group consisting of an alkyl group, an aryl group and a combined group thereof. The polymerizable group of the cationic polymerizable surfactant and/or cationic polymerizable hydrophilic monomer used in the first invention is preferably an unsaturated hydrocarbon group, and more particularly, preferably one selected from the group consisting of a vinyl group, an allyl group, an acryloyl group, a methacryloyl group, a propenyl group, a vinylidene group and vinylene group. Of these, an acryloyl group and a methacryloyl group are can be particularly exemplified as preferred examples.

Examples of the cationic polymerizable surfactants and/or cationic polymerizable hydrophilic monomers used in the first invention include a cationic allylic acid derivative as described in JP 4-65824 B. Specific examples of the cationic polymerizable surfactants and/or cationic polymerizable hydrophilic monomers used in the first invention include methacrylic acid dimethylaminoethylmethyl chloride, methacrylic acid dimethylaminoethylbenzyl chloride, methacryloyloxyethyltrimethylammonium chloride, diallyldimethylammonium chloride and 2-hydroxy-3-methacryloxypropyltrimethylammonium chloride.

As the above-mentioned cationic polymerizable surfactant and/or cationic polymerizable hydrophilic monomer, there can also be used a commercially available product. Examples thereof include Acryester DMC (Mitsubishi Rayon Co., Ltd.), Acryester DML60 (Mitsubishi Rayon Co., Ltd.) and C-1615 (Daiichi Kogyo Yakuhin Co., Ltd.).

The cationic polymerizable surfactants and/or cationic polymerizable hydrophilic monomers exemplified above can be used either alone or as a mixture of two or more thereof.

In the production of the microencapsulated pigment of the first invention, the amount of the anionic polymerizable surfactant added in the process of ionically bonding the cationic group on the surface of the pigment particle having initial cationic groups on its surface to the anionic group of the anionic polymerizable surfactant is preferably within the range of 0.5 to 2 times the total molarity of the cationic groups converted from the amount of the pigment having cationic groups on its surface used (the weight of the pigment used [g]× the anionic group amount on the surface of the pigment [mol/g]), and more preferably within the range of 0.8 to 1.2 times the molarity thereof. By adjusting the amount added to 0.5 time the molarity or more, the anionic polymerizable surfactant is ionically strongly bonded to the pigment particle having cationic groups as the hydrophilic groups to make possible easy encapsulation. By adjusting the amount added to 2 times the molarity or less, the occurrence of the anionic polymerizable surfactant not adsorbed on the pigment particle can be reduced, and the occurrence of a polymer particle having no pigment particle as a core material (a particle comprising only the polymer) can be prevented.

In the production of the microencapsulated pigment of the first invention, the amount of the anionic polymerizable surfactant or cationic polymerizable surfactant added for introducing the anionic groups or cationic groups into the outermost shell of the encapsulated pigment, that is to say, the amount of the anionic polymerizable surfactant or cationic polymerizable surfactant and/or cationic polymerizable hydrophilic monomer added in the forming process of the micellar structure in which the ionic groups (anionic groups or cationic groups) are orientated toward the aqueous phase side is preferably within the range of about 1 to about 10 times the molarity of the anionic polymerizable surfactant initially added to the pigment particles having cationic groups on their surfaces, and more preferably within the range of about 1 to about 5 times the molarity thereof. By adjusting the amount added to 1 time the molarity or more, the dispersibility and dispersion stability of the encapsulated particles become excellent, and ejection stability also becomes excellent. By adjusting the amount added to 10 times the molarity or less, the occurrence of the hydrophilic monomer which makes no contribution to encapsulation can be inhibited, and the occurrence of a polymer particle having no core material other than the encapsulated particle can be prevented. When the anionic polymerizable surfactant and the hydrophilic monomer having an anionic group are used in combination, the total amount thereof added is preferably within the range of about 1 to about 10 times the molarity of the anionic polymerizable surfactant initially added to the pigment particles having cationic groups on their surfaces, and more preferably within the range of about 1 to about 5 times the molarity thereof. As described above, the dispersibility and dispersion stability of the encapsulated particles become excellent by adjusting the amount added to 1 time the molarity or more. By adjusting the amount added to 10 times the molarity or less, the occurrence of the hydrophilic monomer which makes no contribution to encapsulation can be inhibited, and the occurrence of a polymer particle having no core material other than the encapsulated particle can be prevented.

The hydrophilic monomer having an anionic group which can be used in the first invention can be suitably illustrated by at example of a monomer having at least an anionic group as a hydrophilic group and a polymerizable group in its structure, wherein the hydrophilic group is selected from the group consisting of a sulfonic group, a sulfinic group, a carboxyl group, a carbonyl group and salts of these groups. The polymerizable group is a radically polymerizable unsaturated hydrocarbon group, and preferably selected from the group consisting of a vinyl group, an allyl group, an acryloyl group, a methacryloyl group, a propenyl group, a vinylidene group and a vinylene group. The anionic groups such as a sulfonic group, a sulfinic group, a carboxyl group, a carbonyl group and salts of these groups are considered to exist on the capsule surface in the state in which they are orientated toward the aqueous phase side, whereby the dispersibility and dispersion stability of the encapsulated particles in the aqueous phase become excellent. Further, the above-mentioned anionic groups easily interact with various metal ions such as magnesium, calcium and aluminum, cationic starch, cationic polymers and cellulose fiber which are usually contained in plain paper.

When the microencapsulated pigment is prepared using the polymerizable monomer having an anionic group as the hydrophilic group and the ink jet recording ink using such a microencapsulated pigment as a colorant is ejected to the plain paper, the colorant is easy to stay in the vicinity of a landing position of the plain paper. Accordingly, high image density is obtained more reliably, and blurring can also be inhibited from occurring. Preferred specific examples of the anionic group-containing hydrophilic monomers include, for example, acrylic acid, methacrylic acid, a phosphoric acid group-containing (meth)acrylate, sodium vinylsulfonate, 2-sulfoethyl methacrylate and 2-acrylamido-2-methylpropanesulfonic acid.

More specifically, the microencapsulated pigment according to the embodiment of the first invention is suitably produced by the following procedures. (1) The anionic polymerizable surfactant is added to the dispersion in which the pigment having cationic groups on its surface is dispersed in water. The anionic group of the anionic polymerizable surfactant is adsorbed by the cationic group of the pigment having cationic groups on its surface herein to be ionically bonded thereto for stabilization. (2) The ionic copolymerizable surfactant (anionic polymerizable surfactant or cationic polymerizable surfactant) having an ionic group (anionic group or cationic group), a hydrophobic group and a polymerizable group, which is copolymerizable with this anionic polymerizable surfactant, and the polymerization initiator are added to perform polymerization in water, specifically emulsion polymerization. By such procedures, there can be suitably produced the microencapsulated pigment coated with the polymer having repeating structural units derived from the anionic polymerizable surfactant and repeating structural units derived from the ionic polymerizable surfactant (anionic polymerizable surfactant or cationic polymerizable surfactant).

For more details, (1) the anionic polymerizable surfactant is added to the dispersion in which the pigment having cationic groups on its surface is dispersed in water. The anionic group of the anionic polymerizable surfactant is adsorbed by the cationic group of the pigment having cationic groups on its surface herein to be ionically bonded thereto for stabilization. (2) To this anionic polymerizable surfactant, the anionic polymerizable surfactant having an anionic group, a hydrophobic group and a polymerizable group and/or hydrophilic monomer having an anionic group and the polymerization initiator are added to perform polymerization in water, specifically emulsion polymerization. By such procedures, there can be suitably produced the microencapsulated pigment coated with the polymer having repeating structural units derived from the anionic polymerizable surfactant and/or repeating structural units derived from the hydrophilic monomer having an anionic group. In another embodiment, (1) the anionic polymerizable surfactant is added to the dispersion in which the pigment having cationic groups on its surface is dispersed in water. The anionic group of the anionic polymerizable surfactant is adsorbed by the cationic group of the pigment having cationic groups on its surface herein to be ionically bonded thereto for stabilization. (2) To this anionic polymerizable surfactant, the cationic polymerizable surfactant having a cationic group, a hydrophobic group and a polymerizable group and/or the cationic polymerizable hydrophilic monomer and the polymerization initiator are added to perform polymerization in water, specifically emulsion polymerization. By such procedures, there can be suitably produced the microencapsulated pigment coated with the polymer having repeating structural units derived from the anionic polymerizable surfactant and repeating structural units derived from the cationic polymerizable surfactant and/or cationic polymerizable hydrophilic monomer.

Further, particularly, in order to control the fixability, abrasion resistance and solvent resistance of printed matter, and to control the storage stability of the ink, an additional comonomer may be added. The additional comonomers include a hydrophilic monomer (hydrophilic monomer other than the above-mentioned hydrophilic monomer having an anionic group) and a hydrophobic monomer.

In particular, it is possible to control the fixability and abrasion resistance of printed matter by adjusting the glass transition point (Tg) of the copolymer with which the pigment particles of the microencapsulated pigment according to the first invention are coated. When the ink using the microencapsulated pigment of the first invention is printed on a recording medium such as the plain paper or an exclusive medium for ink jet recording at room temperature, an aqueous medium (comprising water and/or a water-soluble organic solvent) existing around the microencapsulated pigment particles of the first invention penetrates into the recording medium such as the plain paper or the exclusive medium for ink jet recording to be eliminated from the vicinity of the microencapsulated pigment particles, which causes the microencapsulated pigment particles to come close to one another. In that case, when the glass transition temperature (Tg) of the copolymer with which the pigment particles of the microencapsulated pigment are coated is equal to or lower than room temperature, the copolymer with which the pigment particles of the microencapsulated pigment are coated is fusion bonded to form a film with the pigment encapsulated inside (included) by capillary pressure generated in the clearance between the microencapsulated pigment particles. Accordingly, the fixability and abrasion resistance of images can be particularly improved.

In general, when a solid polymer, particularly an amorphous solid polymer, is elevated in temperature from low temperature to thigh temperature, the phenomenon occurs that a state in which very large force is required for slight deformation (glass state) is rapidly changed to a state in which large deformation occurs by small force. The temperature at which this phenomenon occurs is called the glass transition point (or the glass transition temperature). Usually, in a differential thermal curve obtained by temperature rise measurement with a differential scanning calorimeter, the temperature at an intersection of a tangential line drawn from a bottom of an adsorption peak to an initiation point of adsorption and a base line is taken as the glass transition point. Further, it is known that other physical properties such as the elastic modulus, the specific heat and the refractive index also rapidly change at the glass transition point, and it is known that the glass transition point is also determined by measuring these physical properties. In the first invention, the glass transition point obtained by the temperature rise measurement with the differential scanning calorimeter (DSC) has been used. When the ink using the microencapsulated pigment of the first invention is printed on the recording medium such as the plain paper or the exclusive medium for ink jet recording, in order to more preferably perform film formation at room temperature in the microencapsulated pigment of the first invention, the glass transition point (Tg) of the copolymer with which the pigment particles of the microencapsulated pigment are coated is preferably 30° C. or lower, more preferably 15° C. or lower, and still more preferably 10° C. or lower. It is therefore preferred that the copolymer with which the pigment particles of the microencapsulated pigment is designed so as to provide a glass transition point of 30° C. or lower. More preferably, the copolymer is designed so as to provide a glass transition point of 15° C. or lower, and still more preferably, 10° C. or lower. However, when the glass transition point is lower than −20° C., solvent resistance tends to decrease. Such a glass transition point of the copolymer can be adjusted within the above-mentioned range by suitably selecting the kind and composition ratio of hydrophobic monomer used. When it is possible to heat the printed matter at a temperature equal to or higher than the glass transition point (Tg) of the copolymer with which the pigment particles of the microencapsulated pigment are coated, the glass transition point may exceed 30° C., because film formation is possible when the glass transition point is equal to or lower than the heating temperature. However, in this case, a heating mechanism is required to be attached to an ink jet recording equipment, which causes the problem of increased cost of the equipment. Accordingly, the glass transition point is preferably adjusted to 30° C. or lower.

The hydrophilic monomers other than aqueous monomers include a monomer having a hydroxyl group, an ethylene oxide group, an amido group or an amino group as the hydrophilic group. These groups are considered to exist on the capsule surface in the state in which they are orientated toward the aqueous phase side, together with the ionic group (anionic group or cationic group), and easily form hydrogen bonds with OH groups of cellulose fiber of paper. Accordingly, the ink jet recording ink using as a colorant the microencapsulated pigment obtained by the use in combination with the hydrophilic monomer having a hydrophilic group becomes easy to stay in the vicinity of a landing position and in the vicinity of the paper surface, because the microencapsulated pigment becomes easier to be adsorbed on the cellulose fiber of the plain paper. This further increases image density, and can also inhibit the occurrence of blurring. The hydrophilic monomers other than the hydrophilic monomer having an anionic group include The above-mentioned hydrophilic monomers include OH-group-containing monomers such as 2-hydroxyethyl methacrylate, 2-hydroxypropyl methacrylate and 2-hydroxybutyl methacrylate; ethylene oxide group-containing monomers such as ethyldiethylene glycol acrylate, polyethylene glycol monomethacrylate and methoxypolyethylene glycol methacrylate; amido group-containing monomers such as acrylamide and N,N-dimethylacrylamide, amino group-containing alkylamino esters of acrylic acid or methacrylic acid such as N-methylaminoethyl methacrylate, N-methylaminoethyl acrylate, dimethylaminoethyl methacrylate, dimethylaminoethyl acrylate, diethylaminoethyl methacrylate and diethylaminoethyl methacrylate; alkylamino group-containing unsaturated amides such as N-(2-dimethylaminoethyl)acrylamide, N-(2-dimethylaminoethyl)methacrylamide and N,N-dimethylaminopropylacrylamide; monovinylpyridines such as vinylpyridine; alkylamino group-containing vinyl ethers such as dimethylaminoethyl vinyl ether; vinylimidazole; and N-vinyl-2-pyrrolidone.

In order to satisfy required characteristics such as the fixability, abrasion resistance, water resistance and solvent resistance of the printed matter, the hydrophobic monomer can be suitably used. That is to say, in the microencapsulated pigment according to the first invention, the pigment particle having cationic groups on its surface may further have repeating structural units derived from the anionic polymerizable surfactant having at least an anionic group, a hydrophobic group and a polymerizable group, and repeating structural units derived from the hydrophobic monomer. As the hydrophobic monomer, there can be exemplified a monomer having at least a hydrophobic group and a polymerizable group in its structure, wherein the hydrophobic group is selected from the group consisting of an aliphatic hydrocarbon group, an alicyclic hydrocarbon group and an aromatic hydrocarbon group. The aliphatic hydrocarbon groups include a methyl group, an ethyl group and a propyl group, the alicyclic hydrocarbon groups include a cyclohexyl group, a dicyclopentenyl group, a dicyclopentanyl group and an isobornyl group, and the aromatic hydrocarbon groups include a benzyl group, a phenyl group and a naphthyl group. The polymerizable group is a radically polymerizable unsaturated hydrocarbon group, and preferably selected from the group consisting of a vinyl group, an allyl group, an acryloyl group, a methacryloyl group, a propenyl group, a vinylidene group and a vinylene group. Specific examples of the hydrophobic monomers include styrene derivatives such as styrene, methylstyrene, dimethylstyrene, chlorostyrene, dichlorostyrene, bromostyrene, p-chloromethylstyrene and divinylbenzene; monofunctional acrylic esters such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate and isobornyl acrylate; monofunctional methacrylic esters such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate and isobornyl methacrylate; allyl compounds such as allylbenzene, allyl-3-cyclohexane propionate, 1-allyl-3,4-dimethoxybenzene, allyl phenoxyacetate, allyl phenylacetate, allylcyclohexane and an allyl multivalent carboxylate; esters of fumaric acid, maleic acid and itaconic acid; and radically polymerizable group-containing monomers such as an N-substituted maleimide and a cyclic olefin. As the hydrophobic monomer, one satisfying the above-mentioned required characteristics is appropriately selected, and the amount thereof added is arbitrarily determined.

Further, it is also preferred that the polymer with which the pigment particles are coated further has repeating structural units derived from the crosslinkable monomer. The polymer has repeating structural units derived from the crosslinkable monomer, thereby forming a crosslinked structure in the polymer, which can improve solvent resistance (the characteristic that the solvent contained in the ink jet recording ink is difficult to penetrate into the polymer with which the pigment particles are coated). When the solvent penetrates into the polymer with which the pigment particles are coated, the polymer is swelled or deformed to disturb the orientation state of the anionic groups of the pigment particles orientated toward the aqueous medium side, resulting in a tendency to deteriorate the dispersion stability of the microencapsulated pigment. In contrast, the formation of the crosslinked structure in the polymer with which the pigment particles are coated improves the solvent resistance of the microencapsulated pigment, resulting in more excellent dispersion stability in the ink composition in which the water-soluble organic solvent coexists.

The crosslinkable monomer which can be used in the first invention is a compound having two or more of unsaturated hydrocarbon groups of at least one kind selected from the group consisting of a vinyl group, an allyl group, an acryloyl group, a methacryloyl group, a propenyl group, a vinylidene group and a vinylene group. Examples thereof include ethylene glycol diacrylate, diethylene glycol diacrylate, triethylene glycol diacrylate, tetraethylene glycol diacrylate, polyethylene glycol diacrylate, allyl acrylate, bis(acryloxyethyl) hydroxyethyl isocyanurate, bis(acryloxyneopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxydiethoxy)phenyl]propane, 2,2-bis[4-(acryloxyethoxypolyethoxy)phenyl]propane, hydroxypivalic acid neopentyl glycol diacrylate, 1,4-butanediol diacrylate, dicyclopentanyl diacrylate, dipentaerythritol hexaacrylate, dipentaerythritol monohydroxypentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol mono-hydroxypentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl)isocyanurate, allyl methacrylate, divinylbenzene, diallyl phthalate, diallyl terephthalate, diallyl isophthalate and diethylene glycol bis-allylcarbonate.

In addition, it is preferred that the polymer with which the pigment particles are coated further has repeating structural units derived from a monomer represented by the following general formula (1):

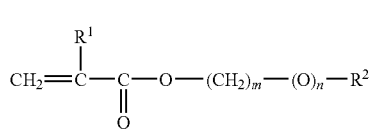

(1)

wherein $R^1$ represents a hydrogen atom or a methyl group, $R^2$ represents a t-butyl group, an alicyclic hydrocarbon group, an aromatic hydrocarbon group or a heterocyclic group, m represents an integer of 0 to 3, and n represents an integer of 0 or 1.

The above-mentioned $R^2$ group contained in the polymer, which is a "bulky" group derived from the monomer represented by general formula (1), decreases the flexibility of a molecule of the polymer, that is to say, restrains the movability of the molecule. Accordingly, the mechanical strength and heat resistance of the polymer are improved, so that the use of the ink using the microencapsulated pigment of this embodiment coated with the polymer can provide printed mater having excellent weather resistance and durability. Further, the existence of the above-mentioned $R^2$ group, the "bulky" group, in the polymer can inhibit penetration of the organic solvent into the polymer, so that the microencapsulated pigment of this embodiment becomes excellent in solvent resistance, and stabler ejection properties, dispersibility and long-term storage stability can be obtained in the ink composition in which the water-soluble organic solvent coexists. In the above-mentioned general formula (1), the alicyclic hydrocarbon groups represented by $R^2$ include a cycloalkyl group, a cycloalkenyl group, an isobornyl group, a dicyclopentanyl group, a dicyclopentenyl group, an adamantane group and a tetrahydrofuran group.

As described above, the polymer having repeating structural units derived from the crosslinkable monomer and the polymer having repeating structural units derived from the monomer represented by general formula (1) have the advantages of high Tg and excellent mechanical strength, heat resistance and solvent resistance. However, the microencapsulated pigment coated with such a polymer becomes insufficient in plasticity of the polymer, which is liable to cause poor adhesion with the recording medium. As a result, the fixability and abrasion resistance of the microencapsulated pigment to the recording medium are deteriorated in some cases. On the other hand, the polymer having repeating structural units derived from a monomer having a long-chain alkyl group, of the above-mentioned hydrophobic monomers, has flexibility. Accordingly, the polymer having mechanical strength and solvent resistance of such a degree that the plasticity is not impaired can be obtained by adjusting the ratio of repeating structural units derived from the crosslinkable monomer and/or repeating structural units derived from the monomer represented by general formula (1) to repeating structural units derived from the monomer having a long-chain alkyl group. The microencapsulated pigment coated with such a polymer is easily adhered to the recording medium, so that it is excellent in fixability and also in solvent resistance. Accordingly, the ink using this microencapsulated pigment can provide excellent ejection stability, dispersion stability and long-term storage stability, also in the ink composition in which the water-soluble organic solvent coexists. Further, the use of the ink using this microencapsulated pigment can provide the printed matter good in fixability and excellent in abrasion resistance, durability and solvent resistance.

Furthermore, specific examples of the monomers represented by the above-mentioned general formula (1) include the following:

Isobonyl Methacrylate

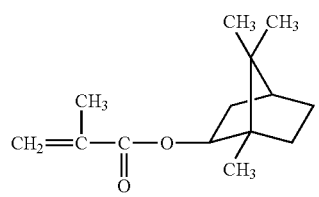

Weather resistance
Homopolymer, Tg: 155° C.
(180° C.)

Isobonyl Acrylate

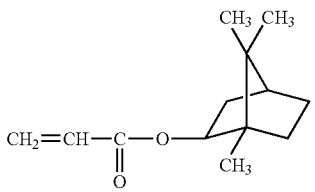

Weather resistance
Homopolymer, Tg: 94° C.

Dicyclopentenyl Acrylate

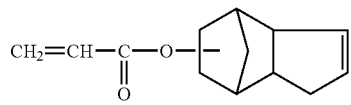

Imparting adhesion to an
acrylic resin
Homopolymer, Tg: 120° C.

Dicyclopentenyl Methacrylate

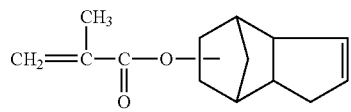

Chemical resistance

Dicyclopentenyloxyethyl Acrylate

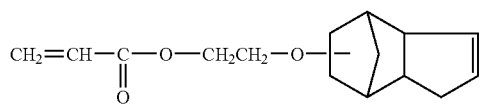

Imparting adhesion

Dicyclopentanyl Acrylate

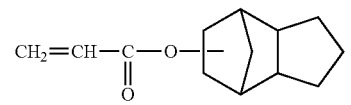

Low moisture absorption
Weather resistance
Homopolymer, Tg: 120° C.

Dicyclopentenyloxyethyl Methacrylate

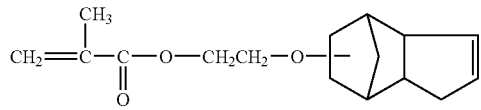

Chemical resistance

Cyclopentanyl Methacrylate

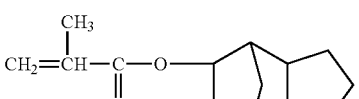

Low moisture absorption
Weather resistance
Homopolymer, Tg: 175° C.

t-Butyl Methacrylate

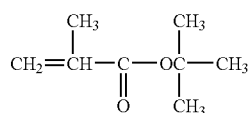

Homopolymer, Tg: 107° C.

Benzyl Methacrylate

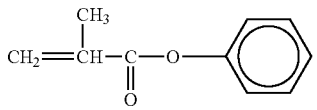

Homopolymer, Tg: 54° C.

Cyclohexyl Methacrylate

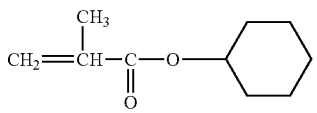

Homopolymer, Tg: 66° C.

Tetrahydrofurfuryl Methacrylate

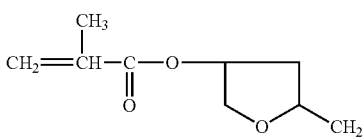

Homopolymer, Tg: 60° C.

Copolymerization of the anionic polymerizable surfactant with the anionic polymerizable surfactant and/or hydrophilic monomer having an anionic group or a cationic polymerizable surfactant and/or a cationic polymerizable hydrophilic monomer, or further, copolymerization with, in addition to these, the hydrophobic monomer, the crosslinkable monomer or the monomer represented by the above-mentioned general formula (1) is initiated by addition of the polymerization initiator. As such a polymerization initiator, preferred is a water-soluble polymerization initiator, which includes potassium persulfate, ammonium persulfate, sodium persulfate, 2,2-azobis(2-methylpropionamidine)dihydrochloride and 4,4-azobis(4-cyanovaleric acid).

Then, the production of the microencapsulated pigment according to the embodiment of the first invention can be suitably performed by adding the above-mentioned anionic polymerizable surfactant to the aqueous dispersion of the pigment particles having cationic groups as the hydrophilic groups on their surfaces, adding water or water and the aqueous solvent as needed, followed by mixing, performing irradiation with an ultrasonic wave for a specified period of time, then, adding the ionic polymerizable surfactant and/or ionic hydrophilic monomer (the anionic polymerizable surfactant or the cationic polymerizable surfactant and/or cationic polymerizable hydrophilic monomer), adding, in addition to these, the above-mentioned hydrophobic monomer, crosslinkable monomer or monomer represented by general formula (1) as needed, further adding water as needed, performing irradiation with an ultrasonic wave again for a specified period of time to achieve dispersion, elevating the temperature to a specified temperature (a temperature at which the polymerization initiator is activated) while performing ultrasonic wave irradiation and stirring, adding the polymerization initiator, and activating the polymerization initiator to perform polymerization in water.

When the above-mentioned hydrophobic monomer is used, more specifically, the production of the encapsulated pigment comprises the steps of adding the anionic polymerizable surfactant having an anionic group, a hydrophobic group and a polymerizable group to the aqueous dispersion of the above-mentioned pigment particles having cationic groups on their surfaces, followed by mixing and performing ultrasonic irradiation treatment, adding the hydrophobic monomer, followed by mixing, adding the ionic polymerizable surfactant and/or ionic hydrophilic monomer (the anionic polymerizable surfactant or the cationic polymerizable surfactant and/or cationic polymerizable hydrophilic monomer), followed by mixing and performing ultrasonic irradiation treatment, and adding the polymerization initiator to perform polymerization in water, and the microencapsulated pigment can be suitably produced by performing the steps in the above-mentioned order.

When the above-mentioned crosslinkable monomer and/or monomer represented by general formula (1) are used, more specifically, the production of the encapsulated pigment comprises the steps of adding the anionic polymerizable surfactant having an anionic group, a hydrophobic group and a polymerizable group to the aqueous dispersion of the above-mentioned pigment particles having cationic groups on their surfaces, followed by mixing and performing ultrasonic irradiation treatment, adding the crosslinkable monomer and/or monomer represented by general formula (1), followed by mixing, adding the ionic polymerizable surfactant and/or ionic polymerizable hydrophilic monomer (the anionic polymerizable surfactant or the cationic polymerizable surfactant and/or cationic polymerizable hydrophilic monomer), followed by mixing and performing ultrasonic irradiation treatment, and adding the polymerization initiator to perform polymerization, and the microencapsulated pigment can be suitably produced by performing the steps in the above-mentioned order. Furthermore, when the above-mentioned crosslinkable monomer and/or monomer represented by general formula (1) and the hydrophobic monomer are used, more specifically, the production of the encapsulated pigment comprises the steps of adding the anionic polymerizable surfactant having an anionic group, a hydrophobic group and a polymerizable group to the aqueous dispersion of the above-mentioned pigment particles having cationic groups on their surfaces, followed by mixing and performing ultrasonic irradiation treatment, adding the crosslinkable monomer and/or monomer represented by general formula (1) and the monomer having a long-chain alkyl group, followed by mixing, adding the ionic polymerizable surfactant and/or ionic polymerizable hydrophilic monomer (the anionic polymerizable surfactant or the cationic polymerizable surfactant and/or cationic polymerizable hydrophilic monomer), followed by mixing and performing ultrasonic irradiation treatment, and adding the polymerization initiator to perform polymerization, and the microencapsulated pigment can be suitably produced by performing the steps in the above-mentioned order.

According to emulsion polymerization which is polymerization in water concerning the first invention, the anionic polymerizable surfactant is first allowed to be adsorbed by the cationic group on the surface of the pigment particle having cationic groups on its surface, then, the hydrophobic monomer is added, and further, the ionic polymerizable surfactant and/or ionic polymerizable hydrophilic monomer (the anionic polymerizable surfactant or the cationic polymerizable surfactant and/or cationic polymerizable hydrophilic monomer) are added, followed by performing ultrasonic irradiation treatment, thereby forming the state in which the form of arrangement of the polymerizable surfactants and monomer existing around the pigment particle is extremely highly controlled and the ionic groups (anionic groups or cationic groups) are orientated toward the aqueous phase in the outermost shell. Then, the monomer is converted to the polymer as this highly controlled form is kept, thereby obtaining the microencapsulated pigment according to the embodiment of the first invention. According to the above-mentioned process, the generation of water-soluble oligomers and polymers which are by-products can be decreased. This can reduce the viscosity of the dispersion of the resulting microencapsulated pigment, and make easier a purification process such as ultrafiltration. The ink using such a microencapsulated pigment is excellent in dispersion stability and ejection stability from a recording head, hard to blur to the plain paper, and can provide printed images high in color development and density.

For the polymerization reaction, a reaction vessel equipped with an ultrasonic generator, a stirrer, a reflux condenser, a dropping funnel, and a temperature controller is preferably used.

The polymerization reaction is initiated by elevating the temperature of the water-soluble polymerization initiator added to the reaction system to the cleavage temperature thereof, thereby cleaving the polymerization initiator to generate an initiator radical, which attacks the unsaturated group of the polymerizable surfactant or the monomer. The polymerization initiator is preferably added to the reaction system by dropping an aqueous solution of the water-soluble polymerization initiator in pure water into the reaction vessel. The polymerization initiator in the reaction system can be suitably activated by elevating the temperature of the aqueous dispersion to a specified polymerization temperature. The polymerization temperature is preferably within the range of 60° C. to 90° C., and the polymerization time is preferably from 3 hours to 10 hours. After the termination of the polymerization, the pH is adjusted, and then, filtration is preferably performed. When the pigment particles having cationic groups as the hydrophilic groups on their surfaces are not in the state of the aqueous dispersion, dispersion treatment is preferably performed as pretreatment using a general dispersing device such as a ball mill, a roll mill, an Eiger mill or a jet mill.

In the microencapsulated pigment according to the embodiment of the first invention obtained as described above, it is considered that the small-sized pigment particles which are of the self dispersion type and exist in water in a good dispersed state are completely coated with the polymer layer (without any defect portion), and that the ionic groups (anionic groups or cationic groups) are regularly orientated toward the aqueous solvent in the uppermost layer of the capsule (see FIGS. 2 and 4). Accordingly, the pigment has high dispersion stability to the aqueous solvent, and the low-viscosity dispersion can be obtained.

Although the microencapsulated pigment according to the embodiment of the first invention is described above, the particle size of the microencapsulated pigment is preferably 400 nm or less, more preferably 300 nm or less, and particularly preferably from 20 to 200 nm.

Aqueous Dispersion

The aqueous dispersion according to an embodiment of the first invention contains the microencapsulated pigment according to the embodiment of the first invention, and as such an aqueous dispersion, there can be suitably exemplified the solution after emulsion polymerization described in the above-mentioned embodiment of the first invention. Other compounding components for obtaining the ink jet recording ink are further normally added to the aqueous dispersion, thereby being able to prepare the ink jet recording ink according to an embodiment of the first invention.

The aqueous dispersion according to the embodiment of the first invention is preferably purified by ultrafiltration, centrifugal filtration or the like. As described above, the aqueous dispersion according to the embodiment of the first invention is purified to reduce the concentration of unreacted materials derived from the components constituting the coating polymer of the above-mentioned microencapsulated pigment, whereby the use of the ink jet recording ink according to the embodiment of the first invention on the plain paper can more increase the print density, and also inhibit the occurrence of blurring in images, while inducing no decrease in chroma saturation of the images and providing good chroma saturation. Further, when it is used on exclusive media for ink jet recording, particularly on glossy media for ink jet recording, good glossiness is obtained. In particular, when the glass transition temperature of the coating polymer of the above-mentioned microencapsulated pigment is 30° C. or lower, preferably 15° C. or lower, and more preferably 10° C. or lower, there is the advantage that images having more excellent glossiness, high chroma saturation and excellent sharpness are obtained.

Ink Jet Recording Ink

The ink jet recording ink according to the embodiment of the first invention contains the aqueous dispersion, as described above. Further, the ink jet recording ink according to another embodiment of the first invention contains at least the microencapsulated pigment according to the embodiment of the invention and water. The content of the microencapsulated pigment is preferably from 1 to 20% by weight, and more preferably from 3 to 15% by weight, based on the total weight of the ink jet recording ink. In particular, in order to obtain high print density and high color developability, it is preferably from 5 to 15% by weight.

Further, a solvent for the ink jet recording ink according to the embodiment of the first invention preferably contains water and a water-soluble organic solvent as basic solvents, and can contain any other components as needed. The water-soluble organic solvents include an alkyl alcohol having 1 to 4 carbon atoms such as ethanol, methanol, butanol, propanol or isopropanol, a glycol ether such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-i-propyl ether, diethylene glycol mono-i-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-i-propyl ether, dipropylene glycol monomethyl ether, dipropylene glycol monoethyl ether, dipropylene glycol mono-n-propyl ether, dipropylene glycol mono-i-propyl ether, propylene glycol mono-n-butyl ether or dipropylene glycol mono-n-butyl ether, formamide, acetamide, dimethylsulfoxide, sorbit, sorbitan, acetin, diacetin, triacetin and sulfolane.

Further, the ink jet recording ink according to an embodiment of the first invention preferably contains a wetting agent comprising a high boiling water-soluble organic solvent as a water-soluble organic solvent, in order to impart water retentivity and wetting properties to the ink jet recording ink. As such a high boiling water-soluble organic solvent, there can be exemplified a high boiling water-soluble organic solvent having a boiling point of 180° C. or higher.

Specific examples of the water-soluble organic solvents having a boiling point of 180° C. or higher include ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycol having a molecular weight of 2,000 or less, 1,3-propylene glycol, isopropylene glycol, isobutylene glycol, 1,4-butanediol, 1,3-butanediol, 1,5-pentanediol, 1,6-hexanediol, glycerol, mesoerythritol and pentaerythritol. The high boiling water-soluble organic solvent having a boiling point of 200° C. or higher is preferred. These can be used either alone or as a mixture of two or more thereof. This can provide the ink jet recording ink which retains flowability and re-dispersibility for a long period of time even when it is allowed to stand in an open state (a state in which the ink is in contact with air at room temperature). Further, clogging of nozzles becomes hard to occur during printing or on restarting after the interruption of printing, so that high ejection stability is obtained. The content of the water-soluble organic solvent is preferably from about 10 to about 50% by weight, and more preferably from 10 to 30% by weight, based on the total weight of the ink jet recording ink.

In particular, in an embodiment of the first invention, inclusion of glycerol can sufficiently secure the clogging reliability and storage stability of the ink.

Further, the water-soluble organic solvents include polar solvents such as 2-pyrrolidone, N-methylpyrrolidone, ε-caprolactam, dimethyl sulfoxide, sulfolane, morpholine, N-ethylmorpholine and 1,3-dimethyl-2-imidazolidinone, and one or more may be selected therefrom to use. Addition of these polar solvents is effective for dispersibility, and can improve ejection stability of the ink. The content of these polar solvents is preferably from 0.1 to 20% by weight, and more preferably from 1 to 10% by weight, based on the total weight of the ink jet recording ink.

In order to accelerate penetration of the aqueous solvent into the recording medium, it is preferred that the ink jet recording ink according to an embodiment of the first invention contains a penetrant. Prompt penetration of the aqueous solvent into the recording medium can surely provide recorded matter having images with less blurring. As such penetrants, there are preferably used an alkyl ether of a polyhydric alcohol (also referred to as a glycol ether) and a 1,2-alkyldiol. Inclusion of one or more compounds selected from the group consisting of an alkyl ether of a polyhydric alcohol and a 1,2-alkyldiol can enhance the permeability of ink solvent components into the recording medium, so that blurring in images dramatically decreases even in printing on the plain paper or recycled paper, coupled with the effect of the microencapsulated pigment according to the embodiment of the first invention, which causes print quality to be remarkably improved. The alkyl ethers of polyhydric alcohols include, for example, ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-i-propyl ether, diethylene glycol mono-i-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-i-propyl ether, dipropylene glycol monomethyl ether, dipropylene glycol monoethyl ether, dipropylene glycol mono-n-propyl ether, dipropylene glycol mono-i-propyl ether, propylene glycol mono-n-butyl ether and dipropylene glycol mono-n-butyl ether. The 1,2-alkyldiols include, for example, 1,2-pentanediol and 1,2-hexanediol. Besides, the penetrant may be selected from diols of straight-chain hydrocarbons such as 1,3-propanediol, 1,4-butanediol, 1,5-pentanediol, 1,6-hexanediol, 1,7-heptanediol and 1,8-octanediol. In an embodiment of the first invention, propylene glycol monobutyl ether, dipropylene glycol monobutyl ether, diethylene glycol monobutyl ether, triethylene glycol monobutyl ether, 1,2-pentanediol and 1,2-hexanediol are particularly preferred. The total content of these penetrants is preferably from 1 to 20% by weight, and more preferably from 1 to 10% by weight, based on the total weight of the ink jet recording ink. In particular, the use of the 1,2-alkyldiol such as 1,2-pentanediol or 1,2-hexanediol remarkably improves drying properties after printing, and blurring.

Further, it is preferred that the ink jet recording ink according to an embodiment of the first invention contains a surfactant, particularly an anionic surfactant and/or a nonionic surfactant. Specific examples of the anionic surfactants include sulfonic acid type surfactants such as an alkanesulfonate, an α-olefinsulfonate, an alkylbenzenesulfonate, an alkylnaphthalenesulfonic acid, an acylmethyltaurine acid and a dialkylsulfosuccinic acid; an alkylsulfuric ester salt, a sulfated oil, a sulfated olefin, a polyoxyethylene alkyl ether sulfuric ester salt; carboxylic acid type surfactants such as a fatty acid salt and an alkylsarcosine salt; and phosphoric ester type surfactants such as an alkylphosphoric ester salt, a polyoxyethylene alkyl ether phosphoric ester salt and a monoglyceride phosphoric ester salt. Further, specific examples of the nonionic surfactants include ethylene oxide addition type surfactants such as a polyoxyethylene alkyl ether, a polyoxyethylene alkyl phenyl ether, a polyoxyethylene alkyl ester and a polyoxyethylene alkylamide; polyol ester type surfactants such as a glycerol alkyl ester, a sorbitan alkyl ester and a sugar alkyl ester; polyether type surfactants such as a polyhydric alcohol alkyl ether; and alkanolamide type surfactants such as an alkanolamine fatty acid amide. More specifically, the anionic surfactants include sodium dodecylbenzenesulfonate, sodium laurate and an ammonium salt of a polyoxyethylene alkyl ether sulfate. Specific examples of the nonionic surfactants include ether surfactants such as polyoxyethylene nonyl phenyl ether, polyoxyethylene octyl phenyl ether, polyoxyethylene dodecyl phenyl ether, a polyoxyethylene alkyl allyl ether, polyoxyethylene oleyl ether, polyoxyethylene lauryl ether, a polyoxyethylene alkyl ether and a polyoxyalkylene alkyl ether; and ester surfactants such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate and polyoxyethylene stearate.

In particular, it is desirable that the ink jet recording ink according to an embodiment of the first invention contains an acetylene glycol-based surfactant and/or an acetylene alcohol-based surfactant. This can enhance the permeability of the aqueous solvent constituting the ink into the recording medium, and print with little blurring can be expected in various recording media. Preferred specific examples of the acetylene glycol compounds used in the first invention include 2,4,7,9-tetramethyl-5-decyne-4,7-diol, 3,6-dimethyl-4-octyne-3,6-diol and 3,5-dimethyl-1-hexyne-3-ol. It is also possible to utilize commercial products commercially available as the acetylene glycol-based surfactants. Specific examples thereof include Surfynol 104, 82, 465, 485 and TG (manufactured by Air Products and Chemicals, Inc.), and Olfine STG and Olfine E1010 (manufactured by Nissin Chemical Industry Co., Ltd.). The acetylene alcohol-based surfactants include Surfynol 61 (manufactured by Air Products and Chemicals, Inc.). The content of these surfactants is preferably from 0.01 to 10% by weight, and more preferably from 0.1 to 5% by weight, based on the total weight of the ink jet recording ink.

Further, when the above-mentioned glycol ether is used, the acetylene glycol compound is preferably used in combination therewith as the surfactant.

The ink jet recording ink according to an embodiment of the first invention can further contain fine polymer particles. Such fine polymer particles preferably have ionic groups on their surfaces, a glass transition temperature of 30° C. or lower and a volume average particle size of 10 to 200 nm, the ionic groups on the surfaces of the particles being the same kind as the ionic group on the surface of the above-mentioned microencapsulated pigment.

As described above, the microencapsulated pigment coated with the polymer having repeating structural units derived from the crosslinkable monomer and/or polymer having repeating structural units derived from the monomer represented by general formula (1) has high mechanical strength, heat resistance and solvent resistance, but becomes insufficient in plasticity of the polymer, which tends to cause decreased fixability and abrasion resistance to the recording medium. However, according to the ink jet recording ink containing the microencapsulated pigment coated with such a polymer insufficient in plasticity and the above-mentioned fine polymer particles, the microencapsulated pigment can be coated with the fine polymer particles on the recording medium, when the fine polymer particles have film forming properties. In particular, when the polymer with which the pigment is coated has the crosslinked structure and/or "bulky" group, the ink jet recording ink can be obtained in which the advantages caused by the above-mentioned crosslinked structure and/or "bulky" group are compatible with fixability and abrasion resistance.

The film forming properties as used herein means that when the fine polymer particles are dispersed in water to form an aqueous emulsion, a film of the polymer is formed with evaporation of the water component of this aqueous emulsion. The ink composition of the first invention containing the fine polymer particles has the property that the film of the polymer is similarly formed with evaporation of the solvent components thereof. This film of the polymer can fix the microencapsulated pigment in the ink more firmly to the surface of the recording medium. This can realize images having more excellent abrasion resistance and water resistance. In order to impart film forming properties to the above-mentioned fine polymer particles, the glass transition point of the polymer of the fine polymer particles is preferably 30° C. or lower, more preferably 15° C. or lower, and still more preferably 10° C. or lower. When the ink containing the fine polymer particles and using the microencapsulated pigment of the first invention is printed on the recording medium such as the plain paper or the exclusive medium for ink jet recording, the aqueous medium (comprising water and/or the water-soluble organic solvent) existing around the microencapsulated pigment particles of the first invention and the fine polymer particles penetrates into the recording medium such as the plain paper or the exclusive medium for ink jet recording to be eliminated from the vicinity of these particles, which causes these particles to come close to one another. Thus, the fine polymer particles and/or polymer coatings of the microencapsulated pigment particles and/or fine polymer particles and the polymer coatings of the microencapsulated pigment particles are fusion bonded. This forms the state in which the pigment particles are included inside (encapsulated) with the polymer, so that the fixability and abrasion resistance of images can be particularly improved. Considering easiness to fusion bond the polymer coatings and film forming properties, the fine polymer particles are preferably designed so that the polymer constituting them has a glass transition point of 30° C. or lower, more preferably 15° C. or lower, still more preferably 10° C. or lower. The glass transition point of the polymer can be adjusted within the above-mentioned range by appropriately selecting the kind and composition ratio of monomer used. In particular, when the glossy media for ink jet recording are used, the adjustment of the glass transition temperature of the coating polymer of the above-mentioned microencapsulated pigment to 30° C. or lower, preferably to 15° C. or lower and more preferably to 10° C. or lower can provide images having more excellent glossiness, high chroma saturation and excellent sharpness.

However, when a device for heating the printed matter at a temperature equal to or higher than the glass transition point of the polymer constituting the fine polymer particles is provided, the glass transition point may exceed 30° C. described above, because film formation is possible. However, in this case, a heating mechanism is required to be attached to an ink jet recording equipment, which causes the problem of increased cost of the equipment. Also from this point, the glass transition point of the polymer constituting the fine polymer particles is preferably adjusted to 30° C. or lower.

There are also methods for determining the glass transition point of the polymer of the fine polymer particles from the elastic modulus, the specific heat, the refractive index and the like. In the first invention, however, the glass transition point obtained by temperature rise measurement with a differential scanning calorimeter (DSC) has been used. That is to say, in a differential thermal curve obtained by the temperature rise measurement with the differential scanning calorimeter, the temperature at an intersection of a tangential line drawn from a bottom of an adsorption peak to an initiation point of adsorption and a base line has been taken as the glass transition point.

Further, according to a preferred embodiment of the first invention, the fine polymer particles has a minimum film forming temperature of preferably equal to or lower than room temperature, more preferably 30° C. or lower, most preferably 30° C. or lower. This is because the film formation of the fine polymer particles is preferably performed at a temperature equal to or lower than room temperature. The minimum film forming temperature as used herein means a minimum temperature at which a transparent continuous film is formed when a polymer emulsion obtained by dispersing the fine polymer particles in water is thinly flow cast on a metal plate such as an aluminum plate and the temperature thereof is elevated. In the temperature region lower than the minimum film forming temperature, the polymer emulsion becomes white powdery. Further, according to a preferred embodiment of the first invention, the glass transition point of the fine polymer particles is preferably 30° C. or lower.

Furthermore, for the particle size of the above-mentioned polymer particles, it is preferred that the volume average particle size thereof is within the range of 50 to 200 nm. When the volume average particle size exceeds 200 nm, the ejection of the ink tends to easily become unstable.

In addition, according to a preferred embodiment of the first invention, it is preferred that an aqueous emulsion in which the fine polymer particles are dispersed in an aqueous medium at a concentration of 10% by weight has a contact angle on a Teflon (registered trade mark) plate of 70° or more. Further, it is preferred that an aqueous emulsion in which the fine polymer particles are dispersed in an aqueous medium at a concentration of 35% by weight has a surface tension of $40\times10^{-3}$ N/m (40 dyne/cm, 20° C.). The utilization of the fine polymer particles as described above can prevent flight bending and make possible good printing. The utilization of the fine polymer particles realizes better abrasion resistance and water resistance. The reason for this is not clear, but is considered as follows. That is to say, when the ink composition according to the first invention is adhered to the surface of the recording medium such as paper, the water and water-soluble organic solvent in the ink composition first penetrate into the recording medium, and the microencapsulated pigment of the first invention and the fine polymer particles remain in the vicinity of the surface of the recording medium. At this time, the ionic groups on the surfaces of the fine polymer particles act with hydroxyl groups or carboxyl groups of cellulose constituting paper fiber to cause the fine polymer particles to be firmly adsorbed on the paper fiber. The water and water-soluble organic solvent in the vicinity of the fine polymer particles adsorbed on the paper fiber penetrate into the paper to decrease. Further, as described above, in the images obtained using the ink composition, the fine polymer particles have film forming properties. Accordingly, when the water and water-soluble organic solvent disappear from the vicinities of the microencapsulated pigment of the first invention and the fine polymer particles, the particles are unified to fusion bond the polymer with the microencapsulated pigment of the first invention encapsulated inside, so that the state in which the pigment particles are coated with the polymer is formed. This polymer coating is fixed more firmly to the surface of the recording medium by the presence of the ionic group. The above is only a hypothesis, and the first invention is not limited to the above. Further, the ink composition of the first invention using such fine polymer particles has the advantage that excellent storage stability is obtained without decreasing the performance of the microencapsulated pigment of the first invention.

According to a preferred embodiment of the first invention, it is preferred that the fine polymer particles contain a structure derived from an ionic group-containing unsaturated vinyl monomer in an amount of 1 to 10% by weight, have a structure crosslinked with a crosslinkable monomer having two or more polymerizable double bonds, and contain a structure derived from a crosslinkable monomer in an amount of 0.2 to 4% by weight. By utilizing a crosslinkable polymer three-dimensionally crosslinked by copolymerization of a polymerizable monomer having two or more polymerizable double bonds, preferably three or more polymerizable double bonds in polymerization, the surface of a nozzle plate becomes more difficult to wet, which causes flight bending to be more prevented, thereby being able to more improve ejection stability.

The fine polymer particles usable in the first invention include one of a single particle structure and one of a core-shell structure comprising a core portion and a shell portion surrounding it. The term "core-shell structure" in the first invention means a form in which two or more polymers different in composition exist in a particle with phase separation. Accordingly, it may be not only a form in which the core portion is completely coated with the shell portion, but also a form in which the core portion is partly coated. Further, the polymer of the shell portion may partly form a domain in the core particle. Furthermore, it may have a multilayer structure of three or more layers in which one or more layers different in composition are further contained between the core portion and the shell portion.

The fine polymer particles used in the first invention can be obtained by known emulsion polymerization, that is to say, emulsion polymerization of an unsaturated vinyl monomer in water in which a polymerization initiator and an emulsifier are allowed to exist.

The unsaturated monomers include an acrylic ester monomer, a methacrylic ester monomer, an aromatic vinyl monomer, a vinyl ester monomer, a vinyl cyan compound monomer, a halide monomer, an olefin monomer and a diene monomer, which are generally used in emulsion polymerization. Specific examples thereof include acrylic esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate and glycidyl acrylate; methacrylic esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate and glycidyl methacrylate; vinyl esters such as vinyl acetate; vinyl cyan compounds such as acrylonitrile and methacrylonitrile; halide monomers such as vinylidene chloride and vinyl chloride; aromatic vinyl monomers such as styrene, 2-methylstyrene, vinyltoluene, t-butylstyrene, chlorostyrene, vinylanisole and vinyl-naphthalene; olefins such as ethylene, propylene and isopropylene; dienes such as butadiene and chloroprene; and vinyl monomers such as vinyl ether, vinyl ketone and vinylpyrrolidone. The utilization of a carboxyl group-containing unsaturated monomer is indispensable to a monomer having no carboxyl group, and examples thereof include acrylic acid, methacrylic acid, itaconic acid, fumaric acid and maleic acid. Methacrylic acid is preferably utilized. Further, the emulsifiers usable include an anionic surfactant, a nonionic surfactant and a mixture thereof.

As described above, in the first invention, it is preferred that the fine polymer particles have the structure in which a molecule derived from the above-mentioned monomer is crosslinked with the crosslinkable monomer having two or more polymerizable double bonds. Examples of the crosslinkable monomers having two or more polymerizable double bonds include diacrylate compounds such as polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-(acryloxypropyloxyphenyl)propane and 2,2'-bis(4-(acryloxydiethoxyphenyl)propane; triacrylate compounds such as trimethylolpropane triacrylate, trimethylolethane triacrylate and tetramethylolmethane triacrylate; tetraacrylate compounds such as ditrimethylol tetraacrylate, tetramethylolmethane tetraacrylate and pentaerythritol tetraacrylate; hexaacrylate compounds such as dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate and 2,2'-bis(4-(methacryloxydiethoxyphenyl)propane; trimethacrylate compounds such as trimethylolpropane trimethacrylate and trimethylolethane trimethacrylate; methylenebisacrylamide; and divinylbenzene.

Further, in addition to the above-mentioned monomer, an acrylamide or a hydroxyl group-containing monomer can be added to more improve print stability. Examples of the acrylamides include acrylamide and N,N'-dimethylacrylamide. Examples of the hydroxyl group-containing monomers include 2-hydroxyethyl acrylate, 2-hydroxypropyl acrylate, 2-hydroxyethyl methacrylate and 2-hydroxypropyl methacrylate. These can be used either alone or as a mixture of two or more thereof.

Furthermore, the fine polymer particles having the core-shell structure are produced by known methods, generally by multistage emulsion polymerization and the like, for example, by a method disclosed in JP 4-76004 A. Examples of unsaturated vinyl monomers used for polymerization include the same monomers as described above.

In addition, a polymerization initiator, a surfactant, a molecular weight regulator, a neutralizing agent and the like used in emulsion polymerization may also be used based on conventional methods.

In the first invention, the fine polymer particles may be mixed as a fine particle powder with the other components of the ink composition, but it is preferred that the fine polymer particles are dispersed in an aqueous medium to form a polymer emulsion, followed by mixing with the other components of the ink composition. The content of the fine polymer particles in the ink composition is preferably from about 0.01 to about 10% by weight, and more preferably from about 0.01 to about 5% by weight.

Further, the ink jet recording ink according to an embodiment of the first invention can contain a pH adjuster. The pH of the ink is set preferably to the range of 7 to 9, and more preferably to the range of 7.5 to 8.5. As the pH adjusters, preferred are specifically potassium metal compounds such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, sodium dihydrogenphosphate, disodium hydrogenphosphate, potassium dihydrogenphosphate, dipotassium hydrogenphosphate, sodium oxalate, potassium oxalate, lithium oxalate, sodium borate, sodium tetraborate, potassium hydrogenphthalate and potassium hydrogentartrate; ammonia; and amines such as methylamine, ethylamine, diethylamine, trimethylamine, triethylamine, tris(hydroxymethyl)aminomethane hydrochloride, triethanolamine, diethanolamine, diethylethanolamine, triisopropenolamine, butyldiethanolamine, morpholine and propanolamine.

Further, for the purpose of mildewproofing, antisepsis or rust prevention, the ink jet recording ink may contain benzoic acid, dichlorophene, hexachlorophene, sorbic acid, a p-hydroxybenzoic ester, ethylenediamine-tetraacetic acid (EDTA), sodium dehydroacetate, 1,2-benthiazoline-3-one (product name: Proxel XL manufactured by Avecia), 3,4-isothiazoline-3-one or 4,4-dimethyloxazolidine.

Furthermore, for the purpose of preventing nozzles of a recording head from being dried, the ink jet recording ink may contain urea, thiourea and/or ethylene urea.

The ink jet recording ink according to a particularly preferred embodiment of the first invention contains at least (1) the microencapsulated pigment according to the embodiment of the first invention, (2) at least one compound (penetrant) selected from the group consisting of diethylene glycol monobutyl ether, triethylene glycol monobutyl ether and/or an 1,2-alkyldiol having 4 to 10 carbon atoms, (4) glycerol, and (5) water.

Such an ink jet recording ink is particularly excellent in dispersion stability and ejection stability, which causes no clogging of the nozzles for a long period of time. Accordingly, stable printing is possible. Further, on the recording media such as plain paper, recycled paper and coated paper, there can be obtained high-quality images having good drying properties after printing, no blurring, high print density and excellent color developability.

The ink jet recording ink according to another particularly preferred embodiment of the first invention contains at least (1) the microencapsulated pigment according to the embodiment of the first invention, (2) at least one compound (penetrant) selected from the group consisting of diethylene glycol monobutyl ether, triethylene glycol monobutyl ether and/or an 1,2-alkyldiol having 4 to 10 carbon atoms, (3) the acetylene glycol-based surfactant and/or the acetylene alcohol-based surfactant, (4) glycerol, and (5) water.

Such an ink jet recording ink is particularly excellent in dispersion stability and ejection stability, which causes no clogging of the nozzles for a long period of time. Accordingly, stable printing is possible. Further, on the recording media such as plain paper, recycled paper and coated paper, there can be obtained high-quality images having particularly good drying properties after printing, little blurring, high print density and excellent color developability.

In general, when a pigment is dispersed, a dispersant such as a surfactant or a polymer dispersant is used. Such a dispersant is merely adsorbed on surfaces of pigment particles, so that the dispersant usually tends to be eliminated from the surfaces of the pigment particles by some kind of environmental factor. In contrast, according to the embodiment of the first invention, the surfaces of the pigment particles having cationic groups thereon are completely encapsulated with a polymer coating or a crosslinked polymer coating, and the polymer coating or the crosslinked polymer coating surrounding the surfaces of the pigment particles is extremely firmly fixed to the surfaces of the pigment particles, as described above. It is therefore considered that the dispersant becomes difficult to be eliminated from the surfaces of the pigment particles. More particularly, in an ink using a pigment dispersion in which a pigment is dispersed with the surfactant or the polymer dispersant, and improved in penetrability with the above-mentioned acetylene glycol-based surfactant and/or acetylene alcohol-based surfactant and the penetrant such as diethylene glycol monobutyl ether, triethylene glycol monobutyl ether, propylene glycol monobutyl ether, dipropylene glycol monobutyl ether or a 1,2-alkyldiol, the dispersant tends to be easily eliminated from the surfaces of the pigment particles by strong shear force applied when the ink is ejected through fine nozzles, which causes deteriorated dispersibility, resulting in unstable ejection. In contrast, in the ink jet recording ink using the microencapsulated pigment according to the embodiment of the first invention, such a phenomenon is not observed at all, and the ink is stably ejected. Further, the pigment particles are encapsulated with the polymer coating, so that good solvent resistance is obtained. Accordingly, acceleration of elimination from the pigment particles due to the above-mentioned penetrant and swelling of the polymer become difficult to occur, thereby being able to maintain excellent dispersion stability for a long period of time. Further, in the ink composition using the pigment dispersion in which the pigment is dispersed with the dispersant such as the surfactant or the polymer dispersant, and improved in penetrability, the viscosity of the ink composition generally tends to increase due to the dispersant dissolved in the solution without being adsorbed on the surfaces of the pigment particles from the beginning of dispersion or the dispersant eliminated from the pigment with an elapse of time after dispersion, so that the content of the pigment is limited in many cases. Accordingly, particularly on plain paper or recycled paper, sufficient print density can not be obtained to fail to obtain good color developability in many cases. In contrast, in the ink composition using the microencapsulated pigment according to the embodiment of the invention, the pigment particles are encapsulated with the polymer coating as described above, so that the dispersant is difficult to be removed from the pigment particles, which causes no increase in the viscosity of the ink composition. Accordingly, the ink composition has the advantage that the ink composition is easily lowered in viscosity to make it possible to contain more pigment particles. Thus, sufficient print density can be obtained on plain paper or recycled paper.

In the particularly preferred embodiment of the first invention described above, diethylene glycol monobutyl ether or triethylene glycol monobutyl ether of the above (2) as the penetrant is added preferably in an amount of 10% by weight or less, and more preferably in an amount of 0.5 to 5% by weight, based on the total weight of the ink composition. Addition of diethylene glycol monobutyl ether or triethylene glycol monobutyl ether exhibits the remarkable effect of improving penetrability, and is available for improving print quality. In addition, diethylene glycol monobutyl ether and/or triethylene glycol monobutyl ether improves solubility of the acetylene glycol-based surfactant.

In the particularly preferred embodiment of the first invention described above, the 1,2-alkylenediol having 4 to 10 carbon atoms of the above (2) as the penetrant is added preferably in an amount of 15% or less based on the total weight of the ink composition. When the 1,2-alkyldiol having 3 or less carbon atoms is used, sufficient penetrability is not obtained. The 1,2-alkyldiol having carbon atoms exceeding 15 is unfavorable because it becomes difficult to dissolve in water. When the amount added exceeds 15% by weight, it is unsuitable because a tendency to increase the viscosity appears. Specifically, 1,2-pentanediol or 1,2-hexanediol is preferably used as the 1,2-alkyldiol. These can be used alone or both can be used together. 1,2-Pentanediol is preferably added in an amount ranging from 3 to 15% by weight. Less than 3% by weight results in failure to obtain good penetrability. 1,2-Hexanediol is preferably added in an amount ranging from 0.5 to 10% by weight. Less than 0.5% by weight results in failure to obtain good penetrability.

Further, particularly, in the ink jet recording ink according to an embodiment of the first invention, in order to enhance the characteristic that the clogging is difficult to be generated (clogging reliability), a solid wetting agent is preferably added in an amount of 3 to 20% by weight based on the total weight of the ink. In this specification, the solid wetting agent means a water-soluble substance which is solid at ordinary temperature (25° C.) and has a water-retaining function. Preferred examples of the solid wetting agents include a saccharide, a sugar alcohol, a hyaluronate, trimethylolpropane and 1,2,6-hexanetriol. Examples of the saccharides include a monosaccharide, a disaccharide, an oligosaccharide (including a trisaccharide and a tetrasaccharide) and a polysaccharide. Preferred examples thereof include glucose, mannose, fructose, ribose, xylose, arabinose, galactose, aldonic acid, glucitol (sorbit), maltose, cellobiose, lactose, sucrose, trehalose and maltotriose. The term "polysaccharide" as used herein means a saccharide in its broad sense, and is used in the sense that it includes substances widely occurring in nature such as alginic acid, α-cyclodextrin and cellulose. Further, derivatives of these saccharides include a reduced sugar of the above-mentioned saccharide (for example, a sugar alcohol represented by the general formula $HOCH_2(CHOH)_n CH_2OH$ (wherein n represents an integer of 2 to 5), an oxidized sugar (for example, an aldonic acid or a uronic acid), an amino acid and a thiosugar. In particular, a sugar alcohol is preferred, and specific examples thereof include maltitol, sorbitol and xylitol. As the hyaluronate, there can be used a product commercially available as a 1% aqueous solution of sodium hyaluronate (molecular weight: 350,000). These solid wetting agents are used either alone or as a mixture of two or more thereof. Particularly preferred examples of the solid wetting agents are trimethylolpropane, 1,2,6-hexanetriol, a saccharide and a sugar alcohol. The use of the solid wetting agent can restrain the evaporation of water by its water retaining function, so that the ink does not increase in viscosity in flow paths thereof or in the vicinities of nozzles, and a film is difficult to be formed, resulting in the difficulty of the occurrence of clogging. Further, the above-mentioned solid wetting agent is chemically stable, so that it does not decompose in the ink to be able to maintain the performance of the ink for a long period of time. Furthermore, even when the above-mentioned solid wetting agent is added to the ink, the ink does not wet a nozzle plate to be able to obtain stable ejection. In particular, when trimethylolpropane, 1,2,6-hexanetriol, a saccharide and a sugar alcohol are used, the beneficial effect is obtained. In the first invention, when the above-mentioned solid wetting agents are used alone, the content thereof is preferably from 3 to 20% by weight, and more preferably from 3 to 10% by weight, based on the total weight of the ink jet recording ink composition. When two or more thereof are used as a mixture, the total amount of two or more thereof is preferably from 3 to 20% by weight, and more preferably from 3 to 10% by weight, based on the total weight of the ink jet recording ink. When two or more thereof are used as a mixture, preferred is a combination of one selected from the group consisting of a saccharide, a sugar alcohol and a hyaluronate and one selected from the group consisting of trimethylolpropane and 1,2,6-hexane-triol. This combination is preferred because an increase in the viscosity of the ink caused by addition can be restrained. When the content of the solid wetting agents is less than 3% by weight, the sufficient effect of improving clogging reliability is not obtained. On the other hand, exceeding 20% by weight results in the tendency of the harmful effect to occur that the viscosity increases to become hard to obtain stable ejection.

In the particularly preferred embodiment of the first invention described above, the acetylene glycol-based surfactant and/or acetylene alcohol-based surfactant of the above (3) is added preferably in an amount of 0.01 to 10% by weight, and more preferably in an amount of 0.1 to 5% by weight, based on the total weight of the ink.

Although the ink jet recording inks according to the embodiments of the first invention have been described above, the microencapsulated pigment according to each embodiment of the first invention contained as a colorant is shaped like a true sphere, so that flowability of the ink easily becomes Newtonian, and the anionic groups on its surface are considered to be regularly densely orientated toward the aqueous medium side. Accordingly, electrostatic repulsion is considered to be effectively generated. There can be therefore prepared the ink jet recording ink which is excellent in ejection stability, more excellent in dispersibility (high dispersibility) and dispersion stability and further improved in the concentration of the colorant contained, compared to the conventional microencapsulated pigments.

The ink jet recording can be suitably achieved by mounting the ink jet recording ink according to the embodiment of the first invention on a known ink jet printer, and printing the ink on the recording medium such as the plain paper or the recording medium for ink jet recording. This allows ejection stability of the ink from a recording head to be excellent, and can provide the recorded matter which is excellent in fastness, abrasion resistance and color developability of images, and high in image density of images, and in which images are hard to blur. Further, even when the plain paper is used as the recording medium, the recorded matter is obtained in which images are hard to blur, and which is excellent in color developability of images.

Then, the second invention will be described below.

The microencapsulated pigment according to the second invention is characterized in that pigment particles having anionic groups on their surfaces are coated with a polymer having repeating structural units derived from a cationic polymerizable surfactant having a cationic group, a hydrophobic group and a polymerizable group and/or a cationic polymerizable hydrophilic monomer.

Such a microencapsulated pigment can be suitably produced by a process for preparing the microencapsulated pigment by coating the pigment particles having anionic groups on their surfaces with the polymer, which comprises adding the above-mentioned cationic polymerizable surfactant and/or cationic polymerizable hydrophilic monomer to an aqueous dispersion of the above-mentioned pigment particles having anionic groups on their surfaces, followed by mixing, and then, adding a polymerization initiator to perform emulsion polymerization.

Further, the microencapsulated pigment according to the second invention is characterized in that pigment particles having anionic groups on their surfaces are coated with a polymer having repeating structural units derived from a cationic polymerizable surfactant having a cationic group, a hydrophobic group and a polymerizable group and/or a cationic polymerizable hydrophilic monomer and a hydrophobic monomer.

Such a microencapsulated pigment can be suitably produced by a process for preparing the microencapsulated pigment by coating the pigment particles having anionic groups on their surfaces with the polymer, which comprises adding the above-mentioned cationic polymerizable surfactant and/or cationic polymerizable hydrophilic monomer to an aqueous dispersion of the above-mentioned pigment particles having anionic groups on their surfaces, followed by mixing, then, adding the hydrophobic monomer and the cationic polymerizable surfactant and/or cationic polymerizable hydrophilic monomer to achieve emulsification, and then, adding a polymerization initiator to perform emulsion polymerization.

According to such emulsion polymerization, the hydrophilic group on the surface of the pigment particle having anionic groups on its surface is ionically bonded to the cationic group of the cationic polymerizable surfactant and/or cationic polymerizable hydrophilic monomer. Then, a micellar (admicell) structure in which the cationic group of the cationic polymerizable surfactant and/or cationic polymerizable hydrophilic monomer is orientated toward an aqueous phase side is formed in an outermost shell, and a polymer phase is formed by polymerization reaction. Accordingly, the form of arrangement of the monomers existing around the pigment particle before emulsion polymerization influences a polarization state of the surface of the particle after polymerization, thereby being able to control the structure to extremely high accuracy. Accordingly, the microencapsulated pigment according to an embodiment of the second invention is capable of preparing an ink jet recording ink satisfying all the following (1) to (6):

(1) Excellent in dispersion stability;

(2) Excellent in ejection stability from a recording head;

(3) Capable of obtaining recorded matter excellent in fastness of images;

(4) Capable of obtaining recorded matter excellent in print density of images;

(5) Capable of obtaining recorded matter excellent in abrasion resistance of images; and (6) Capable of obtaining recorded matter in which images are hard to blur, and which is excellent in color developability of images, even when plain paper is used as a recording medium.

According to a microencapsulated pigment in which a pigment is coated with a polymer previously prepared by using phase inversion emulsification or acid precipitation, it is considered that such a state of pigment particles coated with the polymer that all the above-mentioned (1) to (6) are satisfied has not been achieved, perhaps because of a limited state of pigment particles coated with the polymer caused by the previous preparation of the polymer.

Here, it is preferred that the microencapsulated pigment has an aspect ratio (fineness degree) of 1.0 to 1.3, and a Zingg index of 1.0 to 1.3 (more preferably 1.0 to 1.2), thereby being able to satisfy the above-mentioned (1), (2), (4) and (6) more securely.

When the minor diameter, major diameter and thickness of a particle are taken as b, l and t ($l \geq b \geq t > 0$), respectively, the aspect ratio (fineness degree) is l/b ($\geq 1$), the degree of flatness is b/t ($\geq 1$), and the Zingg index is the fineness degree/the degree of flatness=(l·t)/b². That is to say, the true sphere has an aspect ratio of 1 and a Zingg index of 1.

When the aspect ratio is larger than 1.3, the microencapsulated pigment becomes flatter in shape to lower the isotropy. This perhaps accounts for the fact that there is a tendency to fail to obtain sufficient results, particularly with respect to the above (1), (2), (4) and (6). Although there is no particular limitation on the method for adjusting the aspect ratio and the Zingg index within the above-mentioned ranges, the microencapsulated pigment obtained by coating the pigment particles having anionic groups on their surfaces with the polymer by the above-mentioned emulsion polymerization method can easily satisfy these conditions.

As for microencapsulated pigments prepared by methods other than the emulsion polymerization method, such as acid precipitation and phase inversion emulsification, it is difficult to adjust the aspect ratio and the Zingg index within the above-mentioned ranges. When the aspect ratio and Zingg index of the microencapsulated pigment are within the above-mentioned ranges, the pigment is shaped like a true sphere. Accordingly, an ink easily becomes Newtonian in its fluid characteristics, resulting in excellent ejection stability. Further, when the ink lands on the recording medium such as paper, the microencapsulated particles are arranged on the recording medium at high density because of their true sphere shape, which makes it possible to express print density and color development at high efficiency. Further, they are excellent in dispersibility and dispersion stability because of their true sphere shape.

Embodiments of the second invention will be described in detail below, with reference to dispersed states of pigment particles which can occur in the above-mentioned suitable methods. The dispersed states of the pigment particles described below include assumptions.

Figure 5:
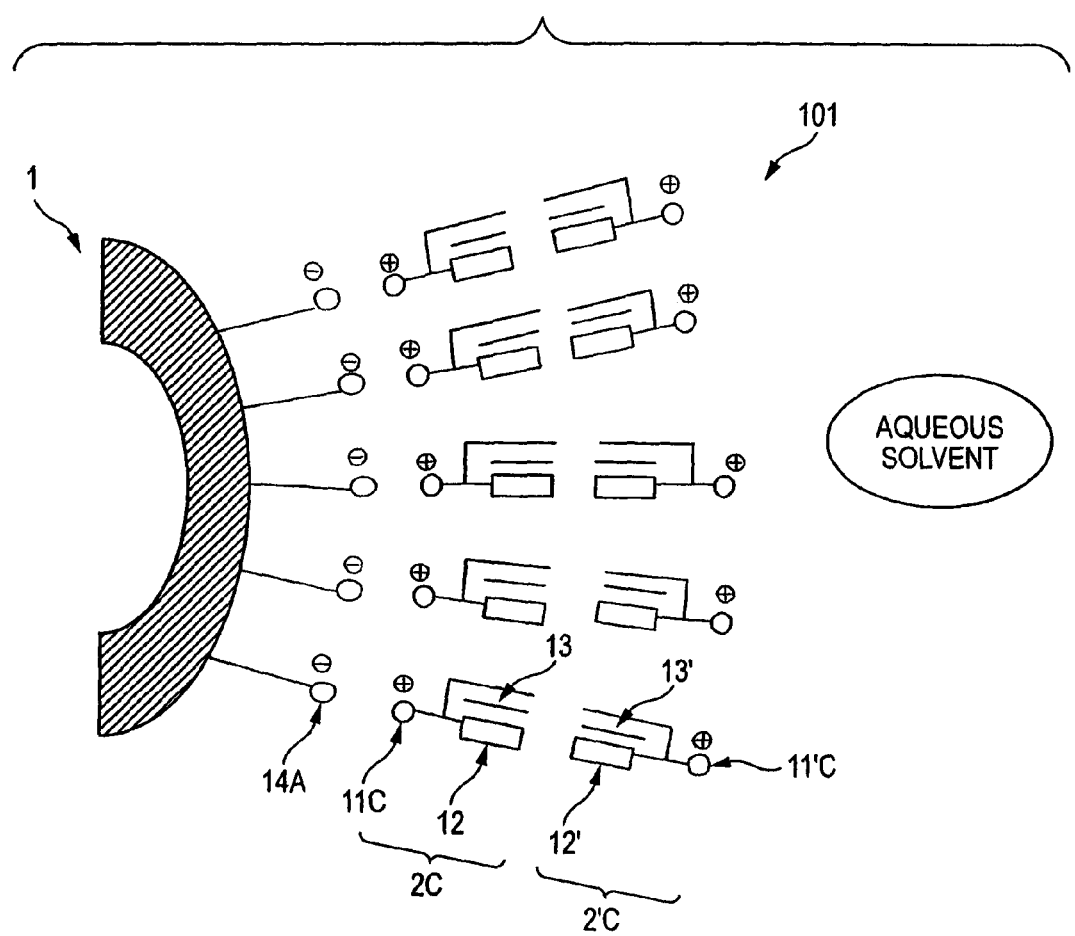
FIG. 5 is a schematic view showing that a cationic group of a cationic polymerizable surfactant is ionically adsorbed by an anionic group of a pigment particle having anionic groups on a its surface, and further that a micelle state is formed by a cationic polymerizable surfactant and/or a cationic polymerizable hydrophilic monomer.

A state of pigment particles which can occur in the above-mentioned suitable methods will be described referring to FIG. 5. On a pigment particle 1 having an anionic group 14A as a hydrophilic group on a its surface, which is dispersed in a solvent containing water as a main component (hereinafter also referred to as an aqueous medium), a cationic polymerizable surfactant having a cationic group 11C, a hydrophobic group 12 and a polymerizable group 13 and/or a cationic polymerizable hydrophilic monomer 2C is arranged so that the cationic group 11C is directed toward the anionic group 14A of the pigment particle 1, and adsorbed by a strong ionic bond. Further, a cationic polymerizable surfactant having a cationic group 11'C, a hydrophobic group 12' and a polymerizable group 13' and/or a cationic polymerizable hydrophilic monomer 2'C is adsorbed by a hydrophobic interaction of the hydrophobic group 12' and the polymerizable group 13' thereof with the hydrophobic group 12 and the polymerizable group 13 of the cationic polymerizable surfactant and/or cationic polymerizable hydrophilic monomer 2C, and the cationic group 11'C of the cationic polymerizable surfactant and/or cationic polymerizable hydrophilic monomer 2'C is directed toward a direction in which the aqueous medium exists (aqueous phase side), that is to say, a direction departing from the pigment particle 1.

Figure 6:
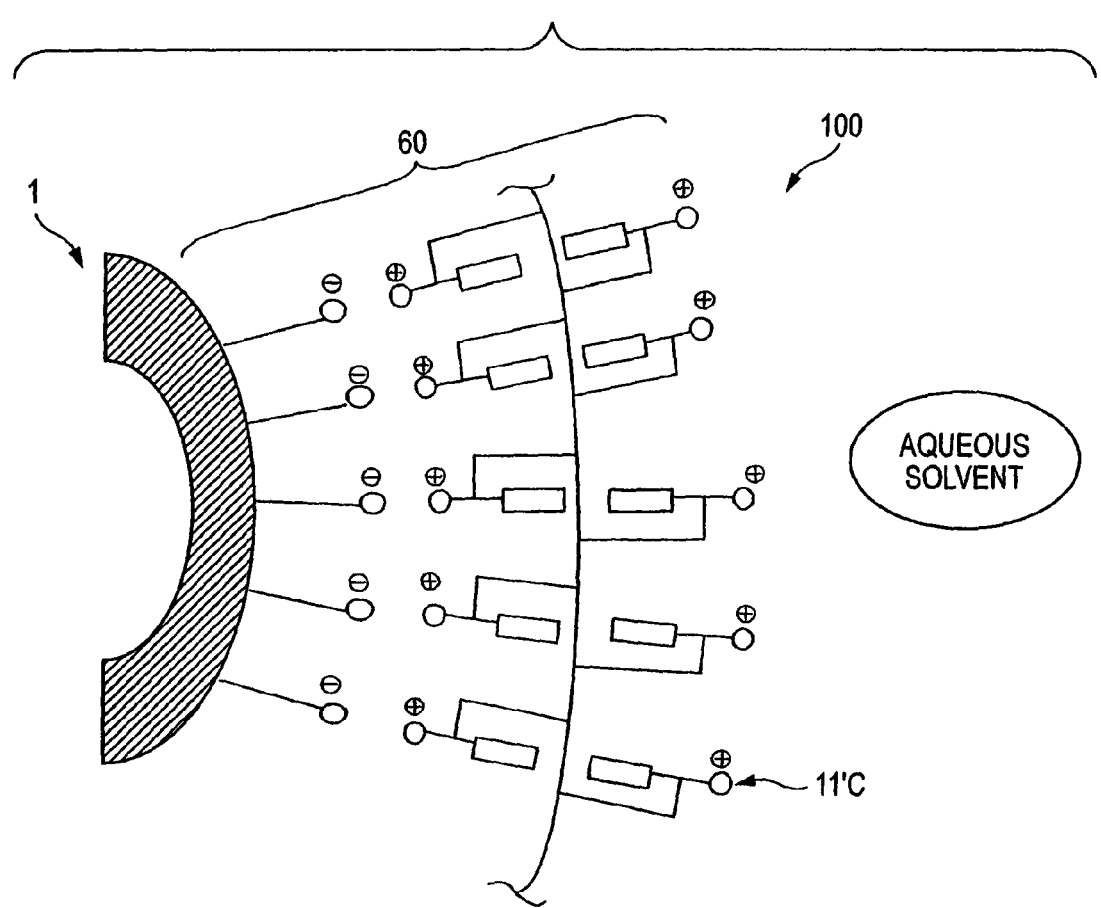
FIG. 6 is a schematic view showing that the cationic polymerizable surfactants and/or cationic polymerizable hydrophilic monomer are polymerized to form a polymer layer in FIG. 5.
Figure 7:
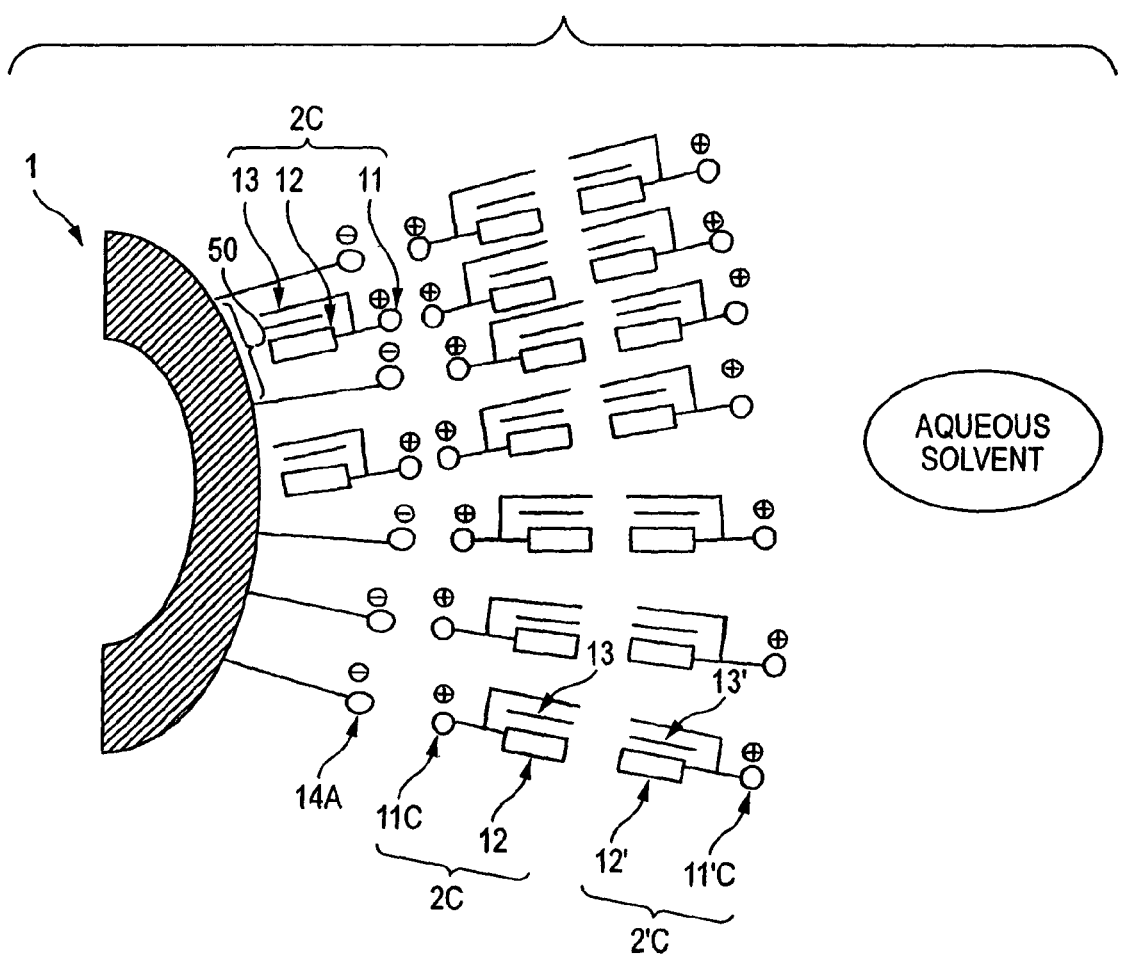
FIG. 7 is a schematic view showing that a cationic group of a cationic polymerizable surfactant and/or a cationic polymerizable hydrophilic monomer are ionically adsorbed by an anionic group of a pigment particle having anionic groups on a its surface, that a hydrophobic group of the cationic polymerizable surfactant and/or cationic polymerizable hydrophilic monomer is adsorbed on a hydrophobic surface of the pigment particle having cationic groups on its surface, and further that a micelle state is formed by a cationic polymerizable surfactant and/or a cationic polymerizable hydrophilic monomer.

To this state, for example, a polymerization initiator is added to polymerize the polymerizable group 13 of the cationic polymerizable surfactant and/or cationic polymerizable hydrophilic monomer 2C and the polymerizable group 13' of the cationic polymerizable surfactant and/or cationic polymerizable hydrophilic monomer 2'C, thereby preparing a microencapsulated pigment 100 in which the pigment particle 1 is coated with a polymer layer 60, as shown in FIG. 6. The surface of the polymer layer 60 has the cationic group 11'C, so that the microencapsulated pigment 100 is dispersible in the aqueous medium. At the time of polymerization, the cationic polymerizable surfactant and/or cationic polymerizable hydrophilic monomer and a hydrophobic monomer may be allowed to exist in the aqueous dispersion as needed. In that case, the polymer layer becomes a copolymer layer copolymerized from the cationic polymerizable surfactant and the hydrophobic monomer.

Further, in addition to the above, a dispersed state of pigment particles which can occur in the above-mentioned suitable methods will be described referring to FIG. 6. On a pigment particle 1 having an anionic group 14A as a hydrophilic group on a its surface, which is dispersed in a solvent containing water as a main component (hereinafter also referred to as an aqueous medium), a cationic polymerizable surfactant having a cationic group 11C, a hydrophobic group 12 and a polymerizable group 13 and/or a cationic polymerizable hydrophilic monomer 2C is arranged so that the cationic group 11C is directed toward the anionic group 14A of the pigment particle 1, and adsorbed by a strong ionic bond. Further, the surface of the pigment particle 1 has the cationic groups 14C chemically bonded thereto at a specific density, and a hydrophobic region 50 between the cationic groups 14C. The hydrophobic group 12 and polymerizable group 13 of the cationic polymerizable surfactant and/or cationic polymerizable hydrophilic monomer 2C are directed toward this hydrophobic region 50. To the cationic group 11C of this cationic polymerizable surfactant and/or cationic polymerizable hydrophilic monomer 2C, a cationic group of another cationic polymerizable surfactant and/or cationic polymerizable hydrophilic monomer 2C is arranged. Then, a cationic polymerizable surfactant having a cationic group 11'C, a hydrophobic group 12' and a polymerizable group 13' and/or a cationic polymerizable hydrophilic monomer 2'C is adsorbed by a hydrophobic interaction of the hydrophobic group 12' and the polymerizable group 13' thereof with the hydrophobic group 12 and the polymerizable group 13 of the cationic polymerizable surfactant and/or cationic polymerizable hydrophilic monomer 2C, and the cationic group 11'C of the cationic polymerizable surfactant and/or cationic polymerizable hydrophilic monomer 2'C is directed toward a direction in which the aqueous medium exists (aqueous phase side), that is to say, a direction departing from the pigment particle 1.

Figure 8:
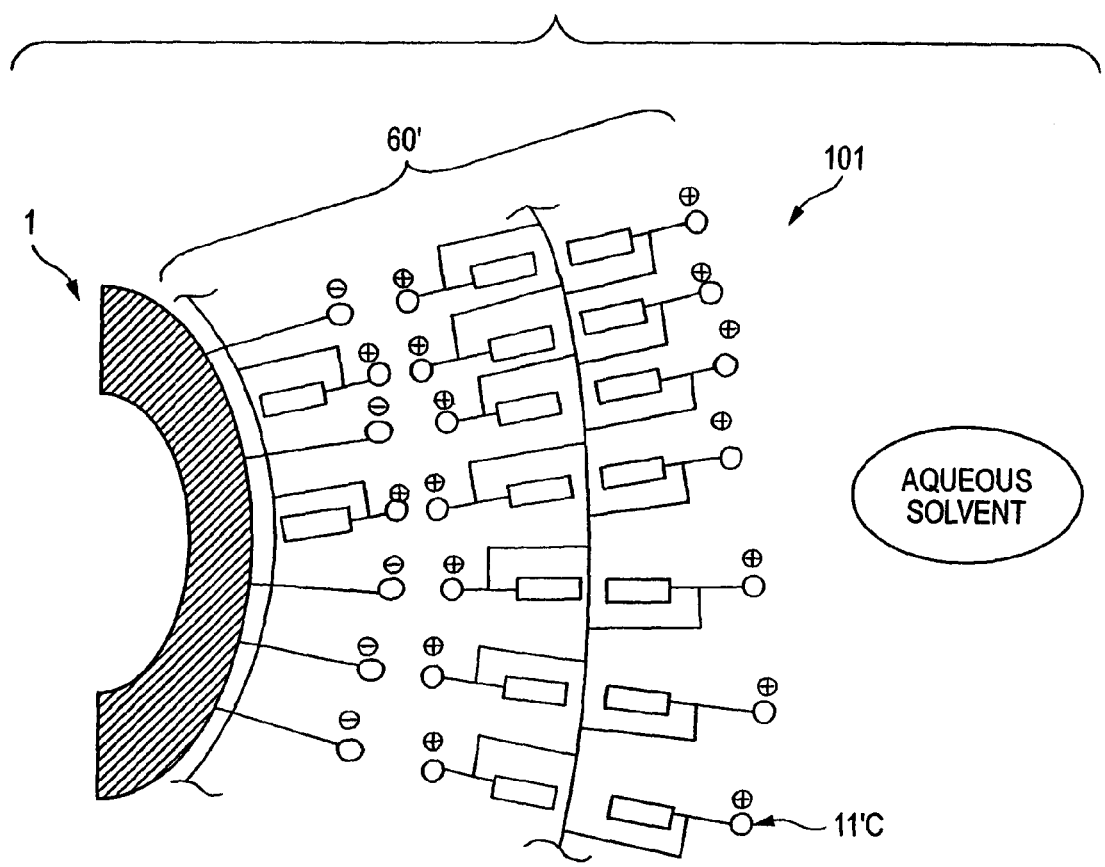
FIG. 8 is a schematic view showing that the cationic polymerizable surfactants are polymerized to form a polymer layer in FIG. 7.

To this state, for example, a polymerization initiator is added to polymerize the polymerizable group 13 of the cationic polymerizable surfactant and/or cationic polymerizable hydrophilic monomer 2C and the polymerizable group 13' of the cationic polymerizable surfactant and/or cationic polymerizable hydrophilic monomer 2'C, thereby preparing a microencapsulated pigment 101 in which the pigment particle 1 is coated with a polymer layer 60', as shown in FIG. 8. The surface of the polymer layer 60' has the cationic group 11'C, so that the microencapsulated pigment 101 is dispersible in the aqueous medium. At the time of polymerization, the cationic polymerizable surfactant and/or cationic polymerizable hydrophilic monomer and a hydrophobic monomer may be allowed to exist in the aqueous dispersion as needed. In that case, the polymer layer becomes a copolymer layer copolymerized from the cationic polymerizable surfactant and/or cationic polymerizable hydrophilic monomer and the hydrophobic monomer.

Although the dispersed states have been described above with reference to the drawings, first, the pigment particles 1 have the anionic groups on their surfaces as hydrophilic groups, thereby bringing about a state in which they are dispersed in the aqueous medium. The dispersion of the pigment particles 1 in the aqueous dispersion is high compared to the case where pigment particles having no hydrophilic groups (anionic groups) on their surfaces are dispersed with a dispersant. According to such a microencapsulated pigment in which the pigment particles 1 having anionic groups on their surfaces are coated with the polymer, the cationic groups on the surface of the microencapsulated pigment are regularly densely orientated toward a direction in which the aqueous medium exists, as shown in FIGS. 6 and 8. Accordingly, dispersion stability of the microencapsulated pigment in the aqueous medium can be improved. Consequently, when the microencapsulated pigment according to the second invention is used as a colorant for an ink jet recording ink and the aqueous solvent is used as a solvent for the ink, even in the case where the microencapsulated pigment is contained in larger weight amounts in the ink, excellent dispersion stability equal to that of a conventional microencapsulated pigment ink can be imparted. The microencapsulated pigment excellent in dispersion stability has decreased fear of clogging nozzles of a recording head, so that ejection stability is also improved. That is to say, the microencapsulated pigment ink can be prepared which is excellent in dispersion stability and ejection stability, concurrently improved in the weight concentration of the colorant compared to the conventional microencapsulated pigment ink. Ink jet recording can be made using such a microencapsulated pigment ink high in colorant weight concentration to obtain recorded matter not only excellent in fastness of images, but also high in print density of the images.

On more specific consideration, in the microencapsulated pigment of the second invention, the cationic groups are considered to be regularly densely orientated toward the aqueous medium side as described above, so that effective electrostatic repulsion is considered to be generated between the microencapsulated pigment particles. Further, in addition to such electrostatic repulsion, an effect by steric hindrance due to the polymer with which the pigment particles are coated (polymer effect) is considered to contribute excellent dispersibility of the microencapsulated pigment of the second invention in the aqueous medium.

The reason why the occurrence of blurring in images can be inhibited at the time when plain paper is used as the recording medium, and also the reason why the print density of the images is high are considered to be largely due to the action of the hydrophilic groups of the microencapsulated pigment regularly densely orientated toward the side of the aqueous medium for the pigment. When the ink is ejected from a recording head and lands on the plain paper, a solvent of the ink rapidly penetrates into the plain paper. However, according to the conventional pigment ink using pigment particles dispersed with a dispersant (pigment particles are coated with a dispersant), the pigment particles also move into the paper laterally or deeply together with the solvent, which makes the pigment particles difficult to be adsorbed on cellulose fiber on the surface of the plain paper (the cause of this is considered to be that the amount of hydrophilic groups on the surface of the pigment is small compared to that of the microencapsulated pigment according to the embodiment of the second invention, and that the hydrophilic groups are not in the state in which they are regularly densely orientated. Consequently, print density is low, and color developability is insufficient.

In contrast, the microencapsulated pigment of the second invention is easily adsorbed on the cellulose fiber of the plain paper by an interaction of the hydrophilic groups (particularly, the cationic groups) existing on its surface with the cellulose fiber. Accordingly, when the ink containing the microencapsulated pigment of the second invention as a colorant is ejected from a recording head and lands on the plain paper, the colorant is easy to stay in the vicinity of a landing position of the plain paper. It is therefore considered that the occurrence of blurring is inhibited, as well as that high image density is obtained.

Further, in the ink jet recording ink of the second invention, the pigment particles are coated with the polymer, so that the ink is excellent in fixability to the recording medium compared to the conventional microencapsulated pigment ink using the surface-treated pigment as a colorant. As a result, abrasion resistance of recorded matter can be made excellent.

Then, constituents of the microencapsulated pigment according to the second invention will be described in detail below.

The pigment particles having hydrophilic groups on their surfaces can be suitably prepared by treating the surfaces of the pigment particles with a hydrophilic group-imparting agent. Accordingly, there is no particular limitation on the pigment constituting the pigment particles having hydrophilic groups on their surfaces, as long as it is a pigment which is insoluble in the hydrophilic group-imparting agent. From such a viewpoint, the pigments preferably used in the ink of the second invention include the following inorganic pigments and organic pigments.

The inorganic pigments include carbon blacks (C.I. Pigment Black 7) such as furnace black, lamp black, acetylene black and channel black, and an iron oxide pigment. As the organic pigments, there can be used an azo pigment (including azo lake, an insoluble azo pigment, a condensed azo pigment and a chelate azo pigment), a polycyclic pigment (for example, a phthalocyanine pigment, a perylene pigment, a perinone pigment, an anthraquinone pigment, a quinacridone pigment, a dioxane pigment, a thioindigo pigment, an isoindolinone pigment or a quinofranone pigment), a dye chelate (for example, a basic dye chelate or an acidic dye chelate), a nitro pigment, a nitroso pigment or aniline black.

More specifically, the inorganic pigments used for black include carbon blacks such as No. 2300, No. 900, MCF88, No. 33, No. 40, No. 45, No. 52, MA7, MA8, MA100 and No. 2200B manufactured by Mitsubishi Chemical Corporation, Raven 5750, Raven 5250, Raven 5000, Raven 3500, Raven 1255 and Raven 700 manufactured by Columbian Chemicals Company, Regal 400R, Regal 330R, Regal 660R, Mogul L, Monarch 700, Monarch 800, Monarch 880, Monarch 900, Monarch 1000, Monarch 1100, Monarch 1300 and Monarch 1400 manufactured by Cabot Corporation, and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 manufactured by Degussa Corporation. Further, as the organic pigments for black, there can be used black organic pigments such as aniline black (C.I. Pigment Black 1).

Still further, the organic pigments for yellow inks include C.I. Pigment Yellow 1 (Hansa Yellow), 2, 3 (Hansa Yellow 10G), 4, 5 (Hansa Yellow 5G), 6, 7, 10, 11, 12, 13, 14, 16, 17, 24 (Flavanthrone Yellow), 34, 35, 37, 53, 55, 65, 73, 74, 75, 81, 83, 93, 94, 95, 97, 98, 99, 108 (Anthrapyrimidine Yellow), 109, 110, 113, 117 (a copper complex salt), 120, 124, 128, 129, 133 (quinophthalone), 138, 139 (isoindolinone), 147, 151, 153 (a nickel complex pigment), 154, 167, 172 and 180.

Yet still further, the organic pigments for magenta inks include C.I. Pigment Red 1 (Para Red), 2, 3 (Toluidine Red), 4, 5 (ITR Red), 6, 7, 8, 9, 10, 11, 12, 14, 15, 16, 17, 18, 19, 21, 22, 23, 30, 31, 32, 37, 38 (Pyrazolone Red), 40, 41, 42, 48 (Ca), 48 (Mn), 57 (Ca), 57:1, 88(thioindigo), 112 (naphthol AS series), 114(naphthol AS series), 122 (dimethylquinacridone), 123, 144, 146, 149, 150, 166, 168 (Anthoanthrone Orange), 170 (naphthol AS series), 171, 175, 176, 177, 178, 179 (Perylene Maroon), 184, 185, 187, 202, 209 (dichloroquinacridone), 219, 224 (perylene series) and 245 (naphthol AS series), and C.I. Pigment Violet 19 (quinacridone), 23 (Dioxazine Violet), 32, 33, 36, 38, 43 and 50.

Furthermore, the organic pigments for cyan inks include C.I. Pigment Blue 1, 2, 3, 15, 15:1, 15:2, 15:3, 15:34, 15:4, 16 (nonmetal phthalocyanine), 18 (Alkali Blue Toner), 22, 25, 60 (Threne Blue), 65 (Violantrone) and 66 (indigo), and C.I. Vat Blue 4 and 60.

In addition, as the organic pigments used for color inks other than magenta, cyan and yellow inks, there can be used C.I. Pigment Green 7 (Phthalocyanine Green), 10 (Green Gold), 36 and 37, C.I. Pigment Brawn 3, 5, 25 and 26, and C.I. Pigment Orange 1, 2, 5, 7, 13, 14, 15, 16, 24, 34, 36, 38, 40, 43 and 63.

In the microencapsulated pigment according to the second invention, the above-mentioned pigments can be used either alone or as a combination of two or more thereof.

The hydrophilic group-imparting agents for treating the surfaces of the pigment particles first suitably include sulfur-containing treating agents.

The sulfur-containing treating agents include sulfuric acid, fuming sulfuric acid, sulfur trioxide, chlorosulfuric acid, fluorosulfuric acid, amidosulfuric acid, a sulfonated pyridine salt and sulfamic acid. Above all, sulfonating agents such as sulfur trioxide, a sulfonated pyridine salt and sulfamic acid are suitable. These can be used either alone or as a mixture of two or more thereof. The term "sulfonating agent" as used herein means a treating agent for imparting a sulfonic group ($-SO_3H$) and/or a sulfinic group ($-RSO_2H$; wherein R is an alkyl group having 1 to 12 carbon atoms, a phenyl or a modified group thereof).

Further, it is also useful to form a complex of sulfur trioxide with a mixed solvent of a solvent which can form a complex with sulfur trioxide (a basic solvent such as N,N-dimethylformamide, dioxane, pyridine, triethylamine or trimethylamine), nitromethane or acetonitrile) and at least one solvent described later.

In particular, when the reactivity of sulfur trioxide is so high that the pigment itself is decomposed or deteriorated, or when reaction control with a strong acid is difficult, it is preferred to perform surface treatment (sulfonation in this case) of the pigment particles with a complex of sulfur trioxide and a tertiary amine as described above.

When a strong acid such as sulfuric acid, fuming sulfuric acid, chlorosulfuric acid or fluorosulfuric acid is used alone, the pigment particles easily dissolve to react molecule by molecule. In such a case, it is necessary to control the reaction, and consideration is required to be given to the kind and amount of solvent used.

The solvent used in the reaction is selected from those which are unreactive to the sulfur-containing treating agent and in which the pigment is insoluble or slightly soluble. Examples thereof include sulfolane, N-methyl-2-pyrrolidone, dimethylacetamide, quinoline, hexamethylphosphoric triamide, chloroform, dichloroethane, tetrachloroethane, tetrachloroethylene, dichloromethane, nitromethane, nitrobenzene, liquid sulfur dioxide, carbon disulfide, and trichlorofluoromethane.

The treatment with the sulfur-containing treating agent is carried out by dispersing the pigment particles in the solvent, and adding the sulfur-containing treating agent to the resulting dispersion, followed by heating at 60 to 200° C. and stirring for 3 to 10 hours. Specifically, a process is preferred in which the mixture is previously dispersed by high shear dispersion with a high-speed mixer or the like, or by impact dispersion in a bead mill, a jet mill or the like, thereby forming a slurry (dispersion). The resulting slurry is then stirred gently, and the sulfur-containing treating agent is added thereto to introduce the hydrophilic groups onto the surfaces of the pigment particles. In this case, determination of the amount of hydrophilic groups introduced largely depends on the reaction conditions and the kind of sulfur-containing treating agent. After heat treatment, the solvent and the residual sulfur-containing treating agent are removed from the pigment particle slurry. The removal is performed by repetition of washing with water, ultrafiltration, reverse osmosis, centrifugation, filtration or the like.

Further, the pigment particles having sulfonic anion groups ($-SO_3^-$) and/or sulfinic anion groups ($-RSO_2^-$; wherein R is an alkyl group having 1 to 12 carbon atoms, a phenyl group or a modified group thereof) on their surfaces can be obtained by treating the above-mentioned sulfonic groups ($-SO_3H$) and/or sulfinic groups ($-RSO_2H$; wherein R is an alkyl group having 1 to 12 carbon atoms, a phenyl group or a modified group thereof). In the second invention, the pigment particles are preferably used in this state.

As the alkali compound, there is selected an alkali compound which dissociates into an alkali metal ion or a univalent ion represented by chemical formula: $(R_1R_2R_3R_4N)^+$ ($R_1$, $R_2$, $R_3$ and $R_4$, which may be the same or different, each represents a hydrogen atom, an alkyl group, a hydroxyalkyl group or a halogenated alkyl group) as a cation. Preferred is an alkali compound which dissociates into a lithium ion ($Li^+$), a potassium ion ($K^+$), a sodium ion ($Na^+$), an ammonium ion ($NH_4^+$) or an alkanolamine cation such as a triethanolamine cation as a cation.

As the anion of the alkali compound, there is preferably used a hydroxide anion. Specific examples thereof include ammonia, alkanolamines (such as monoethanolamine, diethanolamine, N,N-butylethanolamine, triethanolamine, propanolamine, aminomethylpropanol, and 2-aminoisopropanol) and univalent alkali metal hydroxides (such as LiOH, NaOH, and KOH).

The alkali compound is preferably added in an amount equal to or more than the neutralization equivalent for the sulfonic groups and/or sulfinic groups on the pigment particles. Further, volatile additives such as ammonia and alkanolamines are preferably added in an amount of generally at least 1.5 times the neutralization equivalent. The operation can be performed by adding the pigment particles having sulfonic groups and/or sulfinic groups chemically bonded thereto to the alkali compound, followed by shaking in a paint shaker or the like.

Further, the hydrophilic group-imparting agents for treating the surfaces of the pigment particles also preferably include a carboxylating agent. The term "carboxylating agent" as used herein means a treating agent for imparting a carboxyl group (—COOH).

Using as the carboxylating agent an oxidizing agent such as a hypohalogenous acid salt such as sodium hypochlorite or potassium hypochlorite, bonds (C=C and C—C) on the surfaces of the pigment particles are partly severed to achieve oxidation. In addition to the above-mentioned chemical treatment, a carboxyl group is imparted by physical oxidation such as plasma treatment in some cases. However, in the second invention, various techniques are applicable as long as they are a treating method which can secure the dispersion stability of the encapsulated pigment in an aqueous medium. Further, in the carboxyl group introduction treatment exemplified, a quinone group or the like is also introduced in some cases, although small in quantity. Even such cases do not run counter to the spirit of the invention as long as the dispersion stability of the microencapsulated pigment in an aqueous dispersion can be secured.

An example of the treatment with the carboxylating agent is described below. The pigment particles are previously dispersed in an aqueous medium by high shear dispersion with a high-speed mixer or the like, or by impact dispersion in a bead mill, a jet mill or the like, thereby preparing a slurry (dispersion). Then, the slurry is mixed with a hypohalogenous acid salt (such as sodium hypochlorite) having an effective halogen concentration of 10 to 30% in an appropriate amount of water, followed by heating at 60 to 80° C. and stirring for about 5 to about 10 hours, preferably for 10 hours or more. This operation is accompanied by considerable heat generation, so that attention should be given to safety. Then, the solvent and the residual carboxylating agent are removed from the slurry of the surface-treated pigment particles by heat treatment. Further, the desired aqueous dispersion can be obtained by repetition of washing with water, ultrafiltration, reverse osmosis, centrifugation, filtration or the like as needed.

The pigment particles having carboxyl groups (—COOH) can also be treated with an alkali compound to obtain the pigment particles having carboxyl anions (—COO$^-$) as the hydrophilic group on their surfaces. In the second invention, the pigment particles are preferably used in this state. The kind of alkali compound and the treating method with the alkali compound are the same as described above.

The preferred amount of the hydrophilic groups introduced on the surfaces of pigment particles and a method for investigating the state of the hydrophilic groups introduced will be described below.

First, when hydrophilization is conducted with the sulfonating agent, the amount of the hydrophilic groups introduced onto the surfaces of the pigment particles is preferably 0.01 mmol equivalent or more per gram of pigment particles. When the amount of the hydrophilic groups introduced is less than 0.01 mmol/g, agglomeration of the pigment particles becomes liable to occur in the process of microencapsulating the pigment particles in the aqueous medium, which caused a tendency to increase the average particle size of the encapsulated pigment. As the average particle size of the microencapsulated pigment increases, it becomes difficult to obtain an ink jet recording ink excellent in dispersion stability and ejection stability and capable of increasing the print density of images.

There is no particular limitation on the upper limit of the amount of the hydrophilic groups introduced, but it is preferably 0.15 mmol/g or less from the viewpoint of cost, because exceeding 0.15 mmol/g results in no observation of a change in the average particle size of the pigment particles associated with an increase in the amount of the hydrophilic groups introduced.

Then, the amount of the hydrophilic groups introduced onto the surface of the pigment with the carboxylating agent will be described. According to a technique used in the second invention, it is considered that the carboxyl group (—COOH) and/or the carboxyl anion (—COO—) are introduced onto the surface of the pigment. However, the amount introduced can not be directly determined, so that the amount introduced is measured from the surface active hydrogen content in the second invention. Details of the measuring method will be described later.

The active hydrogen content of the pigment obtained by such a method is preferably 1.0 mmol/g or more, and more preferably 1.5 mmol/g or more. Less than 1.0 mmol/g results in poor dispersibility in water and easy agglomeration (the phenomenon that the particles naturally gather to form particles having an increased particle size) in the process of microencapsulation.

The pigment particles having hydrophilic groups on their surfaces have been described above in detail. The average particle size of the pigment particles having hydrophilic groups on their surfaces can be easily adjusted to 150 nm or less by the above-mentioned methods. In particular, it is more preferred to adjust the average particle size to 20 to 80 nm by selecting the kinds of pigment and hydrophilic group-imparting agent, the amount of hydrophilic groups introduced, and the like, thereby being able to obtain the microencapsulated pigment which can more surely prepare the ink jet recording ink excellent in dispersion stability and ejection stability, and capable of increasing the print density of images. In this specification, the description of the average particle size is based on measurements by the laser light scattering method.

The pigment particles having hydrophilic groups on their surfaces are successively coated with the polymer having repeating structural units derived from the cationic polymerizable surfactant having a cationic group, a hydrophobic group and a polymerizable group, thereby producing the microencapsulated pigment according to one embodiment of the second invention. Such a microencapsulated pigment can be suitably prepared by adding the cationic polymerizable surfactant to the aqueous dispersion of the pigment particles having anionic groups on their surfaces, followed by mixing to achieve emulsification, and then, adding the polymerization initiator to perform emulsion polymerization, as described above.

As the cationic group contained in the cationic polymerizable surfactant, a cationic group selected from the group consisting of a primary ammonium cation, a secondary ammonium cation, a tertiary ammonium cation and a quaternary ammonium cation is preferred. The primary ammonium cations include a monoalkylammonium cation ($RNH_3^+$), the secondary ammonium cations include a dialkylammonium cation ($R_2NH_2^+$), the primary ammonium cations include a trialkylammonium cation ($R_3NH^+$), and the quaternary ammonium cations include $R_3NH^+$. R as used herein is a hydrophobic group or a polymerizable group, which includes the following. Counter anions of the above-mentioned cationic groups include $Cl^-$, $Br^-$ and $I^-$.

The hydrophobic group is preferably selected from the group consisting of an alkyl group, an aryl group and a combination thereof.

The polymerizable group is preferably an unsaturated hydrocarbon group, and more particularly, preferably selected from the group consisting of a vinyl group, an allyl group, an acryloyl group, a methacryloyl group, a propenyl group, a vinylidene group and a vinylene group. Of these, an acryloyl group and a methacryloyl group can be exemplified as preferred examples.

Specific examples of the above-mentioned cationic polymerizable surfactants and/or cationic polymerizable hydrophilic monomers include a cationic allylic acid derivative as described in JP 4-65824 A.

The cationic polymerizable surfactants used in the second invention include, for example, a compound represented by the general formula $R_{(4-(l+m+n))}R^1_l R^2_m R^3_n N^+ \cdot X^-$ (wherein R is a polymerizable group, $R^1$, $R^2$ and $R^3$ are each an alkyl group or an aryl group, X is Cl, Br or I, and l, m and n are each 1 or 0).

As the above-mentioned polymerizable group, a hydrocarbon group having a radically polymerizable unsaturated hydrocarbon group can be suitably exemplified. More particularly, the polymerizable groups include an acrylic group, an acryloyl group, a methacryloyl group, a vinyl-group, a propenyl group, an allyl group, a vinylidene group and a vinylene group.

Specific examples of the cationic polymerizable surfactants and/or cationic polymerizable hydrophilic monomers include methacrylic acid dimethylaminoethylmethyl chloride, methacrylic acid dimethylaminoethylbenzyl chloride, methacryloyloxyethyltrimethylammonium chloride, diallyldimethylammonium chloride and 2-hydroxy-3-methacryloxypropyltrimethylammonium chloride.

As the above-mentioned cationic polymerizable surfactant and/or cationic polymerizable hydrophilic monomer, there can also be used a commercially available product. Examples thereof include Acryester DMC (Mitsubishi Rayon Co., Ltd.), Acryester DML60 (Mitsubishi Rayon Co., Ltd.) and C-1615 (Daiichi Kogyo Yakuhin Co., Ltd.).

The cationic polymerizable surfactants and/or cationic polymerizable hydrophilic monomers exemplified above can be used either alone or as a mixture of two or more thereof.

More specifically, the microencapsulated pigment according to the embodiment of the second invention is suitably produced by the following procedures.

(1) The cationic polymerizable surfactant and/or cationic polymerizable hydrophilic monomer are added to the dispersion in which the pigment having anionic groups on its surface is dispersed in water. The cationic polymerizable surfactant and/or cationic polymerizable hydrophilic monomer added are partly ionically bonded by allowing the cationic group thereof to be adsorbed by the anionic group of "the pigment having anionic groups on its surface" for stabilization, and a form (admicell) in which the stabilized cationic polymerizable surfactant and/or cationic polymerizable hydrophilic monomer are coated with the residual cationic polymerizable surfactant and/or cationic polymerizable hydrophilic monomer with the cationic groups orientated toward the aqueous phase side.

(2) The polymerization initiator is added to perform emulsion polymerization.

By such procedures, there can be suitably produced the microencapsulated pigment coated with the polymer having repeating structural units derived from the cationic polymerizable surfactant and/or cationic polymerizable hydrophilic monomer.

Further, particularly, in order to control the fixability, abrasion resistance and solvent resistance of printed matter, and to control the storage stability of the ink, an additional comonomer may be added.

In particular, it is possible to control the fixability and abrasion resistance of printed matter by adjusting the glass transition point (Tg) of the copolymer with which the pigment particles of the microencapsulated pigment according to the second invention are coated.

When the ink using the microencapsulated pigment of the second invention is printed on a recording medium such as the plain paper or the exclusive medium for ink jet recording at room temperature, an aqueous medium (comprising water and/or a water-soluble organic solvent) existing around the microencapsulated pigment particles of the second invention penetrates into the recording medium such as the plain paper or the exclusive medium for ink jet recording to be eliminated from the vicinity of the microencapsulated pigment particles, which causes the microencapsulated pigment particles to come close to one another. In that case, when the glass transition temperature (Tg) of the copolymer with which the pigment particles of the microencapsulated pigment are coated is equal to or lower than room temperature, the copolymer with which the pigment particles of the microencapsulated pigment are coated is fusion bonded to form a film with the pigment encapsulated inside (included) by capillary pressure generated in the clearance between the microencapsulated pigment particles. Accordingly, the fixability and abrasion resistance of images can be particularly improved.

In general, when a solid polymer, particularly an amorphous solid polymer, is elevated in temperature from low temperature to thigh temperature, the phenomenon occurs that a state in which very large force is required for slight deformation (glass state) is rapidly changed to a state in which large deformation occurs by small force. The temperature at which this phenomenon occurs is called the glass transition point (or the glass transition temperature). Usually, in a differential thermal curve obtained by temperature rise measurement with a differential scanning calorimeter, the temperature at an intersection of a tangential line drawn from a bottom of an adsorption peak to an initiation point of adsorption and a base line is taken as the glass transition point. Further, it is known that other physical properties such as the elastic modulus, the specific heat and the refractive index also rapidly change at the glass transition point, and it is known that the glass transition point is also determined by measuring these physical properties. In the second invention, the glass transition point obtained by the temperature rise measurement with the differential scanning calorimeter (DSC) has been used.

When the ink using the microencapsulated pigment of the second invention is printed on the recording medium such as the plain paper or the exclusive medium for ink jet recording, in order to more preferably perform film formation at room temperature in the microencapsulated pigment of the second invention, the glass transition point (Tg) of the copolymer with which the pigment particles of the microencapsulated pigment are coated is preferably 30° C. or lower, more preferably 15° C. or lower, and still more preferably 10° C. or lower. It is therefore preferred that the copolymer with which the pigment particles of the microencapsulated pigment is designed so as to provide a glass transition point of 30° C. or lower. More preferably, the copolymer is designed so as to provide a glass transition point of 15° C. or lower, and still more preferably, 10° C. or lower. However, when the glass transition point is lower than −20° C., solvent resistance tends to decrease. Such a glass transition point of the copolymer can be adjusted within the above-mentioned range by suitably selecting the kind and composition ratio of hydrophobic monomer used. When it is possible to heat the printed matter at a temperature equal to or higher than the glass transition point (Tg) of the copolymer with which the pigment particles of the microencapsulated pigment are coated, the glass transition point may exceed 30° C., because film formation is possible when the glass transition point is equal to or lower than the heating temperature. However, in this case, a heating mechanism is required to be attached to an ink jet recording equipment, which causes the problem of increased cost of the equipment. Accordingly, the glass transition point is preferably adjusted to 30° C. or lower.

In order to satisfy required characteristics such as the fixability, abrasion resistance, water resistance and solvent resistance of the printed matter, it is possible by suitably using the hydrophobic monomer. That is to say, in the microencapsulated pigment according to the second invention, it is preferred that the pigment particle having anionic groups on its surface further has repeating structural units derived from the cationic polymerizable surfactant having a cationic group, a hydrophobic group and a polymerizable group, and repeating structural units derived from the hydrophobic monomer.

As the hydrophobic monomer, there can be exemplified a monomer having at least a hydrophobic group and a polymerizable group in its structure, wherein the hydrophobic group is selected from the group consisting of an aliphatic hydrocarbon group, an alicyclic hydrocarbon group and an aromatic hydrocarbon group. The aliphatic hydrocarbon groups include a methyl group, an ethyl group and a propyl group, the alicyclic hydrocarbon groups include a cyclohexyl group, a dicyclopentenyl group, a dicyclopentanyl group and an isobornyl group, and the aromatic hydrocarbon groups include a benzyl group, a phenyl group and a naphthyl group.

The polymerizable group is a radically polymerizable unsaturated hydrocarbon group, and preferably selected from the group consisting of a vinyl group, an allyl group, an acryloyl group, a methacryloyl group, a propenyl group, a vinylidene group and a vinylene group.

Specific examples of the hydrophobic monomers include styrene derivatives such as styrene, methylstyrene, dimethylstyrene, chlorostyrene, dichlorostyrene, bromostyrene, p-chloromethylstyrene and divinylbenzene; monofunctional acrylic esters such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate and isobornyl acrylate; monofunctional methacrylic esters such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate and isobornyl methacrylate; allyl compounds such as allylbenzene, allyl-3-cyclohexane propionate, 1-allyl-3,4-dimethoxybenzene, allyl phenoxyacetate, allyl phenylacetate, allylcyclohexane and an allyl multivalent carboxylate; esters of fumaric acid, maleic acid and itaconic acid; and radically polymerizable group-containing monomers such as an N-substituted maleimide and a cyclic olefin. As the hydrophobic monomer, one satisfying the above-mentioned required characteristics is appropriately selected, and the amount thereof added is arbitrarily determined.

Further, it is also preferred that the polymer with which the pigment particles are coated further has repeating structural units derived from the crosslinkable monomer.

The polymer has repeating structural units derived from the crosslinkable monomer, thereby forming a crosslinked structure in the polymer, which can improve solvent resistance (the characteristic that the solvent contained in the ink jet recording ink is difficult to penetrate into the polymer with which the pigment particles are coated).

When the solvent penetrates into the polymer with which the pigment particles are coated, the polymer is swelled or deformed to disturb the orientation state of the cationic groups of the pigment particles orientated toward the aqueous medium side, resulting in deterioration of the dispersion stability of the microencapsulated pigment in some cases. In contrast, the formation of the crosslinked structure in the polymer with which the pigment particles are coated improves the solvent resistance of the microencapsulated pigment, resulting in more excellent dispersion stability in the ink composition in which the water-soluble organic solvent coexists.

The crosslinkable monomer which can be used in the second invention is a compound having two or more of unsaturated hydrocarbon groups of at least one kind selected from the group consisting of a vinyl group, an allyl group, an acryloyl group, a methacryloyl group, a propenyl group, a vinylidene group and a vinylene group. Examples thereof include ethylene glycol diacrylate, diethylene glycol diacrylate, triethylene glycol diacrylate, tetraethylene glycol diacrylate, polyethylene glycol diacrylate, allyl acrylate, bis(acryloxyethyl) hydroxyethyl isocyanurate, bis(acryloxyneopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxydiethoxy)phenyl]propane, 2,2-bis[4-(acryloxyethoxy.polyethoxy)phenyl]propane, hydroxypivalic acid neopentyl glycol diacrylate, 1,4-butanediol diacrylate, dicyclopentanyl diacrylate, dipentaerythritol hexaacrylate, dipentaerythritol monohydroxypentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxyethoxydiethoxy)phenyl]propane, 2,2-bis[4-

(methacryloxyethoxypolyethoxy)phenyl]propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol mono-hydroxypentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl)isocyanurate, allyl methacrylate, divinylbenzene, diallyl phthalate, diallyl terephthalate, diallyl isophthalate and diethylene glycol bis-allylcarbonate.

In addition, it is preferred that the polymer with which the pigment particles are coated further has repeating structural units derived from a monomer represented by the following general formula (1):

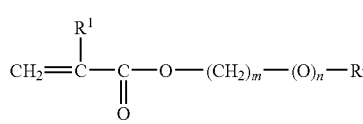
(1)

wherein $R^1$ represents a hydrogen atom or a methyl group, $R^2$ represents a t-butyl group, an alicyclic hydrocarbon group, an aromatic hydrocarbon group or a heterocyclic group, m represents an integer of 0 to 3, and n represents an integer of 0 or 1.

The above-mentioned $R^2$ group contained in the polymer, which is a "bulky" group derived from the monomer represented by general formula (1), decreases the flexibility of a molecule of the polymer, that is to say, restrains the movability of the molecule. Accordingly, the mechanical strength and heat resistance of the polymer are improved, so that the use of the ink using the microencapsulated pigment of this embodiment coated with the polymer can provide printed mater having excellent weather resistance and durability. Further, the existence of the above-mentioned $R^2$ group, the "bulky" group, in the polymer can inhibit penetration of the organic solvent into the polymer, so that the microencapsulated pigment of this embodiment becomes excellent in solvent resistance, and stabler ejection properties, dispersibility and long-term storage stability can be obtained in the ink composition in which the water-soluble organic solvent coexists. In the above-mentioned general formula (1), the alicyclic hydrocarbon groups represented by $R^2$ include a cycloalkyl group, a cycloalkenyl group, a benzyl group, a phenyl group, an isobornyl group, a dicyclopentanyl group, a dicyclopentenyl group, an adamantane group, a tetrahydrofuran group, a naphthyl group and a t-butyl group.

As described above, the polymer having repeating structural units derived from the crosslinkable monomer and the polymer having repeating structural units derived from the monomer represented by general formula (1) have the advantages of high Tg and excellent mechanical strength, heat resistance and solvent resistance.

However, the microencapsulated pigment coated with such a polymer becomes insufficient in plasticity of the polymer, which is liable to cause poor adhesion with the recording medium. As a result, the fixability and abrasion resistance of the microencapsulated pigment to the recording medium are deteriorated in some cases.

On the other hand, the polymer having repeating structural units derived from a monomer having a long-chain alkyl group, of the above-mentioned hydrophobic monomers, has flexibility. Accordingly, the polymer having mechanical strength and solvent resistance of such a degree that the plasticity is not impaired can be obtained by adjusting the ratio of repeating structural units derived from the crosslinkable monomer and/or repeating structural units derived from the monomer represented by general formula (1) to repeating structural units derived from the monomer having a long-chain alkyl group. The microencapsulated pigment coated with such a polymer is easily adhered to the recording medium, so that it is excellent in fixability and also in solvent resistance. Accordingly, the ink using this microencapsulated pigment can provide excellent ejection stability, dispersion stability and long-term storage stability, also in the ink composition in which the water-soluble organic solvent coexists. Further, the use of the ink using this microencapsulated pigment can provide the printed matter good in fixability and excellent in abrasion resistance, durability and solvent resistance.

Furthermore, specific examples of the monomers represented by the above-mentioned general formula (1) include the following:

Isobonyl Methacrylate

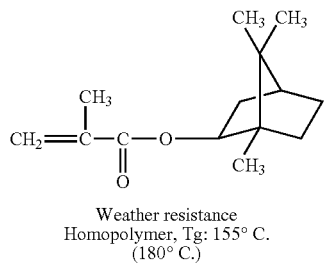

Weather resistance
Homopolymer, Tg: 155° C.
(180° C.)

Isobonyl Acrylate

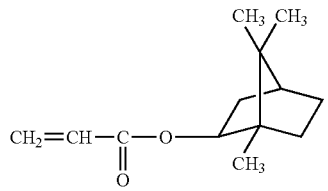

Weather resistance
Homopolymer, Tg: 94° C.

Dicyclopentenyl Acrylate

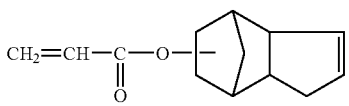

Imparting adhesion to an acrylic resin
Homopolymer, Tg: 120° C.

Dicyclopentenyl Methacrylate

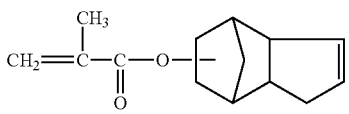

Chemical resistance

-continued

Dicyclopentenyloxyethyl Acrylate

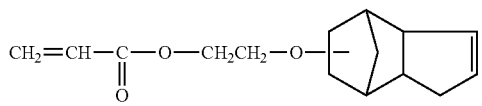

Imparting adhesion

Dicyclopentanyl Acrylate

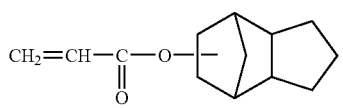

Low moisture absorption
Weather resistance
Homopolymer, Tg: 120° C.

Dicyclopentenyloxyethyl Methacrylate

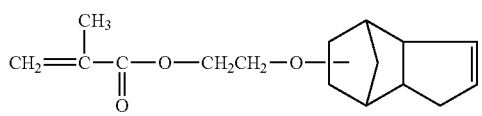

Chemical resistance

Cyclopentanyl Methacrylate

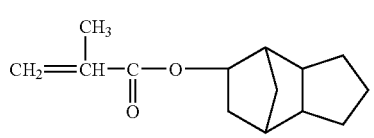

Low moisture absorption
Weather resistance
Homopolymer, Tg: 175° C.

t-Butyl Methacrylate

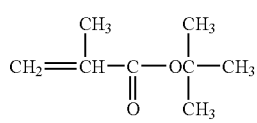

Homopolymer, Tg: 107° C.

Benzyl Methacrylate

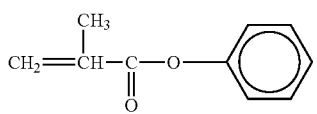

Homopolymer, Tg: 54° C.

Cyclohexyl Methacrylate

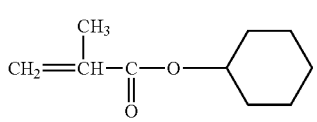

Homopolymer, Tg: 66° C.

Tetrahydrofurfuryl Methacrylate

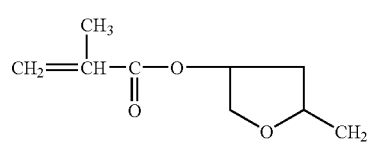

Homopolymer, Tg: 60° C.

The following hydrophilic monomers can be used together with the cationic polymerizable surfactant. Such hydrophilic monomers include a hydrophilic monomer having a monomer having a hydroxyl group, an ethylene oxide group, an amido group or an amino group as the hydrophilic group. These groups are considered to exist on the capsule surface in the state in which they are orientated toward the aqueous phase side, together with the cationic group, and easily form hydrogen bonds with OH groups of cellulose fiber of paper. Accordingly, when the ink jet recording ink using as a colorant the microencapsulated pigment obtained by the use in combination with the hydrophilic monomer having a hydrophilic group is ejected to the plain paper, the colorant becomes easier to be adsorbed on the cellulose fiber of the plain paper, and becomes easy to stay in the vicinity of a landing position and in the vicinity of the paper surface. This further increases image density, and can also inhibit the occurrence of blurring.

The above-mentioned hydrophilic monomers include OH—group-containing monomers such as 2-hydroxyethyl methacrylate, 2-hydroxypropyl methacrylate and 2-hydroxybutyl methacrylate; ethylene oxide group-containing monomers such as ethyldiethylene glycol acrylate, polyethylene glycol monomethacrylate and methoxypolyethylene glycol methacrylate; amido group-containing monomers such as acrylamide and N,N-dimethylacrylamide, amino group-containing alkylamino esters of acrylic acid or methacrylic acid such as N-methylaminoethyl methacrylate, N-methylaminoethyl acrylate, dimethylaminoethyl methacrylate, dimethylaminoethyl acrylate, diethylaminoethyl methacrylate and diethylaminoethyl acrylate; alkylamino group-containing unsaturated amides such as N-(2-dimethylaminoethyl)acrylamide, N-(2-dimethylaminoethyl)methacrylamide and N,N-dimethylaminopropylacrylamide; monovinylpyridines such as vinylpyridine; alkylamino group-containing vinyl ethers such as dimethylaminoethyl vinyl ether; vinylimidazole; and N-vinyl-2-pyrrolidone.

The polymerization reaction is preferably initiated by addition of the polymerization initiator. As such a polymerization initiator, preferred is a water-soluble polymerization initiator, which includes potassium persulfate, ammonium persulfate, sodium persulfate, 2,2-azobis(2-methylpropionamidine)dihydrochloride and 4,4-azobis(4-cyanovaleric acid).

Then, the production of the microencapsulated pigment according to the embodiment of the second invention can be suitably performed by adding the above-mentioned cationic polymerizable surfactant to the aqueous dispersion of the pigment particles having anionic groups as the hydrophilic groups on their surfaces, adding water or water and the aqueous solvent as needed, followed by mixing, performing irradiation with an ultrasonic wave for a specified period of time, then, adding the cationic polymerizable surfactant and/or the above-mentioned hydrophilic monomer (in addition to these, the above-mentioned hydrophobic monomer, crosslinkable monomer or monomer represented by general formula (1) can also be added), further adding water as needed, performing irradiation with an ultrasonic wave again for a specified period of time to achieve dispersion, elevating the temperature to a specified temperature (a temperature at which the polymerization initiator is activated) while performing ultrasonic wave irradiation and stirring, adding the polymerization initiator, and activating the polymerization initiator to perform emulsion polymerization.

When the above-mentioned hydrophobic monomer is used, more specifically, the production of the encapsulated pigment comprises the steps of adding the cationic polymerizable surfactant having a cationic group, a hydrophobic group and a polymerizable group to the aqueous dispersion of the above-mentioned pigment particles having anionic groups on their surfaces, followed by mixing and performing ultrasonic irradiation treatment, adding the hydrophobic monomer, followed by mixing, adding the cationic polymerizable surfactant and/or hydrophilic monomer, followed by mixing and performing ultrasonic irradiation treatment, and adding the polymerization initiator to perform emulsion polymerization, and the microencapsulated pigment can be suitably produced by performing the steps in the above-mentioned order.

The amount of the above-mentioned cationic polymerizable surfactant added at the time when the cationic polymerizable surfactant is added to the above-mentioned aqueous dispersion of the pigment particles having anionic groups on their surfaces is preferably within the range of 0.5 to 2 times the total molarity of the anionic groups to the amount of the pigment having anionic groups on its surface used (the weight of the pigment used [g]× the anionic group amount on the surface of the pigment [mol/g]), and more preferably within the range of 0.8 to 1.2 times the molarity thereof. By adjusting the amount added to 0.5 time the molarity or more, the cationic polymerizable surfactant is ionically strongly bonded to the pigment particle having anionic groups as the hydrophilic groups to make possible easy encapsulation. By adjusting the amount added to 2 times the molarity or less, the occurrence of the cationic polymerizable surfactant not adsorbed on the pigment particle can be reduced. The amount of the hydrophobic monomer added is preferably from 5 to 900 parts by weight, more preferably from 10 to 500 parts by weight, and particularly preferably from 15 to 200 parts by weight, based on 100 parts by weight of the pigment. The amount of the cationic polymerizable surfactant which forms the outermost shell of the capsule is preferably within the range of about 0.5 to about 5 times the molarity of the initially added cationic polymerizable surfactant, and more preferably within the range of about 1 to 2 times the molarity thereof. By adjusting the amount added to 1 time the molarity or more, the dispersibility and dispersion stability of the encapsulated particles become excellent, and ejection stability also becomes excellent. By adjusting the amount added to 2 times the molarity or less, the occurrence of the cationic polymerizable surfactant which makes no contribution to encapsulation can be inhibited, and the occurrence of a polymer particle other than the encapsulated particle can be prevented.

When the above-mentioned crosslinkable monomer and/or monomer represented by general formula (1) are used, more specifically, the production of the encapsulated pigment comprises the steps of adding the cationic polymerizable surfactant having a cationic group, a hydrophobic group and a polymerizable group to the aqueous dispersion of the above-mentioned pigment particles having anionic groups on their surfaces, followed by mixing and performing ultrasonic irradiation treatment, adding the crosslinkable monomer and/or monomer represented by general formula (1), followed by mixing, adding the cationic polymerizable surfactant and/or the above-mentioned hydrophilic monomer, followed by mixing and performing ultrasonic irradiation treatment, and adding the polymerization initiator to perform emulsion polymerization, and the microencapsulated pigment can be suitably produced by performing the steps in the above-mentioned order.

Further, when the above-mentioned crosslinkable monomer and/or monomer represented by general formula (1) are used, more specifically, the production of the encapsulated pigment comprises the steps of adding the cationic polymerizable surfactant having a cationic group, a hydrophobic group and a polymerizable group to the aqueous dispersion of the above-mentioned pigment particles having anionic groups on their surfaces, followed by mixing and performing ultrasonic irradiation treatment, adding the crosslinkable monomer and/or monomer represented by general formula (1) and the monomer having a long-chain alkyl group, followed by mixing, adding the cationic polymerizable surfactant and/or the above-mentioned hydrophilic monomer, followed by mixing and performing ultrasonic irradiation treatment, and adding the polymerization initiator to perform emulsion polymerization, and the microencapsulated pigment can be suitably produced by performing the steps in the above-mentioned order.

According to emulsion polymerization concerning the second invention, the cationic polymerizable surfactant is first allowed to be adsorbed by the anionic group on the surface of the pigment particle having anionic groups on its surface, then, the hydrophobic monomer is added, and further, the cationic polymerizable surfactant and/or hydrophilic monomer are added, followed by performing ultrasonic irradiation treatment, thereby forming the state in which the form of arrangement of the polymerizable surfactants and monomer existing around the pigment particle is extremely highly controlled and the cationic groups are orientated toward the aqueous phase in the outermost shell. Then, the monomer is converted to the polymer as this highly controlled form is kept, thereby obtaining the microencapsulated pigment according to the embodiment of the second invention. According to the above-mentioned process, the generation of water-soluble oligomers and polymers which are by-products can be decreased. This can reduce the viscosity of the dispersion of the resulting microencapsulated pigment, and make easier a purification process such as ultrafiltration. The ink using such a microencapsulated pigment is excellent in dispersion stability and ejection stability from a recording head, hard to blur to the plain paper, and can provide printed images high in color development and density.

For the reaction, a reaction vessel equipped with an ultrasonic generator, a stirrer, a reflux condenser, a dropping funnel and a temperature controller is preferably used.

The polymerization initiator is preferably added by dropping an aqueous solution of the water-soluble polymerization initiator in pure water.

The polymerization initiator can be suitably activated by elevating the temperature of the aqueous dispersion to a specified polymerization temperature. After the termination of the polymerization, the pH is adjusted to the range of 7.0 to 9.0, and filtration is preferably performed. The aqueous solvent as used herein means a solvent mainly composed of water, as described above, and may contain a water-soluble solvent such as a glycerol or a glycol. The polymerization temperature is preferably within the range of 60 to 90° C. When the pigment particles having cationic groups as the hydrophilic groups on their surfaces are not in the state of the aqueous dispersion, dispersion treatment is preferably performed as pretreatment using a general dispersing device such as a ball mill, a roll mill, an Eiger mill or a jet mill.

In the microencapsulated pigment according to the embodiment of the second invention obtained as described above, it is considered that the pigment particles small in average particle size are completely coated with the polymer layer (without any defect portion), and that the hydrophilic groups of the polymer layer are regularly orientated toward the aqueous solvent (see FIGS. 6 and 8). Accordingly, the pigment has high dispersion stability to the aqueous solvent.

Although the microencapsulated pigment according to the embodiment of the second invention is described above, the particle size of the microencapsulated pigment is preferably 400 nm or less, more preferably 300 nm or less, and particularly preferably from 50 to 200 nm.

Aqueous Dispersion

The aqueous dispersion according to an embodiment of the second invention contains the microencapsulated pigment according to the embodiment of the second invention, and as such an aqueous dispersion, there can be suitably exemplified the solution after emulsion polymerization described in the above-mentioned embodiment of the second invention. Other compounding components for obtaining the ink jet recording ink are further normally added to the aqueous dispersion, thereby being able to prepare the ink jet recording ink according to an embodiment of the second invention.

Ink Jet Recording Ink

The ink jet recording ink according to the embodiment of the second invention contains the aqueous dispersion, as described above. Further, the ink jet recording ink according to another embodiment of the second invention contains at least the microencapsulated pigment according to the embodiment of the second invention and water. The content of the microencapsulated pigment is preferably from 1 to 20% by weight, and more preferably from 3 to 15% by weight, based on the total weight of the ink jet recording ink. In particular, in order to obtain high print density and high color developability, it is preferably from 5 to 15% by weight.

Further, a solvent for the ink jet recording ink according to the embodiment of the second invention preferably contains water and a water-soluble organic solvent as basic solvents, and can contain any other components as needed.

The water-soluble organic solvents include an alkyl alcohol having 1 to 4 carbon atoms such as ethanol, methanol, butanol, propanol or isopropanol, a glycol ether such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-i-propyl ether, diethylene glycol mono-i-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-i-propyl ether, dipropylene glycol monomethyl ether, dipropylene glycol monoethyl ether, dipropylene glycol mono-n-propyl ether, dipropylene glycol mono-i-propyl ether, propylene glycol mono-n-butyl ether or dipropylene glycol mono-n-butyl ether, formamide, acetamide, dimethylsulfoxide, sorbit, sorbitan, acetin, diacetin, triacetin and sulfolane.

Further, the ink jet recording ink according to an embodiment of the second invention preferably contains a wetting agent comprising a high boiling water-soluble organic solvent as a water-soluble organic solvent, in order to impart water retentivity and wetting properties to the ink jet recording ink. As such a high boiling water-soluble organic solvent, there can be exemplified a high boiling water-soluble organic solvent having a boiling point of 180° C. or higher.

Specific examples of the water-soluble organic solvents having a boiling point of 180° C. or higher include ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycol having a molecular weight of 2,000 or less, 1,3-propylene glycol, isopropylene glycol, isobutylene glycol, 1,4-butanediol, 1,3-butanediol, 1,5-pentanediol, 1,6-hexanediol, glycerol, mesoerythritol and pentaerythritol. The high boiling water-soluble organic solvent having a boiling point of 200° C. or higher is preferred. These can be used either alone or as a mixture of two or more thereof. This can provide the ink jet recording ink which retains flowability and re-dispersibility for a long period of time even when it is allowed to stand in an open state (a state in which the ink is in contact with air at room temperature). Further, clogging of nozzles becomes hard to occur during printing or on restarting after the interruption of printing, so that high ejection stability is obtained. The content of the water-soluble organic solvent is preferably from about 10 to about 50% by weight, and more preferably from 10 to 30% by weight, based on the total weight of the ink jet recording ink.

Further, the water-soluble organic solvents include polar solvents such as 2-pyrrolidone, N-methylpyrrolidone, ε-caprolactam, dimethyl sulfoxide, sulfolane, morpholine, N-ethylmorpholine and 1,3-dimethyl-2-imidazolidinone, and one or more may be selected therefrom to use. Addition of these polar solvents is effective for dispersibility, and can improve ejection stability of the ink.

The content of these polar solvents is preferably from 0.1 to 20% by weight, and more preferably from 1 to 10% by weight, based on the total weight of the ink jet recording ink.

In order to accelerate penetration of the aqueous solvent into the recording medium, it is preferred that the ink jet recording ink according to an embodiment of the second invention contains a penetrant. Prompt penetration of the aqueous solvent into the recording medium can surely provide recorded matter having images with less blurring. As such penetrants, there are preferably used an alkyl ether of a polyhydric alcohol (also referred to as a glycol ether) and a 1,2-alkyldiol. Specifically, the alkyl ethers of polyhydric alcohols include, for example, ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-i-propyl ether, diethylene glycol mono-i-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-i-propyl ether, dipropylene glycol monomethyl ether, dipropylene glycol monoethyl ether, dipropylene glycol mono-n-propyl ether, dipropylene glycol mono-i-propyl ether, propylene glycol mono-n-butyl ether and dipropylene glycol mono-n-butyl ether. The 1,2-alkyldiols include, specifically, for example, 1,2-pentanediol and 1,2-hexanediol. Besides, the penetrant may be selected from diols of straight-chain hydrocarbons such as 1,3-propanediol, 1,4-butanediol, 1,5-pentanediol, 1,6-hexanediol, 1,7-heptanediol and 1,8-octanediol.

In an embodiment of the second invention, propylene glycol monobutyl ether, dipropylene glycol monobutyl ether, diethylene glycol monobutyl ether, triethylene glycol monobutyl ether, 1,2-pentanediol and 1,2-hexanediol are particularly preferred. The total content of these penetrants is preferably from 1 to 20% by weight, and more preferably from 1 to 10% by weight, based on the total weight of the ink jet recording ink. When the penetrant content is less than 1% by weight, the penetrant has no effect on permeability. On the other hand, exceeding 20% by weight results in defects such as deterioration of print quality due to blurring of images and an increase in viscosity.

In particular, the use of the 1,2-alkyldiol such as 1,2-pentanediol or 1,2-hexanediol remarkably improves drying properties after printing, and blurring.

In particular, in the embodiment of the second invention, inclusion of glycerol can sufficiently secure the clogging reliability and storage stability of the ink.

Further, inclusion of one or more compounds selected from the group consisting of an alkyl ether of a polyhydric alcohol and a 1,2-alkyldiol can enhance the permeability of ink solvent components into the recording medium, so that blurring in images dramatically decreases even in printing on the plain paper or recycled paper, coupled with the effect of the microencapsulated pigment according to the embodiment of the second invention, which causes print quality to be remarkably improved.

Further, when the above-mentioned glycol ether is used, it is particularly preferred that an acetylene glycol compound is used in combination therewith as a surfactant described later.

Furthermore, the ink jet recording ink according to an embodiment of the second invention preferably comprises a surfactant, particularly a cationic surfactant and/or a nonionic surfactant.

In particular, it is desirable that the ink jet recording ink according to the embodiment of the second invention contains an acetylene glycol-based surfactant and/or an acetylene alcohol-based surfactant as the surfactant. This can enhance the permeability of the aqueous solvent constituting the ink into the recording medium, and print with little blurring can be expected in various recording media.

Preferred specific examples of the acetylene glycol-based surfactants used in the second invention include a compound represented by the following formula (6):

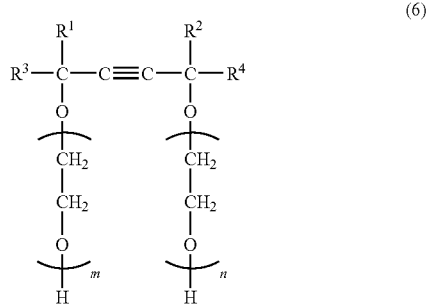

wherein m and n are each a number satisfying $0 \leqq m+n \leqq 50$, and $R^1$, $R^2$, $R^3$ and $R^4$ each independently represents an alkyl group (preferably an alkyl group having 6 or less carbon atoms).

Of the compounds represented by the above-mentioned formula (6), particularly preferred are 2,4,7,9-tetramethyl-5-decyne-4,7-diol, 3,6-dimethyl-4-octyne-3,6-diol and 3,5-dimethyl-1-hexyne-3-ol. As the compounds represented by the above-mentioned formula (6), it is also possible to utilize commercial products commercially available as the acetylene glycol-based surfactants. Specific examples thereof include Surfynol 104, 82, 465, 485 and TG (all are available from Air Products and Chemicals, Inc.), and Olfine STG and Olfine E1010 (trade name, manufactured by Nissin Chemical Industry Co., Ltd.). The acetylene alcohol-based surfactants include Surfynol 61 (available from Air Products and Chemicals, Inc.).

The content of these surfactants is preferably from 0.01 to 10% by weight, and more preferably from 0.1 to 5% by weight, based on the total weight of the ink jet recording ink.

Further, the ink jet recording ink according to an embodiment of the second invention can contain a pH adjuster. The pH of the ink is set preferably to the range of 4 to 7, and more preferably to the range of 6 to 7.

As the pH adjusters, preferred are specifically potassium metal compounds such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, sodium dihydrogenphosphate, disodium hydrogen-phosphate, potassium dihydrogenphosphate, dipotassium hydrogenphosphate, sodium oxalate, potassium oxalate, lithium oxalate, sodium borate, sodium tetraborate, potassium hydrogenphthalate and potassium hydrogentartrate; ammonia; and amines such as methylamine, ethylamine, diethylamine, trimethylamine, triethylamine, tris(hydroxymethyl)aminomethane hydrochloride, triethanolamine, diethanolamine, diethylethanolamine, triisopropenolamine, butyldiethanolamine, morpholine and propanolamine.

Further, for the purpose of mildewproofing, antisepsis or rust prevention, the ink jet recording ink of an embodiment of the second invention may contain benzoic acid, dichlorophene, hexachlorophene, sorbic acid, a p-hydroxybenzoic ester, ethylenediaminetetraacetic acid (EDTA), sodium dehydroacetate, 1,2-benthiazoline-3-one (product name: Proxel XL manufactured by Avecia), 3,4-isothiazoline-3-one or 4,4-dimethyloxazolidine.

Furthermore, for the purpose of preventing nozzles of a recording head from being dried, the ink jet recording ink of an embodiment of the second invention may contain urea, thiourea and/or ethylene urea.

The ink jet recording ink according to an embodiment of the second invention contains at least (1) the microencapsulated pigment according to the embodiment of the second invention, (2) at least one compound (penetrant) selected from the group consisting of diethylene glycol monobutyl ether, triethylene glycol monobutyl ether and/or an 1,2-alkyldiol having 4 to 10 carbon atoms, (4) glycerol, and (5) water.

Such an ink jet recording ink is particularly excellent in dispersion stability and ejection stability, which causes no clogging of the nozzles for a long period of time. Accordingly, stable printing is possible. Further, on the recording media such as plain paper, recycled paper and coated paper, there can be obtained high-quality images having good drying properties after printing, no blurring, high print density and excellent color developability.

The ink jet recording ink according to another particularly preferred embodiment of the second invention contains at least (1) the microencapsulated pigment according to the embodiment of the second invention, (2) at least one compound (penetrant) selected from the group consisting of diethylene glycol monobutyl ether, triethylene glycol monobutyl ether and/or an 1,2-alkyldiol having 4 to 10 carbon atoms, (3) the acetylene glycol-based surfactant and/or the acetylene alcohol-based surfactant, (4) glycerol, and (5) water.

Such an ink jet recording ink is particularly excellent in dispersion stability and ejection stability, which causes no clogging of the nozzles for a long period of time. Accordingly, stable printing is possible. Further, on the recording media such as plain paper, recycled paper and coated paper, there can be obtained high-quality images having particularly good drying properties after printing, little blurring, high print density and excellent color developability.

In general, when a pigment is dispersed, a dispersant such as a surfactant or a polymer dispersant is used. Such a dispersant is merely adsorbed on surfaces of pigment particles, so that the dispersant usually tends to be eliminated from the surfaces of the pigment particles by some kind of environmental factor. In contrast, according to the embodiment of the second invention, the surfaces of the pigment particles having hydrophilic groups thereon are completely encapsulated with a polymer coating or a crosslinked polymer coating, and the polymer coating or the crosslinked polymer coating surrounding the surfaces of the pigment particles is extremely firmly fixed to the surfaces of the pigment particles, as described above. It is therefore considered that the dispersant becomes difficult to be eliminated from the surfaces of the pigment particles.

More particularly, in an ink using a pigment dispersion in which a pigment is dispersed with the surfactant or the polymer dispersant, and improved in penetrability with the above-mentioned acetylene glycol-based surfactant and/or acetylene alcohol-based surfactant and the penetrant such as diethylene glycol monobutyl ether, triethylene glycol monobutyl ether, propylene glycol monobutyl ether, dipropylene glycol monobutyl ether or a 1,2-alkyldiol, the dispersant tends to be easily eliminated from the surfaces of the pigment particles by strong shear force applied when the ink is ejected through fine nozzles, which causes deteriorated dispersibility, resulting in unstable ejection.

In contrast, in the ink jet recording ink using the microencapsulated pigment according to the embodiment of the second invention, such a phenomenon is not observed at all, and the ink is stably ejected. Further, the pigment particles are encapsulated with the polymer coating, so that good solvent resistance is obtained. Accordingly, acceleration of elimination from the pigment particles due to the above-mentioned penetrant and swelling of the polymer become difficult to occur, thereby being able to maintain excellent dispersion stability for a long period of time.

Further, in the ink composition using the pigment dispersion in which the pigment is dispersed with the dispersant such as the surfactant or the polymer dispersant, and improved in penetrability, the viscosity of the ink composition generally tends to increase due to the dispersant dissolved in the solution without being adsorbed on the surfaces of the pigment particles from the beginning of dispersion or the dispersant eliminated from the pigment with an elapse of time after dispersion, so that the content of the pigment is limited in many cases. Accordingly, particularly on plain paper or recycled paper, sufficient print density can not be obtained to fail to obtain good color developability in many cases. In contrast, in the ink composition using the microencapsulated pigment according to the embodiment of the second invention, the pigment particles are encapsulated with the polymer coating as described above, so that the dispersant is difficult to be removed from the pigment particles, which causes no increase in the viscosity of the ink composition. Accordingly, the ink composition has the advantage that the ink composition is easily lowered in viscosity to make it possible to contain more pigment particles. Thus, sufficient print density can be obtained on plain paper or recycled paper.

In the particularly preferred embodiment of the second invention described above, diethylene glycol mono-butyl ether or triethylene glycol monobutyl ether of the above (2) as the penetrant is added preferably in an amount of 10% by weight or less, and more preferably in an amount of 0.5 to 5% by weight, based on the total weight of the ink composition. Addition of diethylene glycol monobutyl ether or triethylene glycol monobutyl ether exhibits the remarkable effect of improving penetrability, and is available for improving print quality. In addition, diethylene glycol monobutyl ether and/or triethylene glycol monobutyl ether improves solubility of the acetylene glycol-based surfactant.

In the particularly preferred embodiment of the second invention described above, the 1,2-alkylenediol having 4 to 10 carbon atoms of the above (2) as the penetrant is added preferably in an amount of 15% or less based on the total weight of the ink composition. When the 1,2-alkyldiol having 3 or less carbon atoms is used, sufficient penetrability is not obtained. The 1,2-alkyldiol having carbon atoms exceeding 15 is unfavorable because it becomes difficult to dissolve in water. When the amount added exceeds 15% by weight, it is unsuitable because a tendency to increase the viscosity appears. Specifically, 1,2-pentanediol or 1,2-hexanediol is preferably used as the 1,2-alkyldiol. These can be used alone or both can be used together. 1,2-Pentanediol is preferably added in an amount ranging from 3 to 15% by weight. Less than 3% by weight results in failure to obtain good penetrability. 1,2-Hexanediol is preferably added in an amount ranging from 0.5 to 10% by weight. Less than 0.5% by weight results in failure to obtain good penetrability.

Further, particularly, in the ink jet recording ink according to an embodiment of the second invention, in order to enhance the characteristic that the clogging is difficult to be generated (clogging reliability), a solid wetting agent is preferably added in an amount of 3 to 20% by weight based on the total weight of the ink.

In this specification, the solid wetting agent means a water-soluble substance which is solid at ordinary temperature (25° C.) and has a water-retaining function. Preferred examples of the solid wetting agents include a saccharide, a sugar alcohol, a hyaluronate, trimethylolpropane and 1,2,6-hexanetriol. Examples of the saccharides include a monosaccharide, a disaccharide, an oligosaccharide (including a trisaccharide and a tetrasaccharide) and a polysaccharide. Preferred examples thereof include glucose, mannose, fructose, ribose, xylose, arabinose, galactose, aldonic acid, glucitol (sorbit), maltose, cellobiose, lactose, sucrose, trehalose and maltotriose. The term "polysaccharide" as used herein means a saccharide in its broad sense, and is used in the sense that it includes substances widely occurring in nature such as alginic acid, α-cyclodextrin and cellulose. Further, derivatives of these saccharides include a reduced sugar of the above-mentioned saccharide (for example, a sugar alcohol represented by the general formula $HOCH_2(CHOH)_nCH_2OH$ (wherein n represents an integer of 2 to 5), an oxidized sugar (for example, an aldonic acid or a uronic acid), an amino acid and a thiosugar. In particular, a sugar alcohol is preferred, and specific examples thereof include maltitol, sorbitol and xylitol. As the hyaluronate, there can be used a product commercially available as a 1% aqueous solution of sodium hyaluronate (molecular weight: 350,000). These solid wetting agents are used either alone or as a mixture of two or more thereof. Particularly preferred examples of the solid wetting agents are trimethylolpropane and 1,2,6-hexanetriol.

The use of the solid wetting agent can restrain the evaporation of water by its water retaining function, so that the ink does not increase in viscosity in flow paths thereof or in the vicinities of nozzles, and a film is difficult to be formed, resulting in the difficulty of the occurrence of clogging. Further, the above-mentioned solid wetting agent is chemically stable, so that it does not decompose in the ink to be able to maintain the performance of the ink for a long period of time. Furthermore, even when the above-mentioned solid wetting agent is added to the ink, the ink does not wet a nozzle plate to be able to obtain stable ejection. In particular, when trimethylolpropane and 1,2,6-hexanetriol are used, the beneficial effect is obtained.

In the second invention, when the above-mentioned solid wetting agents are used alone, the content thereof is preferably from 3 to 20% by weight, and more preferably from 3 to 10% by weight, based on the total weight of the ink jet recording ink composition. When two or more thereof are used as a mixture, the total amount of two or more thereof is preferably from 3 to 20% by weight, and more preferably from 3 to 10% by weight, based on the total weight of the ink jet recording ink. When two or more thereof are used as a mixture, preferred is a combination of one selected from the group consisting of a saccharide, a sugar alcohol and a hyaluronate and one selected from the group consisting of trimethylolpropane and 1,2,6-hexane-triol. This combination is preferred because an increase in the viscosity of the ink caused by addition can be restrained. When the content of the solid wetting agents is less than 3% by weight, the sufficient effect of improving clogging reliability is not obtained. On the other hand, exceeding 20% by weight results in the tendency of the harmful effect to occur that the viscosity increases to become hard to obtain stable ejection.

In the particularly preferred embodiment of the second invention described above, the acetylene glycol-based surfactant and/or acetylene alcohol-based surfactant of the above (3) are added preferably in an amount of 0.01 to 10% by weight, and more preferably in an amount of 0.1 to 5% by weight, based on the total weight of the ink.

Although the ink jet recording inks according to the embodiments of the second invention have been described above, the microencapsulated pigment according to each embodiment of the second invention contained as a colorant is shaped like a true sphere as described above, so that flowability of the ink easily becomes Newtonian, and the cationic groups on its surface are considered to be regularly densely orientated toward the aqueous medium side. Accordingly, electrostatic repulsion is considered to be effectively generated. There can be therefore prepared the ink jet recording ink which is excellent in ejection stability, more excellent in dispersibility (high dispersibility) and dispersion stability and further improved in the concentration of the colorant contained, compared to the conventional microencapsulated pigments.

The ink jet recording can be suitably achieved by mounting the ink jet recording ink according to the embodiment of the second invention on a known ink jet printer, and printing the ink on the recording medium such as the plain paper or the recording medium for ink jet recording. This allows ejection stability of the ink from a recording head to be excellent, and can provide the recorded matter which is excellent in fastness, abrasion resistance and color developability of images, and high in image density of images, and in which images are hard to blur. Further, even when the plain paper is used as the recording medium, the recorded matter is obtained in which images are hard to blur, and which is excellent in color developability of images.

EXAMPLES

The first invention will be illustrated in greater detail with reference to the following Examples and Comparative Examples, but the first invention should not be construed as being limited thereto.

Preparation of Carbon Black Particles "P1" Having Cationic Groups on Their Surfaces A solution obtained by dissolving 13.02 g of N-(4-aminophenyl)pyridinium nitrite in 188 ml of deionized water was mixed with 100 g of carbon black having a surface area of 200 $m^2/g$ and a DBPA of 117 ml/100 g in a reaction vessel, and the resulting mixture was heated at 70° C. Then, 37.8 ml of 10% nitrous acid was added thereto, followed by reaction at 70 to 80° C. for 2 to 3 hours. During this time, a diazonium salt $N_2C_6H_4NC_5H_5^{2+}$ was formed, and reacted with carbon black to release bubbles. The resulting dispersion was subjected to centrifugation at about 20,000 rpm with a centrifugal separator, and filtered to adjust the particle size of carbon black particles having cationic groups on their surfaces to less than 0.5 μm. —$C_6H_4NC_5H_5^+$ groups were bonded to the carbon black particles having cationic groups on their surfaces, and a counter anion corresponding thereto was $NO_3^-$. The pigment dispersion of the carbon black particles having cationic groups on their surfaces was anion exchanged using an ion exchange resin as needed. The volume average particle size was measured with a laser doppler system size distribution analyzer, Microtrac UPA150, manufactured by Leads & Northlop Co. As a result, it was within the range of 100 to 200 nm.

Preparation of Magenta Pigment Particles "M1" Having Cationic Groups on Their Surfaces A solution of 13.02 g of N-(4-aminophenyl)pyridinium nitrite dissolved in 188 ml of deionized water was mixed with 100 g of an isoindolinone pigment (C.I. Pigment Red 122) in a reaction vessel, and the resulting mixture was heated at 70° C. Then, 37.8 ml of 10% nitrous acid was added thereto, followed by reaction at 70 to 80° C. for 2 to 3 hours. During this time, a diazonium salt $N_2C_6H_4NC_5H_5^{2+}$ was formed, and reacted with the magenta pigment to release bubbles. The resulting dispersion was subjected to centrifugation at about 20,000 rpm with a centrifugal separator, and filtered to adjust the particle size of magenta pigment particles having cationic groups on their surfaces to less than 0.5 μm. —$C_6H_4NC_5H_5^+$ groups were bonded to the magenta pigment particles having cationic groups on their surfaces, and a counter anion corresponding thereto was $NO_3^-$. The pigment dispersion of the carbon black particles having cationic groups on their surfaces was anion exchanged using an ion exchange resin as needed. The volume average particle size was measured with a laser doppler system size distribution analyzer, Microtrac UPA150, manufactured by Leads & Northlop Co. As a result, it was within the range of 100 to 200 nm.

Production of Microencapsulated Pigments "MCP1" to "MCP8" Production of Microencapsulated Pigment "MCP1"

Four grams of Aqualon KH-10 represented by the following general formula was added as an anionic polymerizable surfactant to an aqueous dispersion of 15 g of carbon black particles "P1" having cationic groups on their surfaces dispersed in 75 g of ion-exchanged water, followed by mixing. Then, the resulting mixture was irradiated with an ultrasonic wave for 15 minutes. Subsequently, 2 g of an anionic polymerizable surfactant, Aqualon KH-10, and 20 g of ion exchanged water were added thereto, followed by mixing. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of 0.03 g of potassium persulfate, a polymerization initiator, dissolved in 10 g of ion exchanged water was added dropwise, and polymerization was conducted at 80° C. for 6 hours, while introducing nitrogen into the reaction vessel. After the termination of the polymerization, the pH was adjusted to 8, and unreacted products were removed by ultrafiltration. Then, coarse particles were removed through a membrane filter having a pore size of 1 μm to obtain a dispersion of desired microencapsulated pigment "MCP1".

The volume average particle size of the resulting dispersion was measured with a laser doppler system size distribution analyzer, Microtrac UPA150, manufactured by Leads & Northlop Co. As a result, it was 130 nm. The resulting dispersion was diluted 100 times with ion exchanged water, and pretreated. Then, the aspect ratio and the Zingg index were determined by observing the particles under a scanning electron microscope and measuring the major and minor diameters and thickness of the particles. As a result, the aspect ratio was 1.0, and the Zingg index was 1.0.

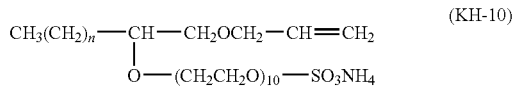

(KH-10)

Production of Microencapsulated Pigment "MCP2"

Four grams of Aqualon KH-10 was added as an anionic polymerizable surfactant to an aqueous dispersion of 15 g of carbon black particles "P1" having cationic groups on their surfaces dispersed in 75 g of ion-exchanged water, followed by mixing. Then, the resulting mixture was irradiated with an ultrasonic wave for 15 minutes. Subsequently, 6 g of benzyl methacrylate, 4 g of dodecyl methacrylate, 2 g of an anionic polymerizable surfactant, Aqualon KH-10, 0.5 g of 2-acrylamido-2-methylpropanesulfonic acid as a hydrophilic monomer and 50 g of ion exchanged water were added thereto, followed by mixing. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of 0.4 g of potassium persulfate dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to 8, and unreacted products were removed by ultrafiltration. Then, coarse particles were removed through a membrane filter having a pore size of 1 μm to obtain a dispersion of desired microencapsulated pigment "MCP2".

The volume average particle size of the resulting dispersion was measured with a laser doppler system size distribution analyzer, Microtrac UPA150, manufactured by Leads & Northlop Co. As a result, it was 180 nm. The resulting dispersion was diluted 100 times with ion exchanged water, and pretreated. Then, the aspect ratio and the Zingg index were determined by observing the particles under a scanning electron microscope and measuring the major and minor diameters and thickness of the particles. As a result, the aspect ratio was 1.0, and the Zingg index was 1.0. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was −7° C.

Production of Microencapsulated Pigment "MCP3"

Four grams of Aqualon KH-10 was added as an anionic polymerizable surfactant to an aqueous dispersion of 15 g of carbon black particles "P1" having cationic groups on their surfaces dispersed in 75 g of ion-exchanged water, followed by mixing. Then, the resulting mixture was irradiated with an ultrasonic wave for 15 minutes. Subsequently, 6 g of a cationic polymerizable surfactant, methacrylic acid dimethylaminoethylbenzyl chloride, and 20 g of ion exchanged water were added thereto, followed by mixing. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., a potassium persulfate aqueous solution of 0.04 g of 2,2-azobis(2-methylpropionamidine)dihydrochloride dissolved as a polymerization initiator in 10 g of ion exchanged water was added dropwise, and polymerization was conducted at 80° C. for 6 hours, while introducing nitrogen. into the reaction vessel. After the termination of the polymerization, the pH was adjusted to 6, and unreacted products were removed by ultrafiltration. Then, coarse particles were removed through a membrane filter having a pore size of 1 μm to obtain a dispersion of desired microencapsulated pigment "MCP3".

The volume average particle size of the resulting dispersion was measured with a laser doppler system size distribution analyzer, Microtrac UPA150, manufactured by Leads & Northlop Co. As a result, it was 130 nm. The resulting dispersion was diluted 100 times with ion exchanged water, and pretreated. Then, the aspect ratio and the Zingg index were determined by observing the particles under a scanning electron microscope and measuring the major and minor diameters and thickness of the particles. As a result, the aspect ratio was 1.0, and the Zingg index was 1.0.

Production of Microencapsulated Pigment "MCP4"

Four grams of Aqualon KH-10 was added as an anionic polymerizable surfactant to an aqueous dispersion of 15 g of carbon black particles "P1" having cationic groups on their surfaces dispersed in 75 g of ion-exchanged water, followed by mixing. Then, the resulting mixture was irradiated with an ultrasonic wave for 15 minutes. Subsequently, 6 g of benzyl methacrylate, 4 g of dodecyl methacrylate, 6 g of an anionic polymerizable surfactant, methacrylic acid dimethylaminoethylbenzyl chloride and 50 g of ion exchanged water were added thereto, followed by mixing. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., a potassium persulfate aqueous solution of 0.4 g of 2,2-azobis(2-methylpropionamidine)dihydrochloride dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to 6, and unreacted products were removed by ultrafiltration. Then, coarse particles were removed through a membrane filter having a pore size of 1 μm to obtain a dispersion of desired microencapsulated pigment "MCP4".

The volume average particle size of the resulting dispersion was measured with a laser doppler system size distribution analyzer, Microtrac UPA150, manufactured by Leads & Northlop Co. As a result, it was 180 nm. The resulting dispersion was diluted 100 times with ion exchanged water, and pretreated. Then, the aspect ratio and the Zingg index were determined by observing the particles under a scanning electron microscope and measuring the major and minor diameters and thickness of the particles. As a result, the aspect ratio was 1.0, and the Zingg index was 1.0. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was −7° C.

Production of Microencapsulated Pigment "MCP5"

Four grams of Aqualon KH-10 was added as an anionic polymerizable surfactant to an aqueous dispersion of 15 g of magenta pigment particles "M1" having cationic groups on their surfaces dispersed in 75 g of ion-exchanged water, followed by mixing. Then, the resulting mixture was irradiated with an ultrasonic wave for 15 minutes. Subsequently, 6 g of benzyl methacrylate, 4 g of dodecyl methacrylate, 2 g of an anionic polymerizable surfactant, Aqualon KH-10, 0.5 g of 2-acrylamido-2-methylpropanesulfonic acid as a hydrophilic monomer and 50 g of ion exchanged water were added thereto, followed by mixing. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of 0.4 g of potassium persulfate dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to 8, and unreacted products were removed by ultrafiltration. Then, coarse particles were removed through a membrane filter having a pore size of 1 μm to obtain a dispersion of desired microencapsulated pigment "MCP5".

The volume average particle size of the resulting dispersion was measured with a laser doppler system size distribution analyzer, Microtrac UPA150, manufactured by Leads & Northlop Co. As a result, it was 170 nm. The resulting dispersion was diluted 100 times with ion exchanged water, and pretreated. Then, the aspect ratio and the Zingg index were determined by observing the particles under a scanning electron microscope and measuring the major and minor diameters and thickness of the particles. As a result, the aspect ratio was 1.0, and the Zingg index was 1.0. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was −7° C.

Production of Microencapsulated Pigment "MCP6"

Four grams of Aqualon KH-10 was added as an anionic polymerizable surfactant to an aqueous dispersion of 20 g of carbon black particles "P1" having cationic groups on their surfaces dispersed in 80 g of ion-exchanged water, followed by mixing. Then, the resulting mixture was irradiated with an ultrasonic wave for 15 minutes. Subsequently, 2.45 g of isobonyl methacrylate, 2.55 g of lauryl methacrylate, 4 g of an anionic polymerizable surfactant, Aqualon KH-10, and 30 g of ion exchanged water were added thereto, followed by mixing. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of 0.4 g of potassium persulfate dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to 8, and unreacted products were removed by ultrafiltration. Then, coarse particles were removed through a membrane filter having a pore size of 1 μm to obtain a dispersion of desired microencapsulated pigment "MCP6".

The volume average particle size of the resulting dispersion was measured with a laser doppler system size distribution analyzer, Microtrac UPA150, manufactured by Leads & Northlop Co. As a result, it was 180 nm. The resulting dispersion was diluted 100 times with ion exchanged water, and pretreated. Then, the aspect ratio and the Zingg index were determined by observing the particles under a scanning electron microscope and measuring the major and minor diameters and thickness of the particles. As a result, the aspect ratio was 1.0, and the Zingg index was 1.0. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was 5° C.

Production of Microencapsulated Pigment "MCP7"

Four grams of Aqualon KH-10 was added as an anionic polymerizable surfactant to an aqueous dispersion of 20 g of carbon black particles "P1" having cationic groups on their surfaces dispersed in 80 g of ion-exchanged water, followed by mixing. Then, the resulting mixture was irradiated with an ultrasonic wave for 15 minutes. Subsequently, 8 g of benzyl methacrylate, 3 g of dodecyl methacrylate and 0.01 g of diethylene glycol dimethacrylate were mixed and added thereto, followed by mixing with stirring. Then, 5 g of an anionic polymerizable surfactant, Aqualon KH-10, which had previously been dissolved in 50 g of ion exchanged water, was added thereto. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of 0.6 g of potassium persulfate dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to 8, and unreacted products were removed by ultrafiltration. Then, coarse particles were removed through a membrane filter having a pore size of 1 μm to obtain a dispersion of desired microencapsulated pigment "MCP7".

The volume average particle size of the resulting dispersion was measured with a laser doppler system size distribution analyzer, Microtrac UPA150, manufactured by Leads & Northlop Co. As a result, it was 150 nm. The resulting dispersion was diluted 100 times with ion exchanged water, and pretreated. Then, the aspect ratio and the Zingg index were determined by observing the particles under a scanning electron microscope and measuring the major and minor diameters and thickness of the particles. As a result, the aspect ratio was 1.0, and the Zingg index was 1.0. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was 7° C.

Production of Microencapsulated Pigment "MCP8"

Four grams of Aqualon KH-10 was added as an anionic polymerizable surfactant to an aqueous dispersion of 20 g of carbon black particles "P1" having cationic groups on their surfaces dispersed in 80 g of ion-exchanged water, followed by mixing. Then, the resulting mixture was irradiated with an ultrasonic wave for 15 minutes. Subsequently, 8 g of benzyl methacrylate, 3 g of dodecyl methacrylate and 0.01 g of 1,6-hexanediol dimethacrylate were mixed and added thereto, followed by mixing with stirring. Then, 5 g of a cationic polymerizable surfactant, methacrylic acid dimethylaminoethylbenzyl chloride, which had previously been dissolved in 50 g of ion exchanged water, was added thereto. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., a potassium persulfate aqueous solution of 0.6 g of 2,2-azobis(2-methylpropionamidine)dihydrochloride dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to 6, and unreacted products were removed by ultrafiltration. Then, coarse particles were removed through a membrane filter having a pore size of 1 μm to obtain a dispersion of desired microencapsulated pigment "MCP8".

The volume average particle size of the resulting dispersion was measured with a laser doppler system size distribution analyzer, Microtrac UPA150, manufactured by Leads & Northlop Co. As a result, it was 150 nm. The resulting dispersion was diluted 100 times with ion exchanged water, and pretreated. Then, the aspect ratio and the Zingg index were determined by observing the particles under a scanning electron microscope and measuring the major and minor diameters and thickness of the particles. As a result, the aspect ratio was 1.0, and the Zingg index was 1.0. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was 7° C.

Production of Microencapsulated Pigments "MCP9" and "MCP10"

MCP9 (a microencapsulated black pigment) and MCP10 (a microencapsulated magenta pigment) were produced based on a method described in JP 10-140065 A.

Production of Microencapsulated Pigment "MCP9"

A flask was charged with 250 g of methyl ethyl ketone, the temperature of which was elevated to 75° C. with stirring under a nitrogen seal. A mixed solution of 85 g of n-butyl methacrylate, 90 g of n-butyl acrylate, 40 g of 2-hydroxyethyl methacrylate, 25 g of methacrylic acid and 20 g of a polymerization initiator, Perbutyl O (tert-butyl peroxyoctoate manufactured by Nippon Oil & Fats Co., Ltd.) was added dropwise thereto taking 2 hours, followed by further reaction for 15 hours to obtain a solution of a vinyl polymer.

Into a stainless steel beaker, 8 g of the above-mentioned polymer solution was put together with 0.4 g of dimethylethanolamine and 8 g of a black pigment (MA-100 manufactured by Mitsubishi Chemical Corporation), and ion exchanged water was further added to bring the total amount to 40 g. Then, 250 g of zirconia beads having an average particle size of 0.5 mm was added thereto, followed by kneading with a sand mill for 4 hours. After the termination of the kneading, the zirconia beads were removed by filtration to obtain an aqueous dispersion in which a dispersion comprising the polymer having the carboxyl group neutralized with the base and the pigment was dispersed in water. A 1 N hydrochloric acid was added to the resulting dispersion with stirring with a dispersing device at ordinary temperature until the resin was insolubilized to be firmly fixed to the pigment. At this time, the pH was 3 to 5. The aqueous medium containing the pigment to which the polymer was firmly fixed was filtered by suction and washed with water to obtain a wet cake. A 10% aqueous solution of NaOH was added thereto, while stirring the wet cake with a dispersing device, until the pH of the dispersion reached 8.5 to 9.5, and stirring was continued for 1 hour. Then, ion exchanged water was added to adjust the solid concentration to 20%, thereby obtaining microencapsulated pigment "MCP9" of carbon black. The aspect ratio thereof was 1.4, and the Zingg index thereof was 1.4.

Production of Microencapsulated Pigment "MCP10"

A flask was charged with 250 g of methyl ethyl ketone, the temperature of which was elevated to 75° C. with stirring under a nitrogen seal. A mixed solution of 170 g of n-butyl methacrylate, 58 g of n-butyl acrylate, 35 g of 2-hydroxyethyl methacrylate, 35 g of methacrylic acid and 20 g of a polymerization initiator, Perbutyl O was added dropwise thereto taking 2 hours, followed by further reaction for 15 hours to obtain a solution of a vinyl polymer.

Into a stainless steel beaker, 15 g of the above-mentioned polymer solution was put together with 0.8 g of dimethylethanolamine and 15 g of a magenta pigment (C.I. Pigment Red 122), and ion exchanged water was further added to bring the total amount to 75 g. Then, 250 g of zirconia beads having an average particle size of 0.5 mm was added thereto, followed by kneading with a sand mill for 4 hours. After the termination of the kneading, the zirconia beads were removed by filtration to obtain an aqueous dispersion in which a dispersion comprising the polymer having the carboxyl group neutralized with the base and the pigment was dispersed in water. A 1 N hydrochloric acid was added to the resulting dispersion with stirring with a dispersing device at ordinary temperature until the resin was insolubilized to be firmly fixed to the pigment. At this time, the pH was 3 to 5. The aqueous medium containing the pigment to which the polymer was firmly fixed was filtered by suction and washed with water to obtain a wet cake. A 10% aqueous solution of NaOH was added thereto, while stirring the wet cake with a dispersing device, until the pH of the dispersion reached 8.5 to 9.5, and stirring was continued for 1 hour. Then, ion exchanged water was added to adjust the solid concentration to 20%, thereby obtaining microencapsulated pigment "MCP9" of C.I. Pigment Red 122. The aspect ratio thereof was 1.4, and the Zingg index thereof was 1.4.

Production of "Fine Polymer Particles 1 to 4"

Production of "Fine Polymer Particles 1"

A reaction vessel equipped with a stirrer, a reflux condenser, a dropping device and a temperature indicator was charged with 90 g of ion exchanged water and 1 g of an anionic polymerizable surfactant, Aqualon KH-5, and the temperature thereof was elevated to 70° C. with stirring while replacing the atmosphere with nitrogen. The internal temperature was maintained at 70° C., and 2 g of potassium persulfate was added as a polymerization initiator and dissolved. Then, an emulsion previously obtained by stirring 1 g of an anionic polymerizable surfactant, Aqualon KH-5, 43.5 g of styrene, 47.5 g of n-butyl acrylate and 5 g of 2-acrylamido-2-methylpropanesulfonic acid in 45 g of ion exchanged water was continuously added dropwise into the reaction vessel taking 3 hours. After the termination of the dropwise addition, the reaction was further continued for 3 hours. After the resulting polymer emulsion was cooled to ordinary temperature, exchanged water and a 2 mol/l aqueous solution of potassium hydroxide were added to adjust the solid content to 35% by weight and the pH to 8. The concentration of fine polymer particles in the resulting polymer emulsion was adjusted to 0.1% by weight, and 3 volumes thereof was allowed to contact with 1 volume of a 1 mol/l aqueous solution of magnesium nitrate in a cell of a U-3300 spectrophotometer (manufactured by Hitachi, Ltd.). For the transmittance at a wavelength of 700 nm, the time taken to reach 50% of the initial value was 90 seconds.

Further, the volume average particle size of the resulting dispersion was measured with a laser doppler system size distribution analyzer, Microtrac UPA150, manufactured by Leads & Northlop Co. As a result, it was 100 nm. Furthermore, the resulting dispersion was dried at room temperature, and the glass transition temperature thereof was measured with a DSC200 thermal scanning calorimeter (differential scanning calorimeter: DSC) manufactured by Seiko Denshi Co., Ltd. As a result, it was 0° C. The minimum film forming temperature was 10° C. The concentration of fine polymer particles in the resulting polymer emulsion was adjusted to 10% by weight, and the contact angle thereof on a Teflon (registered trade mark) plate was measured. As a result, it was 85 degrees. In addition, the surface tension was measured with a CBVP-Z surface tension meter (manufactured by Kyowa Interface Science Co., Ltd.). As a result, it was $55 \times 10^{-3}$ N/m (55 dyne/cm).

Production of "Fine Polymer Particles 2"

A reaction vessel equipped with a stirrer, a reflux condenser, a dropping device and a temperature indicator was charged with 90 g of ion exchanged water and 1 g of an anionic polymerizable surfactant, Aqualon KH-5, and the temperature thereof was elevated to 70° C. with stirring while replacing the atmosphere with nitrogen. The internal temperature was maintained at 70° C., and 2 g of potassium persulfate was added as a polymerization initiator and dissolved. Then, an emulsion previously obtained by stirring 1 g of an anionic polymerizable surfactant, Aqualon KH-5, 43.5 g of styrene, 47.5 g of n-butyl acrylate, 0.3 g of diethylene glycol dimethacrylate and 5 g of 2-acrylamido-2-methylpropanesulfonic acid in 45 g of ion exchanged water was continuously added dropwise into the reaction vessel taking 3 hours. After the termination of the dropwise addition, the reaction was further continued for 3 hours. After the resulting polymer emulsion was cooled to ordinary temperature, exchanged water and a 2 mol/l aqueous solution of potassium hydroxide were added to adjust the solid content to 35% by weight and the pH to 8. The concentration of fine polymer particles in the resulting polymer emulsion was adjusted to 0.1% by weight, and 3 volumes thereof was allowed to contact with 1 volume of a 1 mol/l aqueous solution of magnesium nitrate in a cell of a U-3300 spectrophotometer (manufactured by Hitachi, Ltd.). For the transmittance at a wavelength of 700 nm, the time taken to reach 50% of the initial value was 80 seconds.

Further, the volume average particle size of the resulting dispersion was measured with a laser doppler system size distribution analyzer, Microtrac UPA150, manufactured by Leads & Northlop Co. As a result, it was 100 nm.

Furthermore, the resulting dispersion was dried at room temperature, and the glass transition temperature thereof was measured with a DSC200 thermal scanning calorimeter (differential scanning calorimeter: DSC) manufactured by Seiko Denshi Co., Ltd. As a result, it was 3° C. The minimum film forming temperature was 15° C. The concentration of fine polymer particles in the resulting polymer emulsion was adjusted to 10% by weight, and the contact angle thereof on a Teflon (registered trade mark) plate was measured. As a result, it was 89 degrees. In addition, the surface tension was measured with a CBVP-Z surface tension meter (manufactured by Kyowa Interface Science Co., Ltd.). As a result, it was $57 \times 10^{-3}$ N/m (57 dyne/cm).

Production of "Fine Polymer Particles 3"

A reaction vessel equipped with a stirrer, a reflux condenser, a dropping device and a temperature indicator was charged with 90 g of ion exchanged water and 1 g of an anionic polymerizable surfactant, Aqualon KH-5, and the temperature thereof was elevated to 70° C. with stirring while replacing the atmosphere with nitrogen. The internal temperature was maintained at 70° C., and 2 g of potassium persulfate was added as a polymerization initiator and dissolved. Then, an emulsion previously obtained by stirring 1 g of an anionic polymerizable surfactant, Aqualon KH-5, 43.5 g of styrene, 47.5 g of n-butyl acrylate, 3 g of ethylene glycol dimethacrylate and 5 g of 2-acrylamido-2-methylpropanesulfonic acid in 45 g of ion exchanged water was continuously added dropwise into the reaction vessel taking 3 hours. After the termination of the dropwise addition, the reaction was further continued for 3 hours. After the resulting polymer emulsion was cooled to ordinary temperature, exchanged water and a 2 mol/l aqueous solution of potassium hydroxide were added to adjust the solid content to 35% by weight and the pH to 8. The concentration of fine polymer particles in the resulting polymer emulsion was adjusted to 0.1% by weight, and 3 volumes thereof was allowed to contact with 1 volume of a 1 mol/l aqueous solution of magnesium nitrate in a cell of a U-3300 spectrophotometer (manufactured by Hitachi, Ltd.). For the transmittance at a wavelength of 700 nm, the time taken to reach 50% of the initial value was 10 seconds.

Further, the volume average particle size of the resulting dispersion was measured with a laser doppler system size distribution analyzer, Microtrac UPA150, manufactured by Leads & Northlop Co. As a result, it was 90 nm.

Furthermore, the resulting dispersion was dried at room temperature, and the glass transition temperature thereof was measured with a DSC200 thermal scanning calorimeter (differential scanning calorimeter: DSC) manufactured by Seiko Denshi Co., Ltd. As a result, it was 8° C. The minimum film forming temperature was 20° C. The concentration of fine polymer particles in the resulting polymer emulsion was adjusted to 10% by weight, and the contact angle thereof on a Teflon (registered trade mark) plate was measured. As a result, it was 110 degrees. In addition, the surface tension was measured with a CBVP-Z surface tension meter (manufactured by Kyowa Interface Science Co., Ltd.). As a result, it was $59 \times 10^{-3}$ N/m (59 dyne/cm).

Production of "Fine Polymer Particles 4"

A reaction vessel equipped with a stirrer, a reflux condenser, a dropping device and a temperature indicator was charged with 900 g of ion exchanged water and 4 g of sodium laurylsulfate, and the temperature thereof was elevated to 70° C. with stirring while replacing the atmosphere with nitrogen. The internal temperature was maintained at 70° C., and 2 g of potassium persulfate was added as a polymerization initiator and dissolved. Then, an emulsion previously obtained by stirring 450 g of ion exchanged water, 3 g of sodium laurylsulfate, 20 g of acrylamide, 435 g of styrene, 475 g of n-butyl acrylate and 30 g of methacrylic acid was continuously added dropwise into the reaction vessel taking 3 hours. After the termination of the dropwise addition, the reaction was further continued for 3 hours. After the resulting aqueous emulsion was cooled to ordinary temperature, exchanged water and aqueous ammonia were added to adjust the solid content to 40% by weight, and the pH to 8. After the resulting polymer emulsion was cooled to ordinary temperature, ion exchanged water and a 2 mol/l aqueous solution of potassium hydroxide were added to adjust the solid content to 35% by weight and the pH to 8. The concentration of fine polymer particles in the resulting polymer emulsion was adjusted to 0.1% by weight, and 3 volumes thereof was allowed to contact with 1 volume of a 1 mol/l aqueous solution of magnesium nitrate in a cell of a U-3300 spectrophotometer (manufactured by Hitachi, Ltd.). For the transmittance at a wavelength of 700 nm, the time taken to reach 50% of the initial value was 70 seconds.

Further, the volume average particle size of the resulting dispersion was measured with a laser doppler system size distribution analyzer, Microtrac UPA150, manufactured by Leads & Northlop Co. As a result, it was 90 nm.

Furthermore, the resulting dispersion was dried at room temperature, and the glass transition temperature thereof was measured with a DSC200 thermal scanning calorimeter (differential scanning calorimeter: DSC) manufactured by Seiko Denshi Co., Ltd. As a result, it was 12° C. The minimum film forming temperature was 22° C. The concentration of fine polymer particles in the resulting polymer emulsion was adjusted to 10% by weight, and the contact angle thereof on a Teflon (registered trade mark) plate was measured. As a result, it was 89 degrees. In addition, the surface tension was measured with a CBVP-Z surface tension meter (manufactured by Kyowa Interface Science Co., Ltd.). As a result, it was $57 \times 10^{-3}$ N/m (59 dyne/cm).

Preparation of Ink Jet Recording Inks

Examples 1A to 16A and Comparative Examples 1A to 13A

Based on compositions shown in Tables 1A to 5A, ink jet recording inks of Examples 1A to 16A and Comparative Examples 1A to 13A were prepared.

TABLE 1A

Ink Compositions of Ink Jet Recording Inks of Examples

| | | Ex. 1A | Ex. 2A | Ex. 3A | Ex. 4A | Ex. 5A | Ex. 6A | Ex. 7A | Ex. 8A | Ex. 9A | Ex. 10A |
|---|---|---|---|---|---|---|---|---|---|---|---|
| Micro- | MCP1 | 8 | 8 | 8 | | | | | | | |
| encapsulated | MCP2 | | | | 8 | | | | | | |
| Pigment | MCP3 | | | | | 8 | | | | | |
| | MCP4 | | | | | | 8 | | | | |
| | MCP5 | | | | | | | 8 | | | |
| | MCP6 | | | | | | | | 8 | | |
| | MCP7 | | | | | | | | | 8 | |
| | MCP8 | | | | | | | | | | 8 |
| Wetting Agent | Glycerol | 15 | 15 | 15 | 15 | 15 | 15 | 15 | 15 | 15 | 15 |
| Penetrant | Diethylene Glycol Monobutyl Ether | | 3 | | | 3 | | 3 | 3 | | 3 |
| | Triethylene Glycol Monobutyl Ether | | | 3 | 3 | | 3 | | | 3 | |
| | 1,2-Hexanediol | | | 3 | 3 | 2 | 3 | 3 | 3 | | 2 |
| Solid Wetting | Trimethylolpropane | 5 | 7 | | 3 | | 3 | | 3 | 5 | 3 |
| Agent | 1,2,8-Hexanetriol | | | 3 | | | | 3 | | | |
| | Xylitol | | | | | | | 3 | | 1 | 2 |
| Polar Solvent | 2-Pyrrolidone | 2 | 2 | 2 | 2 | 2 | 2 | 2 | 2 | 2 | 2 |
| Surfactant | Olfine E1010 | | 0.5 | | 0.5 | 0.5 | | 0.5 | 0.5 | | |
| | Surfynol 465 | | | 0.5 | | | 0.5 | | | 0.5 | 0.5 |
| pH Adjuster | Potassium Hydroxide | 0.1 | 0.1 | 0.1 | 0.1 | | | 0.1 | 0.1 | 0.1 | 0.1 |
| | Sodium Dihydrogenphosphate | | | | | 0.1 | 0.1 | | | | |
| Preservative | Proxel XL-2 | 0.5 | 0.5 | 0.5 | 0.5 | 0.5 | 0.5 | 0.5 | 0.5 | 0.5 | 0.5 |
| Water | Ion Exchanged Water | bal. | bal. | bal. | bal. | bal. | bal. | bal. | bal. | bal. | bal. |

The amounts added are all indicated by % by weight.
The amounts of the microencapsulated pigments are indicated by the solid concentration.

TABLE 2A

Ink Compositions of Ink Jet Recording Inks of Examples

| | | Ex. 11A | Ex. 12A | Ex. 13A | Ex. 14A | Ex. 15A | Ex. 16A |
|---|---|---|---|---|---|---|---|
| Microencapsulated | MCP1 | 8 | | | | | |
| Pigment | MCP3 | | 8 | | | | |
| | MCP4 | | | 8 | | | |
| | MCP6 | | | | 8 | | |

TABLE 2A-continued

Ink Compositions of Ink Jet Recording Inks of Examples

|  |  | Ex. 11A | Ex. 12A | Ex. 13A | Ex. 14A | Ex. 15A | Ex. 16A |
|---|---|---|---|---|---|---|---|
|  | MCP7 |  |  |  |  | 8 |  |
|  | MCP8 |  |  |  |  |  | 8 |
| Fine Polymer Particles | Fine Polymer Particles 1 | 3 | 3 |  |  |  |  |
|  | Fine Polymer Particles 2 |  |  | 3 |  |  |  |
|  | Fine Polymer Particles 3 |  |  |  | 3 |  |  |
|  | Fine Polymer Particles 4 |  |  |  |  | 3 | 3 |
| Wetting Agent | Glycerol | 15 | 15 | 15 | 15 | 15 | 15 |
| Penetrant | Diethylene Glycol Monobutyl Ether | 3 | 3 |  |  | 3 | 3 |
|  | Triethylene Glycol Monobutyl Ether |  |  | 3 | 3 |  |  |
|  | 1,2-Hexanediol | 2 | 3 | 2 | 2 | 3 | 2 |
| Solid Wetting Agent | Trimethylolpropane | 7 | 5 | 1 | 5 | 7 | 5 |
|  | 1,2,8-Hexanetriol |  |  | 5 |  |  |  |
|  | Xylitol |  | 2 |  | 2 |  | 2 |
| Polar Solvent | 2-Pyrrolidone | 2 | 2 | 2 | 2 | 2 | 2 |
| Surfactant | Olfine E1010 | 0.5 | 0.5 |  | 0.5 | 0.5 | 0.5 |
|  | Surfynol 465 |  |  | 0.5 |  |  |  |
| pH Adjuster | Potassium Hydroxide | 0.1 |  | 0.1 | 0.1 | 0.1 | 0.1 |
|  | Sodium Dihydrogenphosphate |  | 0.1 |  |  |  |  |
| Preservative | Proxel XL-2 | 0.5 | 0.5 | 0.5 | 0.5 | 0.5 | 0.5 |
| Water | Ion Exchanged Water | bal. | bal. | bal. | bal. | bal. | bal. |

The amounts added are all indicated by % by weight.
The amounts of the microencapsulated pigments are indicated by the solid concentration.

TABLE 3A

Ink Compositions of Ink Jet Recording Ink of Comparative Examples

|  |  | Comparative Example 1A | Comparative Example 2A | Comparative Example 3A | Comparative Example 4A |
|---|---|---|---|---|---|
| Microencapsulated Pigment | MCP9 | 4 |  | 8 |  |
|  | MCP10 |  | 2 |  | 8 |
| Wetting Agent | Glycerol | 15 | 15 | 15 | 13 |
|  | Diethylene Glycol |  |  |  | 5 |
| Penetrant | Diethylene Glycol Monobutyl Ether | 6 | 6 | 5 | 5 |
|  | 1,2-Hexanediol |  |  | 2 | 2 |
| Surfactant | Surfynol 465 | 1 | 0.5 | 1 | 1 |
| pH Adjuster | Propanolamine | 2 | 3 | 3 | 3 |
| Preservative | Proxel XL-2 | 0.05 | 0.05 | 0.05 | 0.05 |
| Water | Ion Exchanged Water | bal. | bal. | bal. | bal. |

The amounts added are all indicated by % by weight.
The amounts of the microencapsulated pigments are indicated by the solid concentration.

TABLE 4A

Ink Compositions of Ink Jet Recording Ink of Comparative Examples

|  |  | Comparative Example 5A | Comparative Example 6A | Comparative Example 7A | Comparative Example 8A |
|---|---|---|---|---|---|
| Pigment | P1 | 6 |  | 6 |  |
|  | M1 |  | 6 |  | 6 |
| Wetting Agent | Glycerol | 15 | 15 | 15 | 15 |
| Penetrant | Diethylene Glycol Monobutyl Ether | 5 | 5 | 5 | 5 |
|  | 1,2-Hexanediol | 3 | 3 | 3 | 3 |
| Solid Wetting Agent | Trimethylolpropane |  |  | 7 | 5 |
|  | 1,2,8-Hexanetriol |  |  |  |  |
|  | Xylitol |  |  |  | 2 |
| Polar Solvent | 2-Pyrrolidone |  |  | 2 | 2 |
| Surfactant | Surfynol 465 | 1 | 1 | 1 | 1 |
| pH Adjuster | Sodium Dihydrogenphosphate | 0.1 | 0.1 | 1 | 1 |
| Preservative | Proxel XL-2 | 0.05 | 0.05 |  |  |
| Water | Ion Exchanged Water | bal. | bal. | bal. | bal. |

The amounts added are all indicated by % by weight.
The amounts of the microencapsulated pigments are indicated by the solid concentration.

TABLE 5A

Ink Compositions of Ink Jet Recording Inks of Comparative Examples

|  | Comparative Example 9A | Comparative Example 10A | Comparative Example 11A | Comparative Example 12A | Comparative Example 13A |
|---|---|---|---|---|---|
| Pigment Carbon Black | 8 | 6 | | | |
| C.I. Pigment Red 122 | | | 6 | | |
| C.I. Pigment Blue 15:3 | | | | 6 | |
| C.I. Pigment Yellow 185 | | | | | 6 |
| Ammonium Salt of Styrene-Acrylic Acid Copolymer (molecular weight 70,000, polymer component: 38%) | 1 | 1 | 1 | 1 | 1 |
| Glycerol | 15 | 10 | 10 | 15 | 10 |
| Diethylene Glycol | 10 | 8 | 8 | 10 | 8 |
| 1,2-Hexanediol | | | | | 5 |
| 2-Pyrrolidone | | 2 | 2 | | 2 |
| Olfine E1010 | | 1 | 1 | | |
| Potassium Hydroxide | 0.1 | 0.1 | 0.1 | 0.1 | 0.1 |
| Proxel XL-2 | 0.05 | 0.05 | 0.05 | 0.05 | 0.05 |
| Ion Exchanged Water | bal. | bal. | bal. | bal. | bal. |

The amounts added are all indicated by % by weight.
The amounts of the microencapsulated pigments are indicated by the solid concentration.

Evaluation

The ink jet recording inks of Examples 1A to 16A, Comparative Examples 1A to 13A and recorded matter printed using these inks were evaluated by methods shown below.

Evaluation 1: Viscosity

The viscosity of ink jet recording inks of Examples and Comparative Examples were measured. The results thereof are shown in Tables 6A and 7A.

The viscosity (mPa·s) was measured at 20° C. at a shear rate of 20 sec$^{-1}$ with a Physica MCR300 rheometer manufactured by Paar Physica using a corn plate (CP 75-1 manufactured by Paar Physica) having a corn radius of 37.50 mm, a corn angle of 1 degree and a measuring gap of 0.05 mm.

Evaluation 2-1: Dispersibility 1

For each of the ink jet recording inks of Examples and Comparative Examples, the storage modulus (Pa) at each angular speed at the time when the angular speed was applied from 0.5 rad/sec to 5 rad/sec was measured at 20° C. with a Physica MCR300 rheometer manufactured by Paar Physica using a corn plate (CP 75-1 manufactured by Paar Physica) having a corn radius of 37.50 mm, a corn angle of 1 degree and a measuring gap of 0.05 mm. The storage modulus at 0.6 rad/sec was taken as $G'_{\omega=0.6}$, and the storage modulus at 0.8 rad/sec was taken as $G'_{\omega=0.8}$. The dispersibility of the ink was evaluated according to the following criteria:

A: The value of $(\log G'_{\omega=0.8} - \log G'_{\omega=0.6})/(\log 0.8 - \log 0.6)$ is from 1.8 to 2.0.

B: The value of $(\log G'_{\omega=0.8} - \log G'_{\omega=0.6})/(\log 0.8 - \log 0.6)$ is from 1.6 to 1.8.

C: The value of $(\log G'_{\omega=0.8} - \log G'_{\omega=0.6})/(\log 0.8 - \log 0.6)$ is from 1.2 to 1.6.

D: The value of $(\log G'_{\omega=0.8} - \log G'_{\omega=0.6})/(\log 0.8 - \log 0.6)$ is less than 1.2.

Evaluation 2-2: Dispersibility 2

For each of the ink jet recording inks of Examples and Comparative Examples, the viscosity at angles of inclination of 70°, 60°, 50°, 40° and 30° was measured with an AMVn rolling ball viscometer at 20° C., using a capillary having an inner diameter of 0.9 mm and a steel ball having a diameter of 0.794 mm and a density of 7.850 g/cm$^3$. The sin θ was plotted as abscissa and the viscosity as ordinate. The slope of the resulting sin θ-viscosity curve was determined, and the dispersibility of the ink was evaluated according to the following criteria:

A: The slope of the sin θ-viscosity curve is from 0 to −0.05, and the ink indicates Newtonian properties and shows particularly good dispersibility.

B: The slope of the sin θ-viscosity curve is from −0.05 to −0.1, and the ink indicates nearly Newtonian properties and shows good dispersibility next to that of A.

C: The slope of the sin θ-viscosity curve is from −0.1 to −0.15, and the ink indicates non-Newtonian properties, but shows slightly good dispersibility.

D: The slope of the sin θ-viscosity curve is less than −0.15, and the ink indicates non-Newtonian properties. Sedimentation easily occurs to show poor dispersibility.

Evaluation 3: Dispersion Stability

Each of the ink jet recording inks of Examples and Comparative Examples was put into a glass sample bottle, sealed, and then, allowed to stand at 60° C. for 2 weeks. The viscosity of the ink before and after the standing was examined. The viscosity was measured was measured at 20° C. at a shear rate of 150 sec$^{-1}$ with a Physica MCR300 rheometer manufactured by Paar Physica using a corn plate (CP 75-1 manufactured by Paar Physica) having a corn radius of 37.50 mm, a corn angle of 1 degree and a measuring gap of 0.05 mm. The results thus obtained were evaluated according to the following criteria:

A: The change is less than ±0.1 mPa·s.
B: The change is from ±0.1 to less than ±0.3 mPa·s.
C: The change is ±0.3 mPa·s or more.

Evaluation 4: Sedimentation Properties

For each of the ink jet recording inks of Examples and Comparative Examples, the sedimentation properties of the colorant in the ink were measured at 20° C. using a TURBISCAN 2000 instrument (manufactured by FORMUL ACTION) which can evaluate the sedimentation properties from intensity distributions of back scattered light and transmitted light in the height direction of the sample. A measurement principle of the TURBISCAN 2000 instrument manufactured by FORMUL ACTION is shown below. This instrument has the mechanism that when a glass tube into which an ink is put is set to a specified position of the instrument and a measurement is started, a stage disposed so as to surround the periphery (diameter direction) of the glass tube moves up and down along the glass tube. A light source and detectors for scattered light and transmitted light installed on the stage measure the intensity distributions of scattered light and transmitted light at 40-μm intervals in the longitudinal direction of the glass tube, in response to the vertical movement of the stage. This operation is repeated at arbitrary time intervals, thereby being able to observe the movement of particles or changes in particle diameter as the intensity of light with time.

The evaluation was made according to the following criteria:

A: No sedimentation phenomenon was observed even after the elapse of 2 weeks.

B: A sedimentation phenomenon was observed after the elapse of 2 weeks.

Evaluation 5: Print Density

An ink cartridge was filled with each of the ink jet recording inks of Examples and Comparative Examples, and mounted on an ink jet printer, PM-720C (manufactured by Seiko Epson Corporation). A solid print was made on Xerox P paper and Xerox 4024 paper (manufactured by Xerox Corp.) of plain paper. The density of this solid print portion was measured with a spectrophotometer (GRETAGA SPM-50, manufactured by Gretag Macbeth GmbH). The results thus obtained were evaluated according to the following criteria:

(In the case of the black ink)
AA: The OD value of the black ink is 1.5 or more.
A: The OD value of the black ink is 1.4 to less than 1.5.
B: The OD value of the black ink is 1.3 to less than 1.4.
C: The OD value of the black ink is less than 1.3.
(In the case of the color ink)
AA: The OD value of the color ink is 1.25 or more.
A: The OD value of the color ink is 1.2 to less than 1.25.
B: The OD value of the color ink is 1.15 to less than 1.2.
C: The OD value of the color ink is less than 1.15.

Evaluation 6: Print Quality

An ink cartridge was filled with each of the ink jet recording inks of Examples and Comparative Examples, and mounted on an ink jet printer, PM-720C (manufactured by Seiko Epson Corporation). Twenty-four capital letters and 24 lowercase letters of the alphabet were printed on each plain paper (partly including recycled paper) described below, visually observed and evaluated according to the following criteria:

AA: No blurring occurs on all papers.
A: Blurring scarcely occurs on all papers.
B: The occurrence of slight blurring is only observed on 2 or 3 papers.
C: The occurrence of slight blurring is observed on all papers.
D: Much blurring occurs on all papers.

Print papers used for the evaluation are 12 papers of Conqueror, Favorit, Modo, Rapid Copy, EPSON EPP, Xerox P, Xerox 4024, Xerox 10, Neenha Bond, Ricopy 6200, Yamayuri (recycled paper) and Xerox R (recycled paper).

Evaluation 7: Abrasion Resistance

An ink cartridge was filled with each of the ink jet recording inks of Examples and Comparative Examples, and mounted on an ink jet printer, PM-720C (manufactured by Seiko Epson Corporation). A solid print was made in a region of 10 mm×10 mm on a super fine glossy film designed for ink jet printing (manufactured by Seiko Epson Corporation) at a duty of 100%. After standing at a temperature of 25° C. for 1 hour, the above-mentioned printed region was rubbed with a yellow highlight pen using an aqueous ink (ZEBRA PEN 2 (trade name), manufactured by Zebra Pen Corporation) at a load of 500 g and at a speed of 10 mm/sec, and it was observed whether a stain occurred or not. The results thereof were evaluated according to the following criteria:

A: No stain occurs at all when the printed region was rubbed twice.

B: No stain occurs when the printed region was rubbed once, but a stain occurs when it was rubbed twice.

C: A stain occurs when the printed region was rubbed once.

Evaluation 8: Water Resistance

One milliliter of ion exchanged water was dropped on the printed portion of the printed matter obtained in the print density test of evaluation 5. The state after 20 minutes was visually observed, and evaluated according to the following criteria:

A: No change occurs on all papers.

B: A colorant slightly bleeds out of the printed portion, but the recognition of letters is possible.

C: A colorant bleeds out of the printed portion to make the contours of printed letters unclear, so that the recognition of the letters is difficult.

Evaluation 9: Ejection Stability

Each of the ink jet recording inks of Examples and Comparative Examples was mounted on an ink jet printer, PM-720C (manufactured by Seiko Epson Corporation), and 1-mm ruled lines were printed on super fine glossy paper designed for ink jet printing (manufactured by Seiko Epson Corporation). The state of printing such as dot missing and deviation in an ink landing position was visually observed, and evaluated according to the following criteria:

A: Even when 10,000 or more prints are carried out, neither dot missing nor deviation in the ink landing position occurs.

B: When 1,000 to less than 10,000 prints are carried out, dot missing or deviation in the ink landing position occurs.

C: When 100 to less than 1,000 prints are carried out, dot missing or deviation in the ink landing position occurs.

D: When less than 100 prints are carried out, dot missing or deviation in the ink landing position occurs.

Evaluation 10: Clogging Reliability

After the printing conducted in the above-mentioned evaluation 6, a power supply of the printer was turned off, and the ink was allowed to stand. After one week, the same printing test was conducted. The "state of ink ejection" at that time was visually observed, and evaluated according to the following criteria:

A: Normal printing starts without a cleaning operation at the same time that print signals are transmitted to the printer.

B: Normal printing is conducted after three or less cleaning operations.

C: Normal printing is conducted after six or less cleaning operations.

D: Normal printing can not be performed even when a cleaning operation is repeated seven or more times.

Evaluation 11: Glossiness

An ink cartridge was filled with each of the ink jet recording inks of Examples and Comparative Examples, and mounted on an ink jet printer, PM-720C (manufactured by Seiko Epson Corporation). A solid print was made in a region of 50 mm×50 mm on super fine glossy paper designed for ink jet printing and PM Photographic Paper manufactured by Seiko Epson Corporation at a duty of 100%, followed by standing at a temperature of 25° C. for 1 hour. Then, the presence or absence of glossiness was visually observed, and evaluated according to the following criteria:

A: Extremely glossy (highly glossy).
B: Glossy but inferior to A.
C: Slightly glossy.
D: Not glossy at all.

TABLE 6A

|  | Evaluation 1 Viscosity (mPa·s) | Evaluation 2-1 Dispersibility 1 | Evaluation 2-2 Dispersibility 2 | Evaluation 3 Dispersion Stability | Evaluation 4 Sedimentation Properties | Evaluation 5 Print Density |
|---|---|---|---|---|---|---|
| Example 1A | 2.50 | A | A | A | A | AA |
| Example 2A | 3.00 | A | A | A | A | AA |
| Example 3A | 3.50 | A | A | A | A | AA |
| Example 4A | 2.80 | A | A | A | A | AA |
| Example 5A | 3.60 | A | A | A | A | AA |
| Example 6A | 3.40 | A | A | A | A | AA |
| Example 7A | 2.70 | A | A | A | A | AA |
| Example 8A | 3.10 | A | A | A | A | AA |
| Example 9A | 2.80 | A | A | A | A | AA |
| Example 10A | 3.20 | A | A | A | A | AA |
| Example 11A | 4.00 | A | A | A | A | AA |
| Example 12A | 4.10 | A | A | A | A | AA |
| Example 13A | 4.10 | A | A | A | A | AA |
| Example 14A | 4.20 | A | A | A | A | AA |
| Example 15A | 4.00 | A | A | A | A | AA |
| Example 16A | 4.10 | A | A | A | A | AA |

|  | Evaluation 6 Print Quality | Evaluation 7 Abrasion Resistance | Evaluation 8 Water Resistance | Evaluation 9 Ejection Stability | Evaluation 10 Clogging Reliability | Evaluation 11 Glossiness |
|---|---|---|---|---|---|---|
| Example 1A | AA | B | A | A | A | C |
| Example 2A | AA | B | A | A | A | C |
| Example 3A | AA | B | A | A | A | C |
| Example 4A | AA | A | A | A | A | A |
| Example 5A | AA | B | A | A | A | C |
| Example 6A | AA | A | A | A | A | A |
| Example 7A | AA | A | A | A | A | A |
| Example 8A | AA | A | A | A | A | A |
| Example 9A | AA | A | A | A | A | B |
| Example 10A | AA | A | A | A | A | B |
| Example 11A | AA | A | A | A | A | B |
| Example 12A | AA | A | A | A | A | B |
| Example 13A | AA | A | A | A | A | AA |
| Example 14A | AA | A | A | A | A | A |
| Example 15A | AA | A | A | A | A | A |
| Example 16A | AA | A | A | A | A | A |

TABLE 7A

|  | Evaluation 1 Viscosity (mPa·s) | Evaluation 2-1 Dispersibility 1 | Evaluation 2-2 Dispersibility 2 | Evaluation 3 Dispersion Stability | Evaluation 4 Sedimentation Properties | Evaluation 5 Print Density |
|---|---|---|---|---|---|---|
| Comparative Example 1A | 4.50 | B | B | B | A | B |
| Comparative Example 2A | 4.20 | A | A | A | A | C |
| Comparative Example 3A | 5.50 | C | C | C | B | B |
| Comparative Example 4A | 5.90 | C | C | C | B | B |
| Comparative Example 5A | 3.10 | B | B | B | A | B |
| Comparative Example 6A | 3.20 | B | B | B | A | B |
| Comparative Example 7A | 3.90 | B | B | B | A | B |
| Comparative Example 8A | 4.20 | B | B | B | A | B |
| Comparative Example 9A | 8.00 | D | D | D | B | C |
| Comparative Example 10A | 7.50 | D | D | D | B | C |
| Comparative Example 11A | 6.80 | D | D | D | B | C |
| Comparative Example 12A | 7.20 | D | D | D | B | C |
| Comparative Example 13A | 6.50 | D | D | D | B | C |

TABLE 7A-continued

|  | Evaluation 6 Print Quality | Evaluation 7 Abrasion Resistance | Evaluation 8 Water Resistance | Evaluation 9 Ejection Stability | Evaluation 10 Clogging Reliability | Evaluation 11 Glossiness |
|---|---|---|---|---|---|---|
| Comparative Example 1A | D | C | B | B | C | C |
| Comparative Example 2A | D | C | B | A | B | B |
| Comparative Example 3A | D | B | B | D | D | D |
| Comparative Example 4A | D | C | B | D | D | D |
| Comparative Example 5A | B | C | C | B | B | D |
| Comparative Example 6A | B | C | C | B | B | D |
| Comparative Example 7A | B | C | C | B | A | D |
| Comparative Example 8A | B | C | C | B | A | D |
| Comparative Example 9A | C | C | B | D | D | C |
| Comparative Example 10A | D | C | B | D | D | C |
| Comparative Example 11A | D | C | B | D | D | C |
| Comparative Example 12A | C | C | B | D | D | C |
| Comparative Example 13A | D | C | B | D | D | C |

As shown in Tables 6A and 7A, the ink jet recording inks of Examples were excellent in all evaluation items, and realized low viscosity, compared to the ink jet recording inks of Comparative Examples 3A and 4A in which the conventional microencapsulated pigments were used as colorants and the concentration of the microencapsulated pigments was set to a value lower than that of the inks of Examples.

Further, the ink jet recording inks of Examples 1A to 16A containing the microencapsulated pigments of the first invention and the solid wetting agents showed good results particularly in clogging reliability.

The ink jet recording inks in which the pigments of Comparative Examples 9A to 13A were dispersed with the dispersants were insufficient in dispersibility, dispersion stability, print density, print quality, abrasion resistance and ejection stability.

The ink jet recording inks of Comparative Examples 1A and 2A in which the conventional microencapsulated pigments containing ordinary powder pigments not treated with a cationic group-imparting agent and coated with the polymers were used as colorants and the concentration of the microencapsulated pigments was set to a value lower than that of the inks of Examples were excellent in dispersion stability and ejection stability, but failed to obtain sufficient results for print density, print quality and abrasion resistance of the resulting printed matter.

On the other hand, the ink jet recording inks of Comparative Examples 3A and 4A in which the above-mentioned conventional microencapsulated pigments were used as colorants and the concentration of the microencapsulated pigments was set to a value equivalent to that of the inks of Examples were particularly poor in dispersibility, dispersion stability and ejection stability. Further, the ink jet recording inks of Comparative Examples 5A to 8A containing the pigments surface treated with the cationic group-imparting agents (the pigments having cationic groups on its surface) as colorants were excellent in dispersion stability and ejection stability, but poor in water resistance and abrasion resistance.

The first invention is not limited to the above-mentioned embodiments, and also applicable to a process in which part of an ink solution is rapidly heated at a portion close to an ejection portion of a nozzle head to generate bubbles, and ink droplets are intermittently ejected by volume expansion due to the bubbles to record letters or symbols on the surface of a recording medium, or applications such as print ink and writing things.

The second invention will be illustrated in greater detail with reference to the following Examples and Comparative Examples, but the second invention should not be construed as being limited thereto.

The "amount of hydrophilic groups introduced onto surfaces of pigment particles" shown below was determined by the following methods:

Determination of Amount of Anionic Groups Introduced (When Anionic Groups were Introduced with a Sulfonating Agent)

Pigment particles whose surfaces are treated with a sulfonating agent were treated by an oxygen flask combustion method, and a 0.3% aqueous solution of hydrogen peroxide was absorbed by the pigment particles. Then, the sulfuric ion (bivalent) was determined by ion chromatography (Dionex Corporation; 2000i). The resulting value was converted to the value of the sulfonic group, and indicated as the molar quantity per gram of pigment (mmol/g).

(When Anionic Groups were Introduced with a Carboxylating Agent)

As a technique, the Zeisel method was used. Diazomethane was dissolved in an appropriate solvent, and the resulting solution was added dropwise to convert all active hydrogen atoms on the surfaces of the pigment particles to methyl groups. Hydroiodic acid having a specific gravity of 1.7 was added to the pigment thus treated, followed by heating to vaporize the methyl groups as methyl iodide. The gas of methyl iodide was trapped with a silver nitrate solution to precipitate as methylsilver iodide. The amount of the original methyl groups, that is to say, the amount of active hydrogens, was measured from the weight of silver iodide, and indicated as the molar quantity per gram of pigment (mmol/g). That is to say, the amount of active hydrogens on the surfaces of the pigment particles correspond the amount of carboxylic acid groups.

Preparation of Black Pigment Particles "P1" Having Anionic Groups on Their Surfaces Fifteen parts of Carbon black ("MA-7" manufactured by Mitsubishi Chemical Corporation) was mixed with 200 parts of sulfolane, and dispersed in an Eiger Motor Mill, M250 (manufactured by Eiger Japan Co., Ltd.) under the conditions of a bead loading of 70% and 5,000 revolutions for 1 hour. The thus dispersed mixed solution of a pigment paste and a solvent was transferred to an evaporator, and heated at 120° C. while reducing the pressure to 30 mmHg or lower, thereby removing water contained in the system by distillation as much as possible. Thereafter, the temperature was controlled to 150° C., and then, 25 parts of sulfur trioxide was added, and allowed to react for 6 hours. After the termination of the reaction, the reaction product was washed several times with excess sulfolane, poured into water, and filtered, thereby obtaining black pigment particles "P1".

The amount of the anionic groups (sulfonic anion groups) introduced into the resulting black pigment particles "P1" was 0.12 mmol per gram of pigment.

Preparation of Black Pigment Particles "P2" Having Anionic Groups on Their Surfaces After 300 g of commercially available acidic carbon black ("MA-100" manufactured by Mitsubishi Chemical Corporation) was thoroughly mixed with 1,000 ml of water, 450 g of sodium hypochlorite (effective chlorine concentration: 12%) was added dropwise thereto, followed by stirring at 80° C. for 15 hours. The resulting slurry was washed repeatedly with ion exchanged water while filtering it through Toyo filter paper No. 2. As a measure of the completion of washing, the slurry was washed until white turbidity became disappeared when a 0.1 N aqueous solution of silver nitrate was added to the ion exchanged waster that passed through the filter. This pigment slurry was dispersed again in 2,500 ml of water, and desalted through a reverse osmosis membrane until the electric conductance reached 0.2 microsiemens or less. Further, the slurry was concentrated so as to give a pigment concentration of about 15% by weight.

The resulting surface-treated pigment dispersion was acid treated (acidified with aqueous hydrochloric acid), concentrated, dried and finely pulverized to obtain a powder.

The amount of the anionic groups (carboxylic acid anion groups) introduced into the resulting black pigment particles "P2" was 2.8 mmol per gram of pigment.

Preparation of Cyan Pigment Particles "P3" Having Anionic Groups on Their Surfaces Twenty parts of a phthalocyanine pigment (C.I. Pigment Blue 15:3) was mixed with 500 parts of quinoline, and dispersed in an Eiger Motor Mill, M250 (manufactured by Eiger Japan Co., Ltd.) under the conditions of a bead loading of 70% and 5,000 revolutions for 2 hours. The thus dispersed mixed solution of a pigment paste and a solvent was transferred to an evaporator, and heated at 120° C. while reducing the pressure to 30 mmHg or lower, thereby removing water contained in the system by distillation as much as possible. Thereafter, the temperature was controlled to 160° C., and then, 20 parts of a sulfonated pyridine complex was added, and allowed to react for 8 hours. After the termination of the reaction, the reaction product was washed several times with excess quinoline, poured into water, and filtered, thereby obtaining cyan pigment particles "P3" having anionic groups on their surfaces.

The amount of the anionic groups introduced into the resulting cyan pigment particles "P3" was 0.04 mmol/g.

Preparation of Yellow Pigment Particles "P4" Having Anionic Groups on Their Surfaces Yellow pigment particles "P4" having anionic groups on their surfaces were obtained by the same treating method as with the above-mentioned "preparation of cyan pigment particles "P3" having hydrophilic groups on their surfaces" with the exception that "20 parts of the phthalocyanine pigment (C.I. Pigment Blue 15:3)" was substituted by "20 parts of an isoindolinone pigment (C.I. Pigment Yellow 110).

The amount of the anionic groups introduced into the resulting yellow pigment particles "P4" was 0.045 mmol/g.

Preparation of Magenta Pigment Particles "P5" Having Hydrophilic Groups (Anionic Groups) on Their Surfaces Magenta pigment particles "P5" having anionic groups on their surfaces were obtained by the same treating method as with the above-mentioned "preparation of cyan pigment particles "P3" having hydrophilic groups on their surfaces" with the exception that "20 parts of the phthalocyanine pigment (C.I. Pigment Blue 15:3)" was substituted by "20 parts of an isoindolinone pigment (C.I. Pigment Red 122).

The amount of the anionic groups introduced into the resulting yellow pigment particles "P5" was 0.06 mmol/g.

Production of Microencapsulated Pigments "MCP1" to "MCP6"

Example 1B

Production of Microencapsulated Pigment "MCP1"

To an aqueous dispersion of 100 g of magenta pigment particles "P5" having anionic groups on their surfaces dispersed in 500 g of ion-exchanged water, 1.25 g of methacrylic acid dimethylaminoethylmethyl chloride was added as a cationic polymerizable surfactant, followed by mixing. Then, the resulting mixture was irradiated with an ultrasonic wave for 15 minutes. Subsequently, 12 g of benzyl methacrylate and 8 g of dodecyl methacrylate were mixed and added thereto, followed by mixing by stirring. Further, 1.50 g of methacrylic acid dimethylaminoethylmethyl chloride was added. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of 0.6 g of 2,2-azobis(2-methylpropionamidine)dihydrochloride dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to about 6 with disodium citrate, and ultrafiltration was conducted to obtain a dispersion of desired microencapsulated pigment "MCP1".

The volume average particle size of the resulting dispersion was measured with a laser doppler system size distribution analyzer, Microtrac UPA150, manufactured by Leads & Northlop Co. As a result, it was 100 nm. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was −7° C.

Example 2B

Production of Microencapsulated Pigment "MCP2"

To an aqueous dispersion of 100 g of magenta pigment particles "P5" having anionic groups on their surfaces dispersed in 500 g of ion-exchanged water, 1.25 g of methacrylic acid dimethylaminoethylmethyl chloride was added as a cationic polymerizable surfactant, followed by mixing. Then, the resulting mixture was irradiated with an ultrasonic wave for 15 minutes. Subsequently, 12 g of benzyl methacrylate and 8 g of dodecyl methacrylate were mixed and added thereto, followed by mixing by stirring. Further, 0.5 g of 2-hydroxyethyl methacrylate and 1.5 g of methacrylic acid dimethylaminoethylmethyl chloride were added. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of 0.6 g of 2,2-azobis(2-methylpropionamidine)dihydrochloride dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to about 6 with disodium citrate, and ultrafiltration was conducted to obtain a dispersion of desired microencapsulated pigment "MCP2".

The volume average particle size of the resulting dispersion was measured with a laser doppler system size distribution analyzer, Microtrac UPA150, manufactured by Leads & Northlop Co. As a result, it was 100 nm. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was −7° C.

Example 3B

Production of Microencapsulated Pigment "MCP3"

To an aqueous dispersion of 20 g of black pigment particles "P1" having anionic groups on their surfaces dispersed in 80 g of ion-exchanged water, 0.81 g of meth-acrylic acid dimethylaminoethylmethyl chloride was added as a cationic polymerizable surfactant, followed by mixing. Then, the resulting mixture was irradiated with an ultrasonic wave for 15 minutes. Subsequently, 2.45 g of isobonyl methacrylate and 2.55 g of lauryl methacrylate were mixed and added thereto, followed by mixing by stirring. Further, 1.0 g of methacrylic acid dimethylaminoethylmethyl chloride was added thereto, followed by mixing. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of 0.3 g of 2,2-azobis(2-methyl-propionamidine)dihydrochloride dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to about 6 with disodium citrate, and ultrafiltration was conducted to obtain a dispersion of desired microencapsulated pigment "MCP3".

The volume average particle size of the resulting dispersion was measured with a laser doppler system size distribution analyzer, Microtrac UPA150, manufactured by Leads & Northlop Co. As a result, it was 100 nm. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was 5° C.

Example 4B

Production of Microencapsulated Pigment "MCP4"

To an aqueous dispersion of 100 g of cyan pigment particles "P3" having anionic groups on their surfaces dispersed in 500 g of ion-exchanged water, 1.0 g of methacrylic acid dimethylaminoethylmethyl chloride was added as a cationic polymerizable surfactant, followed by mixing. Then, the resulting mixture was irradiated with an ultrasonic wave for 15 minutes. Subsequently, 17.3 g of benzyl methacrylate, 7.7 g of dodecyl methacrylate and 0.05 g of diethylene glycol dimethacrylate were mixed and added thereto, followed by mixing by stirring. Further, 1.5 g of methacrylic acid dimethylaminoethylmethyl chloride was added. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of 0.6 g of 2,2-azobis(2-methylpropionamidine)dihydrochloride dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to about 6 with disodium citrate, and ultrafiltration was conducted to obtain a dispersion of desired microencapsulated pigment "MCP4".

The volume average particle size of the resulting dispersion was measured with a laser doppler system size distribution analyzer, Microtrac UPA150, manufactured by Leads & Northlop Co. As a result, it was 100 nm. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was 7° C.

Example 5B

Production of Microencapsulated Pigment "MCP5"

To an aqueous dispersion of 150 g of yellow pigment particles "P4" having anionic groups on their surfaces dispersed in 800 g of ion-exchanged water, 2.8 g of methacryloyloxyethyltrimethylammonium chloride was added as a cationic polymerizable surfactant, followed by mixing. Then, the resulting mixture was irradiated with an ultrasonic wave for 15 minutes. Subsequently, 12 g of isobonyl methacrylate, 0.05 g of 6-hexanediol dimethacrylate and 8 g of dodecyl methacrylate were mixed and added thereto, followed by mixing by stirring. Further, 2.9 g of methacryloyloxyethyltrimethylammonium chloride was added. The resulting mixture was irradiated with the ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of 0.6 g of 2,2-azobis(2-methylpropionamidine)dihydrochloride dissolved as a polymerization initiator in 20 g of ion exchanged water was added dropwise, and polymerization was conducted at 80° C. for 6 hours, while introducing nitrogen into the reaction vessel. After the termination of the polymerization, the pH was adjusted to about 6 with disodium citrate, and ultrafiltration was conducted to obtain a dispersion of desired microencapsulated pigment "MCP5".

The volume average particle size of the resulting dispersion was measured with a laser doppler system size distribution analyzer, Microtrac UPA150, manufactured by Leads & Northlop Co. As a result, it was 100 nm. The resulting dispersion was dried at room temperature, and the glass transition temperature of a coating polymer was measured with a DSC200 thermal scanning calorimeter (differential scanning calorimeter: DSC) manufactured by Seiko Denshi Co., Ltd. As a result, it was 2° C.

Comparative Examples

Production of Microencapsulated Pigments "MCP6" and "MCP9"

MCP6 (microencapsulated cyan pigment) and MCP7 (microencapsulated magenta pigment) were produced.

Comparative Example 1B

Preparation of "MCP6"

A flask was charged with 250 g of methyl ethyl ketone, the temperature of which was elevated to 75° C. with stirring under a nitrogen seal. A mixed solution of 155 g of n-butyl methacrylate, 20 g of n-butyl acrylate, 40 g of methacryloyloxyethyltrimethylammonium chloride and 5 g of a polymerization initiator, Perbutyl O, was added dropwise thereto taking 2 hours, followed by further reaction for 15 hours to obtain a solution of a vinyl polymer.

Ten grams of the above-mentioned polymer solution, 7 g of a cyan pigment (C.I. Pigment Blue 15:3), 40 g of methyl ethyl ketone and 150 g of ceramic beads having an average particle size of 0.5 mm were put into a stainless steel beaker, and dispersed using a bead mill dispersing device. Thereafter, the ceramic beads were removed by filtration to prepare a paste for a microencapsulated pigment.

Then, 20 g of the above-mentioned paste for a microencapsulated pigment was used as an organic solvent phase, and an aqueous phase adjusted to pH 6 by adding disodium citrate to 25 g of ion exchanged water was added dropwise to this organic solvent phase with stirring while irradiating it with an ultrasonic wave, taking 20 minutes, thereby performing phase inversion emulsification to obtain a microencapsulated pigment-containing aqueous dispersion.

Further, the microencapsulated pigment-containing aqueous dispersion was distilled at 85° C., thereby removing the solvent. Thus, a dispersion of microencapsulated pigment "MCP6" of C.I. Pigment Blue 15:3 was obtained.

Comparative Example 2B

Preparation of "MCP7"

A hundred grams of C.I. Pigment Red 122 and 60 g of a polymerizable surfactant, methacrylic acid dimethylaminoethylmethyl chloride, was added to 800 g of water, irradiated with an ultrasonic wave, and further, dispersed in a sand mill (manufactured by Yasukawa Seisakusho) for about 2 hours. The resulting dispersion was put into a reaction vessel equipped with an ultrasonic generator, a stirrer, a temperature controller, a reflux condenser and a dropping funnel. Then, 10 g of benzyl methacrylate, 20 g of butyl methacrylate, 2 g of dicyclopentanyl dimethacrylate, 10 g of N,N'-dimethylaminoethyl methacrylate, 1 g of the above-mentioned polymerizable surfactant, 0.5 g of 2,2-azobis(2-methylpropionamidine) dihydrochloride and 100 g of water were previously mixed to prepare an emulsion, which was gradually added dropwise into the above-mentioned reaction vessel through the dropping funnel. After the termination of the dropwise addition, polymerization reaction was performed at 60° C. for 48 hours. The resulting dispersion of the colorant was adjusted approximately to pH 6 with disodium citrate, and filtered through a 0.4-µm filter to remove coarse particles, thereby obtaining a dispersion of microencapsulated pigment "MCP7". The volume average particle size thereof measured with a laser doppler system size distribution analyzer, Microtrac UPA150 (manufactured by Leads & Northlop Co.), was 130 nm.

Preparation of Ink Jet Recording Inks

Examples 6B to 10B

Based on compositions shown in Table 1B, ink jet recording inks of Examples 6B to 10B were prepared.

TABLE 1B

|  |  | Example 6B | Example 7B | Example 8B | Example 9B | Example 10B |
| --- | --- | --- | --- | --- | --- | --- |
| Microencapsulated | MCP1 | 8 |  |  |  |  |
| Pigment | MCP2 |  | 8 |  |  |  |
|  | MCP3 |  |  | 8 |  |  |
|  | MCP4 |  |  |  | 8 |  |
|  | MCP5 |  |  |  |  | 8 |
| Wetting Agent | Glycerol | 13 | 13 | 13 | 13 | 13 |
| Penetrant | Triethylene Glycol Monobutyl Ether | 2 | 2 | 2 | 2 | 2 |
|  | 1,2-Hexanediol | 1 | 2 | 1 | 2 | 2 |
|  | Olfine E1010 | 0.5 | 0.5 | 0.5 | 0.5 | 0.5 |
| Solid Wetting Agent | Trimethylolpropane | 5 | 5 | 5 | 5 | 5 |
| Polar Solvent | 2-Pyrrolidone | 1 | 1 | 1 | 1 | 1 |

TABLE 1B-continued

|  |  | Example 8B | Example 7B | Example 8B | Example 9B | Example 10B |
|---|---|---|---|---|---|---|
| pH Adjuster | Disodium Citrate | Proper amount | Proper amount | Proper amount | Proper amount | Proper amount |
| Preservative | Proxel XL-2 | 0.05 | 0.05 | 0.05 | 0.05 | 0.05 |
| Water | Ion Exchanged Water | bal. | bal. | bal. | bal. | bal. |

Comparative Examples 3B and 4B

Based on compositions shown in Table 2B, ink jet recording inks of Comparative Examples 3 and 4B were prepared.

TABLE 2B

|  |  | Comparative Example 3B | Comparative Example 4B |
|---|---|---|---|
| Microencapsulated Pigment | MCP6 | 8 |  |
|  | MCP7 |  | 8 |
| Wetting Agent | Glycerol | 13 | 13 |
| Penetrant | Triethylene Glycol Monobutyl Ether | 2 | 2 |
|  | 1,2-Hexanediol | 1 | 2 |
|  | Olfine E1010 | 0.5 | 0.5 |
| Solid Wetting Agent | Trimethylolpropane | 5 | 5 |
| Polar Solvent | 2-Pyrrolidone | 1 | 1 |
| PH Adjuster | Disodium Citrate | Proper amount | Proper amount |
| Preservative | Proxel XL-2 | 0.05 | 0.05 |
| Water | Ion Exchanged Water | bal. | bal. |

Evaluation

The ink jet recording inks of Examples 6B to 10B, Comparative Examples 3B and 4B and recorded matter printed using these inks were evaluated by methods shown below.

Evaluation 1: Dispersibility

For each of the ink jet recording inks of Examples and Comparative Examples, the viscosity at angles of inclination of 70°, 60°, 50°, 40° and 30° was measured with an AMVn rolling ball viscometer at 20° C., using a capillary having an inner diameter of 0.9 mm and a steel ball having a diameter of 0.794 mm and a density of 7.850 g/cm$^3$. The sin θ was plotted as abscissa and the viscosity as ordinate. The slope of the resulting sin θ-viscosity curve was determined, and the dispersibility of the ink was evaluated according to the following criteria:

A: The slope of the sin θ-viscosity curve is from 0 to −0.05, and the ink indicates Newtonian properties and shows particularly good dispersibility.

B: The slope of the sin θ-viscosity curve is from −0.05 to −0.1, and the ink indicates nearly Newtonian properties and shows good dispersibility next to that of A.

C: The slope of the sin θ-viscosity curve is from −0.1 to −0.15, and the ink indicates non-Newtonian properties, but shows slightly good dispersibility.

D: The slope of the sin θ-viscosity curve is less than −0.15, and the ink indicates non-Newtonian properties. Sedimentation easily occurs to show poor dispersibility.

Evaluation 2: Dispersion Stability

Each of the ink jet recording inks of Examples and Comparative Examples was put into a glass sample bottle, sealed, and then, allowed to stand at 60° C. for 2 weeks. The viscosity of the ink before and after the standing was examined. The viscosity was measured was measured at 20° C. at a shear rate of 150 sec$^{-1}$ with a Physica MCR300 rheometer manufactured by Paar Physica using a corn plate (CP 75-1 manufactured by Paar Physica) having a corn radius of 37.50 mm, a corn angle of 1 degree and a measuring gap of 0.05 mm. The results thus obtained were evaluated according to the following criteria:

A: The change is less than ±0.1 mPa·s.
B: The change is from ±0.1 to less than ±0.3 mpa·s.
C: The change is ±0.3 mpa·s or more.

Evaluation 3: Sedimentation Properties

For each of the ink jet recording inks of Examples and Comparative Examples, the sedimentation properties of the colorant in the ink were measured at 20° C. using a TURBISCAN 2000 instrument (manufactured by FORMUL ACTION) which can evaluate the sedimentation properties from intensity distributions of back scattered light and transmitted light in the height direction of the sample. A measurement principle of the TURBISCAN 2000 instrument manufactured by FORMUL ACTION is shown below. This instrument has the mechanism that when a glass tube into which an ink is put is set to a specified position of the instrument and a measurement is started, a stage disposed so as to surround the periphery (diameter direction) of the glass tube moves up and down along the glass tube. A light source and detectors for scattered light and transmitted light installed on the stage measure the intensity distributions of scattered light and transmitted light at 40-μm intervals in the longitudinal direction of the glass tube, in response to the vertical movement of the stage. This operation is repeated at arbitrary time intervals, thereby being able to observe the movement of particles or changes in particle diameter as the intensity of light with time.

The evaluation was made according to the following criteria:

A: No sedimentation phenomenon was observed even after the elapse of 2 weeks.

B: A sedimentation phenomenon was observed after the elapse of 2 weeks.

Evaluation 4: Print Density

An ink cartridge was filled with each of the ink jet recording inks of Examples and Comparative Examples, and mounted on an ink jet printer, PM-720C (manufactured by Seiko Epson Corporation). A solid print was made on Xerox P paper (manufactured by Xerox Corp.) of plain paper at a duty of 100%. The density of this solid print portion was measured with a spectrophotometer (GRETAGA SPM-50, manufactured by Gretag Macbeth GmbH). The results thus obtained were evaluated according to the following criteria:

A: The OD value of the black ink is 1.4 or more.
The OD value of the color ink is 1.2 or more.
B: The OD value of the black ink is 1.3 to less than 1.4.
The OD value of the color ink is 1.15 to less than 1.2.
C: The OD value of the black ink is less than 1.3.
The OD value of the color ink is less than 1.15.

Evaluation 5: Print Quality

An ink cartridge was filled with each of the ink jet recording inks of Examples and Comparative Examples, and mounted on an ink jet printer, PM-720C (manufactured by Seiko Epson Corporation). Twenty-four capital letters and 24 lowercase letters of the alphabet were printed on each plain paper (partly including recycled paper) described below, visually observed and evaluated according to the following criteria:

AA: No blurring occurs on all papers.
A: Blurring scarcely occurs on all papers.
B: The occurrence of slight blurring is only observed on 2 or 3 papers.
C: The occurrence of slight blurring is observed on all papers.
D: Much blurring occurs on all papers.

Print papers used for the evaluation are 12 papers of Conqueror, Favorit, Modo, Rapid Copy, EPSON EPP, Xerox P, Xerox 4024, Neenha Bond, Ricopy 6200, Yamayuri (recycled paper) and Xerox R (recycled paper).

Evaluation 6: Color Developability

An ink cartridge was filled with each of the ink jet recording inks of Examples and Comparative Examples, and mounted on an ink jet printer, PM-720C (manufactured by Seiko Epson Corporation). A solid print was made on each of semigloss MC photo paper (manufactured by Seiko Epson Corporation) and Xerox P paper (manufactured by Xerox Corp.) at a duty of 100%, and the C* value of the sold print portion was measured. The ratio of the C* value on the Xerox P paper (manufactured by Xerox Corp.) to the C* value on the semigloss MC photo paper (manufactured by Seiko Epson Corporation) was determined, and the color developability on plain paper was evaluated according to the following criteria:

A: 0.9 or more
B: 0.8 to less than 0.9
C: Less than 0.8

Evaluation 7: Clogging Reliability

After the printing conducted in the above-mentioned evaluation 6, a power supply of the printer was turned off, and the ink was allowed to stand. After one week, the same printing test was conducted. The "state of ink ejection" at that time was visually observed, and evaluated according to the following criteria:

A: Normal printing starts without a cleaning operation at the same time that print signals are transmitted to the printer.
B: Normal printing is conducted after three or less cleaning operations.
C: Normal printing is conducted after six or less cleaning operations.
D: Normal printing can not be performed even when a cleaning operation is repeated seven or more times.

As shown in Table 3B, the ink jet recording inks of Examples were excellent in all evaluation items.

The ink jet recording ink (Comparative Example 3B) using as a colorant the conventional microencapsulated pigment (Comparative Example 1B) in which the pigment not treated with a anionic group-imparting agent was coated with the polymer was particularly poor in dispersibility, dispersion stability and clogging reliability.

The second invention is not limited to the above-mentioned embodiments, and also applicable to a process in which part of an ink solution is rapidly heated at a portion close to an ejection portion of a nozzle head to generate bubbles, and ink droplets are intermittently ejected by volume expansion due to the bubbles to record letters or symbols on the surface of a recording medium, or applications such as print ink and writing things.

While the present invention has been described in detail and with reference to specific embodiments thereof, it will be apparent to one skilled in the art that various changes and modifications can be made therein without departing from the spirit and scope thereof.

The present application is based on Japanese patent application Nos. 2003-353649 (filed on Oct. 14, 2003) and 2003-372602 (filed on Oct. 31, 2003), the content thereof being herein incorporated by reference.

What is claimed is:

1. A microencapsulated pigment comprising pigment particles having anionic groups on their surfaces, the pigment particles being coated with a polymer having a repeating structural unit derived from a cationic polymerizable surfactant having a cationic group, a hydrophobic group and a polymerizable group and/or a repeating structural unit derived from a cationic polymerizable hydrophilic monomer.

2. A microencapsulated pigment comprising pigment particles having anionic groups on their surfaces, the pigment particles being coated with a polymer by polymerizing a cationic polymerizable surfactant having a cationic group, a hydrophobic group and a polymerizable group and/or a cationic polymerizable hydrophilic monomer in an aqueous dispersion in which the pigment particles are dispersed.

3. The microencapsulated pigment according to claim 1, wherein the polymer further comprises a repeating structural unit derived from a hydrophobic monomer.

4. The microencapsulated pigment according to claim 1, wherein the polymer further comprises a repeating structural unit derived from a crosslinkable monomer and/or a repeating structural unit derived from a monomer represented by the

TABLE 3B

| | | Example 6B | Example 7B | Example 8B | Example 9B | Example 10B | Comparative Example 3B | Comparative Example 4B |
|---|---|---|---|---|---|---|---|---|
| Evaluation 1 | Dispersibility | A | A | A | A | A | C | B |
| Evaluation 2 | Dispersion Stability | A | A | A | A | A | C | B |
| Evaluation 3 | Sedimentation Properties | A | A | A | A | A | B | A |
| Evaluation 4 | Print Density | A | A | A | A | A | B | B |
| Evaluation 5 | Print Quality | A | A | A | A | A | D | A |
| Evaluation 6 | Color Developability | A | A | A | A | A | B | B |
| Evaluation 7 | Clogging Reliability | A | A | A | A | A | B | A |

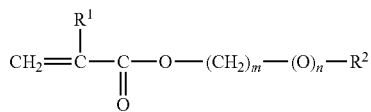

following general formula (1):
wherein $R^1$ represents a hydrogen atom or a methyl group, $R^2$ represents a t-butyl group, an alicyclic hydrocarbon group, an aromatic hydrocarbon group or a heterocyclic group, m represents an integer of 0 to 3, and n represents an integer of 0 or 1.

5. The microencapsulated pigment according to claim 1, wherein the pigment constituting the pigment particles is carbon black or an organic pigment.

6. The microencapsulated pigment according to claim 1, wherein the anionic group of the pigment particle is a sulfonic anion group ($-SO_3^-$) and/or a sulfinic anion group ($-RSO_2^-$: R is an alkyl group having 1 to 12 carbon atoms, a phenylene group, or a modified group thereof).

7. The microencapsulated pigment according to claim 1, wherein the anionic group of the pigment particle is a carboxyl anion group ($-COO^-$).

8. The microencapsulated pigment according to claim 1, wherein the cationic group of the cationic polymerizable surfactant and/or cationic polymerizable hydrophilic monomer is one member selected from the group consisting of a primary amine cation group, a secondary amine cation group, a tertiary amine cation group and a quaternary ammonium cation group.

9. The microencapsulated pigment according to claim 1, wherein the hydrophobic group of the cationic polymerizable surfactant and/or cationic polymerizable hydrophilic monomer is one member selected from the group consisting of an alkyl group, an aryl group and a combined group thereof.

10. The microencapsulated pigment according to claim 1, wherein the polymerizable group of the cationic polymerizable surfactant and/or cationic polymerizable hydrophilic monomer is a radically polymerizable unsaturated hydrocarbon group, which is one member selected from the group consisting of a vinyl group, an allyl group, an acryloyl group, a methacryloyl group, a propenyl group, a vinylidene group and vinylene group.

11. An aqueous dispersion comprising the microencapsulated pigment according to claim 1.

12. An ink jet recording ink comprising the aqueous dispersion according to claim 11.

13. An ink jet recording ink comprising at least the microencapsulated pigment according to claim 1 and water.

14. The ink jet recording ink according to claim 12, further comprising a water-soluble wetting agent.

15. The ink jet recording ink according to claim 14, wherein the water-soluble wetting agent is at least one compound selected from the group consisting of glycerol, trimehtylolpropane, 1,2,6-hexanetriol and saccharides.

16. The ink jet recording ink according to claim 12, further comprising at least one compound selected from the group consisting of alkyl ethers of polyhydric alcohols and 1,2-alkyldiols.

* * * * *